(12) United States Patent
Guo et al.

(10) Patent No.: US 12,455,594 B2
(45) Date of Patent: Oct. 28, 2025

(54) GLASS ARTICLES, NATIVELY COLORED GLASS HOUSINGS, AND METHODS OF MAKING THE SAME

(71) Applicant: CORNING INCORPORATED, Corning, NY (US)

(72) Inventors: Xiaoju Guo, Pittsford, NY (US); Po Hsuen Kuo, Painted Post, NY (US); Lina Ma, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/818,764

(22) Filed: Aug. 29, 2024

(65) Prior Publication Data
US 2025/0085741 A1    Mar. 13, 2025

Related U.S. Application Data

(60) Provisional application No. 63/537,466, filed on Sep. 8, 2023.

(51) Int. Cl.
*G06F 1/16* (2006.01)
*C03C 3/097* (2006.01)

(52) U.S. Cl.
CPC ............ *G06F 1/1626* (2013.01); *C03C 3/097* (2013.01); *G06F 1/1656* (2013.01)

(58) Field of Classification Search
CPC ...... G06F 1/1626; G06F 1/1656; C03C 3/097
See application file for complete search history.

(56) References Cited

U.S. PATENT DOCUMENTS

| | | |
|---|---|---|
| 8,854,623 B2 | 10/2014 | Fontaine et al. |
| 11,560,329 B1 | 1/2023 | Guo et al. |
| 11,597,674 B2 | 3/2023 | Guo et al. |
| 11,634,354 B2 | 4/2023 | Guo et al. |
| 11,667,562 B2 | 6/2023 | Guo et al. |

(Continued)

FOREIGN PATENT DOCUMENTS

| | | |
|---|---|---|
| DE | 3216067 A1 | 3/1983 |
| DE | 69218216 T2 | 7/1997 |

(Continued)

OTHER PUBLICATIONS

International Search Report and Written Opinion of the International Searching Authority; PCT/US2024/044084; dated Feb. 14, 2025; 10 pages; European Patent Office.

(Continued)

*Primary Examiner* — Hang Lin
(74) *Attorney, Agent, or Firm* — Travis B. Gasa; Russell S. Magaziner; John P. McGroarty

(57) ABSTRACT

Natively colored glass housings having a glass article and/or glass articles include a first region and a second region. The second region includes a second thickness greater than a first thickness of the first region. The first CIE L* value is from 30 to 96. In aspects, a color difference dE94 between the first region and the second region is 1.0 or more, 4.5 or more, or 10 or more. In aspects, a first CIE a* value is −0.3 or less, and a first CIE b* value is 0.0 or more. In aspects, a first CIE a* value is from −10 to 20, and a first CIE b* value is from −70 to −5. In aspects, a first CIE a* value is 0 or more and a first CIE b* value is 5.0 or more.

25 Claims, 18 Drawing Sheets

(56) References Cited

U.S. PATENT DOCUMENTS

| | | | |
|---|---|---|---|
| 11,802,072 B2 | 10/2023 | Guo et al. | |
| 2017/0291849 A1* | 10/2017 | Dejneka | H05K 5/03 |
| 2022/0402805 A1 | 12/2022 | Guo et al. | |
| 2022/0402806 A1 | 12/2022 | Guo et al. | |
| 2022/0402807 A1 | 12/2022 | Guo et al. | |
| 2023/0056403 A1 | 2/2023 | Nguyen et al. | |
| 2023/0159383 A1 | 5/2023 | Leukel et al. | |
| 2023/0322612 A1* | 10/2023 | Oda | C03C 3/087 |
| | | | 428/410 |

FOREIGN PATENT DOCUMENTS

| | | | |
|---|---|---|---|
| EP | 0597929 B1 | | 3/1997 |
| JP | 06-305735 A | | 11/1994 |
| JP | 2016121051 A | * | 7/2016 |
| WO | 2022/266405 A1 | | 12/2022 |

OTHER PUBLICATIONS

Bubsey, R.T. et al., "Closed-Form Expressions for Crack-Mouth Displacement and Stress Intensity Factors for Chevron-Notched Short Bar and Short Rod Specimens Based on Experimental Compliance Measurements", NASA Technical Memorandum 83796, pp. 1-30 (Oct. 1992).

Reddy, K.P.R. et al., "Fracture Toughness Measurement of Glass and Ceramic Materials Using Chevron-Notched Specimens", J. Am. Ceram. Soc., 71 [6], C-310-C-313 (1988).

* cited by examiner

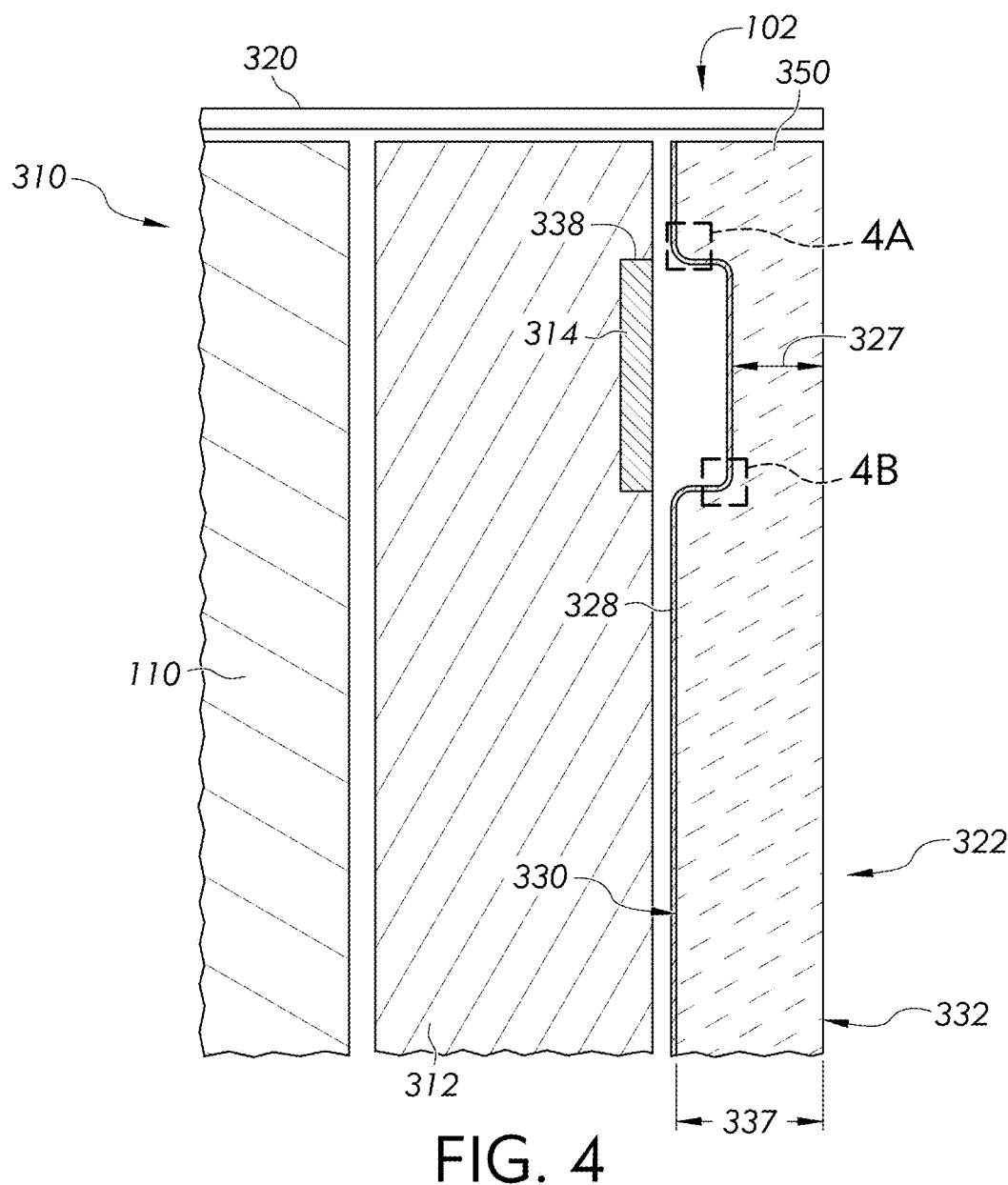
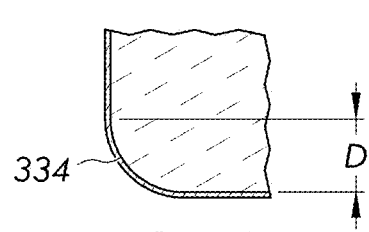
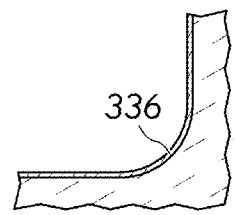
FIG. 4
FIG. 4A
FIG. 4B

GLASS ARTICLES, NATIVELY COLORED GLASS HOUSINGS, AND METHODS OF MAKING THE SAME

This application claims the benefit of priority under 35 U.S.C. § 119 of U.S. Provisional Application Ser. No. 63/537,466 filed Sep. 8, 2023, the contents of which is incorporated by reference in its entirety.

FIELD

The present disclosure relates generally to glass articles and natively colored glass housings and methods of making the same and, more particularly, to glass articles and natively colored glass housings comprising regions with different thicknesses.

BACKGROUND

Glass articles are commonly used, for example, in display devices, for example, liquid crystal displays (LCDs), electrophoretic displays (EPD), organic light-emitting diode displays (OLEDs), plasma display panels (PDPs), or the like. Glass articles can form part of a housing as well as covering the display.

Aluminosilicate glass articles may exhibit superior ion-exchangeability and drop performance. Various industries, including the consumer electronics industry, desire colored materials with the same or similar strength and fracture toughness properties as existing, non-colored, ion-exchange strengthened glasses. Colorants can be added to achieve a natively colored glass. Natively colored glass opens up new opportunities to produce aesthetically pleasing devices. Consequently, there is a need to understand how to use natively colored glass to produce aesthetically pleasing glass articles and natively colored glass housings.

SUMMARY

There are set forth herein glass articles and natively colored glass housings including the same that can provide different colors in the same glass article through regions of different thicknesses. These different colors can be used to produce aesthetically pleasing devices. demonstrated by the Examples herein, noticeable and/or aesthetically pleasing color differences between the regions of the glass article for dE94 of 10 or more (e.g., from 12 to 35 or from 11 to 22) when the CIE L* value of the first region is 30 or more. Without wishing to be bound by theory, it is believed that glasses having CIELAB color coordinates within the range of CIE L* values from 30 to 96 are transparent to wavelengths of visible light (i.e., wavelengths of light from 380 nm to 750 nm, inclusive of endpoints) rather than opaque while still provided a noticeable color. Glass articles with a CIE L* value greater than 96.5 may appear as colorless, and/or glass articles with a CIE L* value less than 30 may appear as black. Providing a CIE L* value of the first region of 30 or more can enable a noticeable color difference, for example, by ensuring that at least one of the regions produces a color that is not perceived as black. For example, glass articles associated with a blue color or a green color can produce a noticeable color difference for a CIE L* value of the first region of 30 or more (e.g., from 30 to 96 or from 35 to 65). Glass articles associated with a red or orange color can produce a noticeable color difference for a CIE L* value of the first region of 50 or more and/or produce colors of both regions that are perceived as non-black for a CIE L* value of the first region of 80 or more (e.g., from 80 to 96, from 80 to 86, or from 85 to 93). Glass articles associated with a yellow or amber color can produce a noticeable color difference for a CIE L* value of the first region of 80 or more (e.g., from 80 to 96, from 80 to 86, or from 85 to 93). As discussed herein, providing a thickness ratio from 3 to 8 (e.g., from 3 to 5) can produce a noticeable and aesthetically pleasing between the first region and the second region of the glass article.

The glass articles can provide two or more regions with different thicknesses that are associated with different colors despite the glass article comprising substantially the same composition. These different colors can highlight one or more particular features to a user of the corresponding device (e.g., smart phone, tablet, watch), such as a location of an antenna, a camera, a sensor, a logo, and/or other electronics of features. For example, such highlighted identification may help a user of the corresponding device quickly orient the device and/or achieve a handhold thereof for a particular purpose (e.g., receiving a line-of-sight transmission, sensing a particular item, instantly snapping a photo of a moving target). Without sufficient contrast, such feature(s) may otherwise blend in or be hidden within the surrounding structure of the device, which could delay and/or interfere with the intended use of the electronics and/or feature(s).

Some example aspects of the disclosure are described below with the understanding that any of the features of the various aspects may be used alone or in combination with one another.

Aspect 1. A natively colored glass housing for a consumer electronic device, the natively colored glass housing comprising a glass article comprising:
  a first region comprising a first thickness defined between a first surface area and a second surface area opposite the first surface area, the first thickness is from 20 μm to 1 mm; and
  a second region comprising a second thickness defined between a third surface area and a fourth surface area opposite the third surface area, the second thickness is greater than the first thickness,
  wherein the glass article comprises a silicate glass with a colorant, the first region exhibits a first CIE L* value from 30 to 96, the second region exhibits a second CIE L* value, and a color difference dE94 defined between the first region and the second region is 10 or more.

Aspect 2. The natively colored glass housing of aspect 1, wherein the second region exhibits the second CIE L* value from 30 to 92.

Aspect 3. The natively colored glass housing of any one of aspects 1-2, wherein the color difference dE94 is from 12 to 35.

Aspect 4. The natively colored glass housing of any one of aspects 1-2, wherein the color difference dE94 is from 11 to 22.

Aspect 5. The natively colored glass housing of any one of aspects 1-4, wherein a ratio of the second thickness to the first thickness is from 3 to 8.

Aspect 6. The natively colored glass housing of claim 5, wherein the ratio of the second thickness to the first thickness is from 3 to 5.

Aspect 7. The natively colored glass housing of any one of aspects 1-4, wherein:
  the first region exhibits:
    the first CIE L* value from 80 to 96;
    a first CIE a* value of −0.3 or less; and
    a first CIE b* value of 0.0 or more; and the second region exhibits:
the second CIE L* value from 30 to 92;
a second CIE a* value of −0.4 or less; and
a second CIE b* value of 0.0 or more.

Aspect 8. The natively colored glass housing of aspect 7, wherein an a* ratio is the second CIE a* value divided by the first CIE a* value, and the natively colored glass housing satisfies the relationship:

$$|(a^* \text{ ratio}) - 0.09 \times (\text{first } L^* \text{ value}) + 4.8| < 0.1.$$

Aspect 9. A natively colored glass housing for a consumer electronic device, the natively colored glass housing comprising a glass article comprising:
a first region comprising a first thickness defined between a first surface area and a second surface area opposite the first surface area, the first thickness is from 20 μm to 1 mm; and
a second region comprising a second thickness defined between a third surface area and a fourth surface area opposite the third surface area, the second thickness is greater than the first thickness,
wherein the glass article comprises a silicate glass with a colorant, the first region exhibits:
a first CIE L* value from 80 to 96;
a first CIE a* value of −0.3 or less; and
a first CIE b* value of 0.0 or more; and
wherein the second region exhibits:
a second CIE L* value from 30 to 92;
a second CIE a* value of −0.4 or less; and
a second CIE b* value of 0.0 or more, and
wherein an a* ratio is the second CIE a* value divided by the first CIE a* value, and the natively colored glass housing satisfies the relationship:

$$|(a^* \text{ ratio}) - 0.09 \times (\text{first } L^* \text{ value}) + 4.8| < 0.1.$$

Aspect 10. The natively colored glass housing of any one of aspects 8-9, wherein a ratio of the second thickness to the first thickness is from 3 to 8.

Aspect 11. The natively colored glass housing of aspect 10, wherein the ratio of the second thickness to the first thickness is from 3 to 5.

Aspect 12. The natively colored glass housing of any one of aspects 8-11, wherein the a* ratio is in a range from 2.0 to 3.5.

Aspect 13. The natively colored glass housing of aspect 12, wherein the a* ratio is in a range from 2.2. to 3.2.

Aspect 14. The natively colored glass housing of any one of aspects 8-13, wherein:
the first CIE b* value is 0.2 or more;
the second CIE b* is 0.2 or more; and
a b* ratio of the second CIE b* value to the first CIE b* value is in a range from 1.5 to 3.2.

Aspect 15. The natively colored glass housing of aspect 14, wherein the b* ratio is in a range from 2.3. to 3.0.

Aspect 16. The natively colored glass housing of any one of aspects 14-15, wherein the natively colored glass housing satisfies the relationship:

$$|(b^*\text{ratio}) - 0.077 \times (\text{first CIE } L^* \text{value}) + 3.8| < 0.05.$$

Aspect 17. The natively colored glass housing of any one of aspects 8-16, wherein a b* ratio is the second CIE b* value divided by the first CIE b* value, and the natively colored glass housing satisfies the relationship:

$$|(a^*\text{ratio}) - 1.17 \times (b^*\text{ratio}) - 0.36| < 0.1.$$

Aspect 18. The natively colored glass housing of any one of aspects 8-17, wherein the glass article comprises, as a mol % of the glass article:
from about 50 mol % to about 75 mol % $SiO_2$;
from about 7 mol % to about 20 mol % $Al_2O_3$;
from about 8 mol % to about 20 mol % of at least one alkali metal oxide, alkali metal oxides including $Li_2O$, $Na_2O$, and $K_2O$;
from 0.001 mol % to about 2 mol % of at least one of a multi-valent colorant or gold; and
at least one of $B_2O_3$ or $P_2O_5$.

Aspect 19. The natively colored glass housing of aspect 18, wherein the glass article comprises, as a mol % of the glass article:
from 57 mol % to 65 mol % $SiO_2$;
from 12 mol % to 17 mol % $Al_2O_3$;
from 4 mol % to 8 mol % $B_2O_3$;
from 9 mol % to 15 mol % of the at least one alkali metal oxide;
from 3 mol % to 6 mol % CaO;
from 0 mol % to 1 mol % $ZrO_2$;
from 0 mol % to 0.25 mol % $SnO_2$; and
from 0.005 mol % to about 1.5 mol % of at least one of the multi-valent colorant or gold.

Aspect 20. The natively colored glass housing of any one of aspects 1-4, wherein:
the first region exhibits:
the first CIE L* value from 35 to 96;
a first CIE a* value from −10 to 20; and
a first CIE b* value from −70 to −5; and
the second region exhibits:
the second CIE L* value from 25 to 92;
a second CIE a* from 0 to 60; and
a second CIE b* value from −90 to −20.

Aspect 21. The natively colored glass housing of aspect 20, wherein the natively colored glass housing satisfies the following relationship:

$$|(\text{first } CIE \ L^* \text{ value}) - 1.1 \times (\text{first } CIE \ b^* \text{ value}) + 106| < 5.$$

Aspect 22. A natively colored glass housing for a consumer electronic device, the natively colored glass housing comprising a glass article comprising:
a first region comprising a first thickness defined between a first surface area and a second surface area opposite the first surface area, the first thickness is from 20 μm to 1 mm; and
a second region comprising a second thickness defined between a third surface area and a fourth surface area opposite the third surface area, the second thickness is greater than the first thickness,
wherein the glass article comprises a silicate glass with a colorant, the first region exhibits:
a first CIE L* value from 35 to 96;
a first CIE a* value from −10 to 20; and
a first CIE b* value from −70 to −5;
wherein the second region exhibits:
a second CIE L* value from 25 to 92;
a second CIE a* from 0 to 60; and
a second CIE b* value from −90 to −20, and wherein the natively colored glass housing satisfies the relationship:

|(first CIE L*value)−1.1×(first CIE b*value)+106|<5.

Aspect 23. The natively colored glass housing of any one of aspects 21-22, wherein the natively colored glass housing satisfies the following relationships:
second CIE a* value>first CIE a* value; and
first CIE b* value>second CIE b* value.

Aspect 24. The natively colored glass housing of any one of aspects 21-23, wherein a ratio of the second thickness to the first thickness is from 3 to 8.

Aspect 25. The natively colored glass housing of aspect 24, wherein the ratio of the second thickness to the first thickness is from 3 to 5.

Aspect 26. The natively colored glass housing of any one of aspects 21-25, wherein:
the first CIE L* value is from 35 to 65;
the first CIE a* value is from 0 to 20;
the first CIE b* value is from −70 to −30;
the second CIE a* value is from 30 to 60; and
the second CIE b* value is from −90 to −60.

Aspect 27. The natively colored glass housing of any one of aspects 21-26, wherein a difference in CIE a* values defined as the second CIE a* value minus the first CIE a* value is from about 15 to about 70.

Aspect 28. The natively colored glass housing of aspect 27, wherein the difference in CIE a* values is from 30 to 67.

Aspect 29. The natively colored glass housing of any one of aspects 21-28, wherein the glass article comprises, as a mol % of the glass article:
from about 50 mol % to about 75 mol % $SiO_2$;
from about 7 mol % to about 20 mol % $Al_2O_3$;
from about 8 mol % to about 20 mol % of at least one alkali metal oxide, alkali metal oxides including $Li_2O$, $Na_2O$, and $K_2O$;
from 0.001 mol % to about 2 mol % of at least one of a multi-valent colorant or gold; and
at least one of $B_2O_3$ or $P_2O_5$.

Aspect 30. The natively colored glass housing of aspect 29, wherein the glass article comprises, as a mol % of the glass article:
from 57 mol % to 65 mol % $SiO_2$;
from 12 mol % to 17 mol % $Al_2O_3$;
from 4 mol % to 8 mol % $B_2O_3$;
from 9 mol % to 15 mol % of the at least one alkali metal oxide;
from 3 mol % to 6 mol % CaO;
from 0 mol % to 1 mol % $ZrO_2$;
from 0 mol % to 0.25 mol % $SnO_2$; and
from 0.005 mol % to about 1.5 mol % of at least one of the multi-valent colorant or gold.

Aspect 31. The natively colored glass housing of any one of aspects 1-4, wherein:
the first region exhibits:
the first CIE L* value from 80 to 96;
a first CIE a* value of 0 or more; and
a first CIE b* value of 5.0 or more; and
the second region exhibits:
the second CIE L* value from 50 to 92;
a second CIE a* value of 0 or more; and
a second CIE b* value of 20 or more.

Aspect 32. The natively colored glass housing of aspect 31, wherein the second CIE b* value is greater than the first CIE b* value, and the first CIE a* value is greater than the second CIE a* value.

Aspect 33. A natively colored glass housing for a consumer electronic device, the natively colored glass housing comprising a glass article comprising:
a first region comprising a first thickness defined between a first surface area and a second surface area opposite the first surface area, the first thickness is from 20 µm to 1 mm; and
a second region comprising a second thickness defined between a third surface area and a fourth surface area opposite the third surface area, the second thickness is greater than the first thickness,
wherein the glass article comprises a silicate glass with a colorant, the first region exhibits:
a first CIE L* value from 80 to 96;
a first CIE a* value of 0 or more; and
a first CIE b* value of 5.0 or more,
wherein the second region exhibits:
a second CIE L* value from 50 to 92;
a second CIE a* value of 0 or more; and
a second CIE b* value of 20 or more; and
wherein the second CIE b* value is greater than the first CIE b* value, and the first CIE a* value is greater than the second CIE a* value.

Aspect 34. The natively colored glass housing of any one of aspects 32-33, wherein the first CIE L* values is from 80 to 86.

Aspect 35. The natively colored glass housing of any one of aspects 32-34, wherein a b* ratio defined as the first CIE b* value divided by the second CIE b* value is from about 0.75 to about 0.90.

Aspect 36. The natively colored glass housing any one of aspects 32-35, wherein the natively colored glass housing satisfies the relationship:

$|(b^* \text{ratio}) - 0.10 \times (\text{first } L^* \text{ value}) + 6.97| < 0.1.$ Aspect 37. The natively colored glass housing of any one of aspects 32-36, wherein a magnitude of a difference between the first CIE a* value and the second CIE a* value is from 15 to 25.

Aspect 38. The natively colored glass housing of any one of aspects 32-37, wherein a ratio of the second thickness to the first thickness is from 3 to 8.

Aspect 39. The natively colored glass housing of aspect 38, wherein the ratio of the second thickness to the first thickness is from 3 to 5.

Aspect 40. The natively colored glass housing of any one of aspects 1-4, wherein:
the first region exhibits:
the first CIE L* value from 80 to 96;
a first CIE a* value of −10 or more; and
a first CIE b* value of 5.0 or more; and
the second region exhibits:
the second CIE L* value from 50 to 92;
a second CIE a* value of −10 or more; and
a second CIE b* value of 20 or more.

Aspect 41. The natively colored glass housing of aspect 40, wherein a b* ratio is the second CIE b* value divided by the first CIE b* value, and the natively colored glass housing satisfies the relationship:

$|(b*\text{ratio}) - 0.10 \times (\text{first } L*\text{value}) + 6.97| < 0.1.$

Aspect 42. A natively colored glass housing for a consumer electronic device, the natively colored glass housing comprising a glass article comprising:
- a first region comprising a first thickness defined between a first surface area and a second surface area opposite the first surface area, the first thickness is from 20 μm to 1 mm; and
- a second region comprising a second thickness defined between a third surface area and a fourth surface area opposite the third surface area, the second thickness is greater than the first thickness,
- wherein the glass article comprises a silicate glass with a colorant, the first region exhibits:
  - a first CIE L* value from 80 to 96;
  - a first CIE a* value of −10 or more; and
  - a first CIE b* value of 5.0 or more,
- wherein the second region exhibits:
  - a second CIE L* value from 50 to 92;
  - a second CIE a* value of −10 or more; and
  - a second CIE b* value of 20 or more; and
- wherein a b* ratio is the second CIE b* value divided by the first CIE b* value, and the natively colored glass housing satisfies the relationship:

$$|(b*\text{ratio})-0.10\times(\text{first }L*\text{value})+6.97|<0.1.$$

Aspect 43. The natively colored glass housing of any one of aspects 41-42, wherein a ratio of the second thickness to the first thickness is from 3 to 8.

Aspect 44. The natively colored glass housing of aspect 43, wherein the ratio of the second thickness to the first thickness is from 3 to 5.

Aspect 45. The natively colored glass housing of any one of aspects 41-44, wherein the b* ratio is in a range from 1.1 to 2.3.

Aspect 46. The natively colored glass housing of any one of aspects 41-45, wherein the natively colored glass housing satisfies the following relationships:
- second CIE a* value>first CIE a* value; and
- second CIE b* value>first CIE b* value.

Aspect 47. The natively colored glass housing of any one of aspects 41-46, wherein a difference in CIE a* values defined as the second CIE a* value minus the first CIE a* value is from about 2 to about 20.

Aspect 48. The natively colored glass housing of any one of aspects 41-47, wherein:
- the second CIE a* value is from 0 to 30.

Aspect 49. The natively colored glass housing of any one of aspects 41-48, wherein:
- the first CIE b* value is from 10 to 80;
- the second CIE b* value is from 25 to 90.

Aspect 50. The natively colored glass housing of any one of aspects 41-49, wherein:
- the first CIE b* value is from 30 to 100;
- the second CIE b* value is from 75 to 110.

Aspect 51. The natively colored glass housing of any one of aspects 1-4, wherein:
- the first region exhibits:
  - the first CIE L* value from 80 to 96;
  - a first CIE a* value of 1.0 or more; and
  - a first CIE b* value of −5.0 or more; and
- the second region exhibits:
  - the second CIE L* value from 50 to 92;
  - a second CIE a* value of 1.0 or more; and
  - a second CIE b* value of −5.0 or more.

Aspect 52. The natively colored glass housing of aspect 51, wherein a color difference dE94 is defined between the first region and the second region, and the natively colored glass housing satisfies the relationship:

$$|(dE94) + 1.05\times(\text{first }L*\text{value}) - 110.2| < 2.5.$$

Aspect 53. A natively colored glass housing for a consumer electronic device, the natively colored glass housing comprising a glass article comprising:
- a first region comprising a first thickness defined between a first surface area and a second surface area opposite the first surface area, the first thickness is from 20 μm to 1 mm; and
- a second region comprising a second thickness defined between a third surface area and a fourth surface area opposite the third surface area, the second thickness is greater than the first thickness,
- wherein the glass article comprises a silicate glass with a colorant, the first region exhibits:
  - a first CIE L* value from 80 to 96;
  - a first CIE a* value of 1.0 or more; and
  - a first CIE b* value of −5.0 or more,
- wherein the second region exhibits:
  - a second CIE L* value from 50 to 92;
  - a second CIE a* value of 1.0 or more; and
  - a second CIE b* value of −5.0 or more; and
- wherein a color difference dE94 is defined between the first region and the second region, and the natively colored glass housing satisfies the relationship:

$$|(dE94) + 1.05\times(\text{first }L*\text{value}) - 110.2| < 2.5.$$

Aspect 54. The natively colored glass housing of any one of aspects 52-53, wherein the natively colored glass housing satisfies the relationship:

$$|(dE94)+1.05\times(\text{first }L*\text{value})-110.2|<2.0.$$

Aspect 55. The natively colored glass housing of any one of aspects 52-54, wherein the first CIE L* value is from 85 to 93.

Aspect 56. The natively colored glass housing of any one of aspects 31-55, wherein the glass article comprises, as a mol % of the glass article:
- from about 50 mol % to about 75 mol % $SiO_2$;
- from about 7 mol % to about 20 mol % $Al_2O_3$;
- from about 8 mol % to about 20 mol % of at least one alkali metal oxide, alkali metal oxides including $Li_2O$, $Na_2O$, and $K_2O$;
- from 0.001 mol % to about 2 mol % of at least one of a multi-valent colorant or gold; and at least one of $B_2O_3$ or $P_2O_5$.

Aspect 57. The natively colored glass housing of aspect 56, wherein the glass article comprises, as a mol % of the glass article:
- from 57 mol % to 65 mol % $SiO_2$;
- from 12 mol % to 17 mol % $Al_2O_3$;
- from 4 mol % to 8 mol % $B_2O_3$;
- from 9 mol % to 15 mol % of at the least one alkali metal oxide;
- from 3 mol % to 6 mol % CaO;
- from 0 mol % to 1 mol % $ZrO_2$;
- from 0 mol % to 0.25 mol % $SnO_2$; and
- from 0.005 mol % to about 1.5 mol % of at least one of the multi-valent colorant or gold.

Aspect 58. The natively colored glass housing of any one of aspects 1-57, further comprising a first compressive stress region extending to a first depth of compression from the first compressive stress region.

Aspect 59. The natively colored glass housing of aspect 58, wherein a maximum compressive stress of the first compressive stress region is about 400 MegaPascals or more.

Aspect 60. The natively colored glass housing of any one of aspects 1-59, wherein the glass article comprises a dielectric constant at frequencies from 10 GigaHertz to 60 GigaHertz of from about 5.6 to about 6.4.

Aspect 61. The natively colored glass housing of any one of aspects 1-60, wherein the glass article exhibits a fracture toughness of 0.60 MPam$^{1/2}$ or more, and a Young's modulus from about 50 GigaPascals to about 100 GigaPascals.

Aspect 62. The natively colored glass housing of any one of aspects 1-61, further comprising:
circuitry comprising an antenna that transmits signals within a range of 26 GHz to 40 GHz;
the natively colored glass housing at least partially surrounding the circuitry; and
a structure formed as an integral portion of the glass article, wherein the structure comprises a perimeter demarcating the second thickness of the structure that differs from the first thickness of the glass article by at least 150 µm,
wherein the antenna is positioned and oriented such that the signals are transmitted through the structure of the glass article of the natively colored glass housing.

Aspect 63. A consumer electronic device comprising:
a housing comprising a front surface, a back surface, and side surfaces; and
electrical components at least partially within the housing, the electrical components comprise a controller, a memory, a display,
wherein the housing includes a natively colored glass housing and a reflector with the natively colored glass housing disposed on the reflector layer, the reflector layer is opaque and has a CIE L* value of 70 or more, and the natively colored glass housing comprising the natively colored glass housing of any one of aspects 1-62.

Aspect 64. A consumer electronic device comprising:
a housing comprising a front surface, a back surface, and side surfaces; and
electrical components at least partially within the housing, the electrical components comprise a controller, a memory, a display,
wherein the housing includes a natively colored glass housing and a reflector with the natively colored glass housing disposed on the reflector layer, the reflector layer is opaque and has a CIE L* value of 70 or more, and the natively colored glass housing comprising a glass article comprising:
a first region comprising a first thickness defined between a first surface area and a second surface area opposite the first surface area, the first thickness is from 20 µm to 1 mm; and
a second region comprising a second thickness defined between a third surface area and a fourth surface area opposite the third surface area, the second thickness is greater than the first thickness,
wherein the glass article comprises a silicate glass with a colorant, the first region exhibits a first CIE L* value from 30 to 96.5, the second region exhibits a second CIE L* value, and a color difference dE94 defined between the first region and the second region is from 1.0 to 70.

Aspect 65. The consumer electronic device of aspect 64, wherein the color difference dE94 is from 4.5 to 60.

Aspect 66. the consumer electronic device of aspect 65, wherein the color difference dE94 is from 5.0 to 40.

Aspect 67. The consumer electronic device of aspect 66, wherein the color difference dE94 is from 5.0 to 30.

Aspect 68. The consumer electronic device of any one of aspects 64-67, wherein a ratio of the second thickness to the first thickness is from 3 to 8.

Aspect 69. The consumer electronic device of aspect 68, wherein the ratio of the second thickness to the first thickness is from 3 to 5.

Aspect 70. The consumer electronic device of any one of aspects 64-69, wherein:
the first region exhibits:
the first CIE L* value from 80 to 96;
a first CIE a* value of −0.3 or less; and
a first CIE b* value of 0.0 or more; and
the second region exhibits:
the second CIE L* value from 30 to 92;
a second CIE a* value of −0.4 or less; and
a second CIE b* value of 0.0 or more.

Aspect 71. The consumer electronic device of aspect 70, wherein an a* ratio is the second CIE a* value divided by the first CIE a* value, and the natively colored glass housing satisfies the relationship:

$$|(a*\text{ratio}) - 0.09 \times (\text{first } L*\text{value}) + 4.8| < 0.1.$$

Aspect 72. The consumer electronic device of aspect 70, wherein a b* ratio is the second CIE b* value divided by the first CIE b* value, and the natively colored glass housing satisfies the relationship:

$$|(b*\text{ratio})-0.077\times(\text{first CIE } L*\text{value})+3.8|<0.05.$$

Aspect 73. The consumer electronic device of aspect 70, wherein an a* ratio is the second CIE a* value divided by the first CIE a* value, a b* ratio is the second CIE b* value divided by the first CIE b* value, and the natively colored glass housing satisfies the relationship:

$$|(a*\text{ratio}) - 1.17 \times (b*\text{ratio}) - 3.6| < 0.1.$$

Aspect 74. The consumer electronic device of any one of aspects 64-69, wherein:
the first region exhibits:
the first CIE L* value from 35 to 96;
a first CIE a* value from −10 to 20; and
a first CIE b* value from −70 to −5; and
the second region exhibits:
the second CIE L* value from 25 to 92;
a second CIE a* from 0 to 60; and
a second CIE b* value from −90 to −20.

Aspect 75. The consumer electronic device of aspect 74, wherein the natively colored glass housing satisfies the following relationships:
second CIE a* value>first CIE a* value; and
first CIE b* value>second CIE b* value.

Aspect 76. The consumer electronic device of any one of aspects 74-75, wherein:

the first CIE L* value is from 35 to 65;
the first CIE a* value is from 0 to 20;
the first CIE b* value is from −70 to −30;
the second CIE a* value is from 30 to 60; and
the second CIE b* value is from −90 to −60.

Aspect 77. The consumer electronic device of any one of aspects 64-69, wherein:
the first region exhibits:
the first CIE L* value from 80 to 96;
a first CIE a* value of 0 or more; and
a first CIE b* value of 5.0 or more; and
the second region exhibits:
the second CIE L* value from 50 to 92;
a second CIE a* value of 0 or more; and
a second CIE b* value of 20 or more.

Aspect 78. The consumer electronic device of aspect 77, wherein a b* ratio defined as the first CIE b* value divided by the second CIE b* value is from about 0.75 to about 0.90.

Aspect 79. The consumer electronic device of any one of aspects 64-69, wherein:
the first region exhibits:
the first CIE L* value from 80 to 96;
a first CIE a* value of −10 or more; and
a first CIE b* value of 5.0 or more; and
the second region exhibits:
the second CIE L* value from 50 to 92;
a second CIE a* value of −10 or more; and
a second CIE b* value of 20 or more.

Aspect 80. The consumer electronic device of aspect 79, wherein a b* ratio is the second CIE b* value divided by the first CIE b* value, and the natively colored glass housing satisfies the relationship:

$$|(b*\text{ratio}) - 0.10 \times (\text{first } L*\text{value}) + 6.97| < 0.1.$$

Aspect 81. The consumer electronic device of any one of aspects 79-80, wherein the natively colored glass housing satisfies the following relationships:
second CIE a* value>first CIE a* value; and
second CIE b* value>first CIE b* value.

Aspect 82. The consumer electronic device of any one of aspects 64-69, wherein:
the first region exhibits:
the first CIE L* value from 80 to 96;
a first CIE a* value of 1.0 or more; and
a first CIE b* value of −5.0 or more; and
the second region exhibits:
the second CIE L* value from 50 to 92;
a second CIE a* value of 1.0 or more; and
a second CIE b* value of −5.0 or more.

Aspect 83. The consumer electronic device of aspect 82, wherein a color difference dE94 is defined between the first region and the second region, and the natively colored glass housing satisfies the relationship:

$$|(dE94) + 1.05 \times (\text{first } L*\text{value}) - 110.2| < 2.5.$$

Aspect 84. The consumer electronic device of any one of aspects 64-83, further comprising a first compressive stress region extending to a first depth of compression from the first compressive stress region.

Aspect 85. The consumer electronic device of aspect 84, wherein a maximum compressive stress of the first compressive stress region is about 400 MegaPascals or more.

Aspect 86. The consumer electronic device of any one of aspects 64-85, wherein the glass article comprises a dielectric constant at frequencies from 10 GigaHertz to 60 GigaHertz of from about 5.6 to about 6.4.

Aspect 87. The consumer electronic device of any one of aspects 64-86, wherein the glass article exhibits a fracture toughness of 0.60 MPam$^{1/2}$ or more, and a Young's modulus from about 50 GigaPascals to about 100 GigaPascals.

Throughout the disclosure, the drawings are used to emphasize certain aspects. As such, it should not be assumed that the relative size of different regions, portions, and substrates shown in the drawings are proportional to its actual relative size, unless explicitly indicated otherwise.

BRIEF DESCRIPTION OF THE DRAWINGS

The above and other features and advantages of aspects of the present disclosure are better understood when the following detailed description is read with reference to the accompanying drawings, in which:

FIG. 4 is a simplified conceptual view of the device of FIG. 3 in a slightly exploded cross-section taken along line 4-4 of FIG. 3;

FIG. 4A shows an enlarged view 4A of FIG. 4;

FIG. 4B shows an enlarged view 4B of FIG. 4;

DETAILED DESCRIPTION

Figure 2:
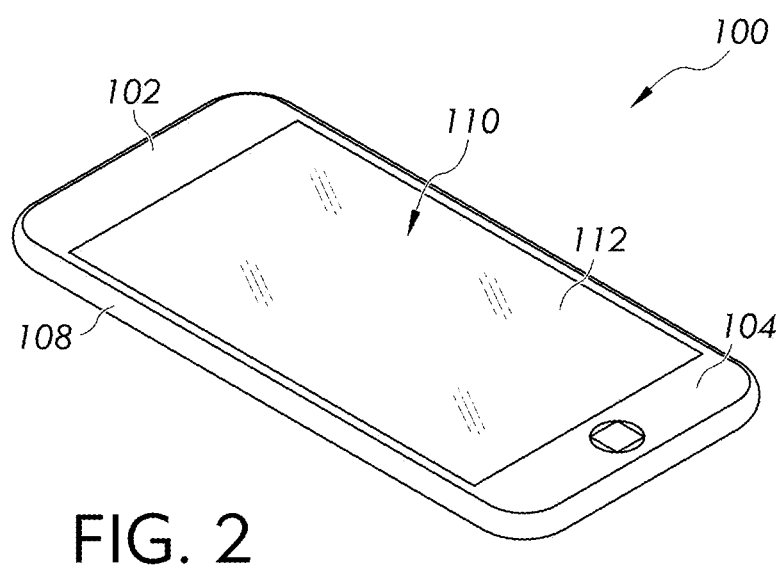
FIG. 2 is a schematic perspective view of the example consumer electronic device of FIG. 1.
Figure 3:
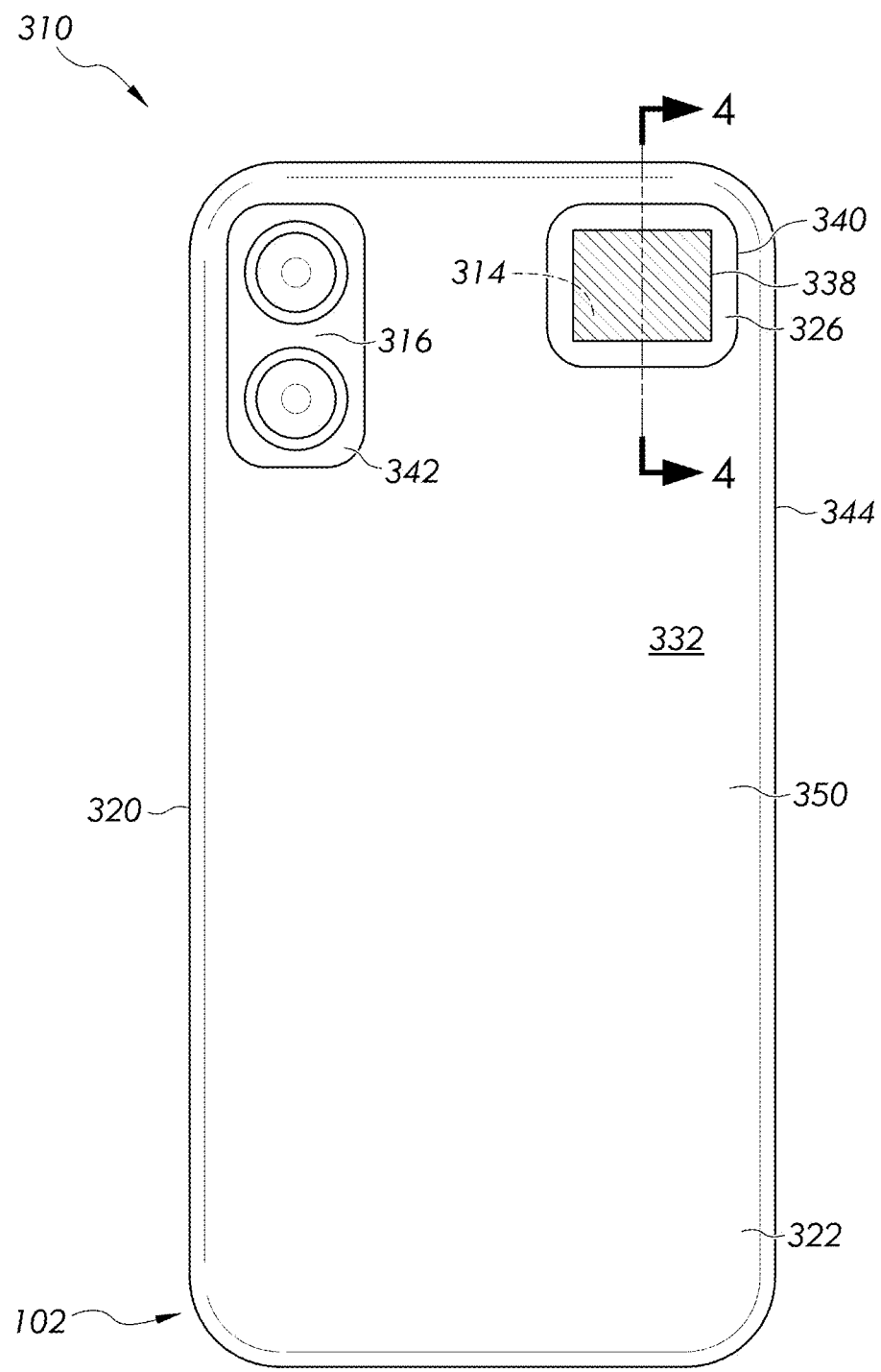
FIG. 3 is a conceptual diagram from a back view of a communicating device, more specifically of a cellular phone, according to an aspect of the disclosure.
Figure 5:
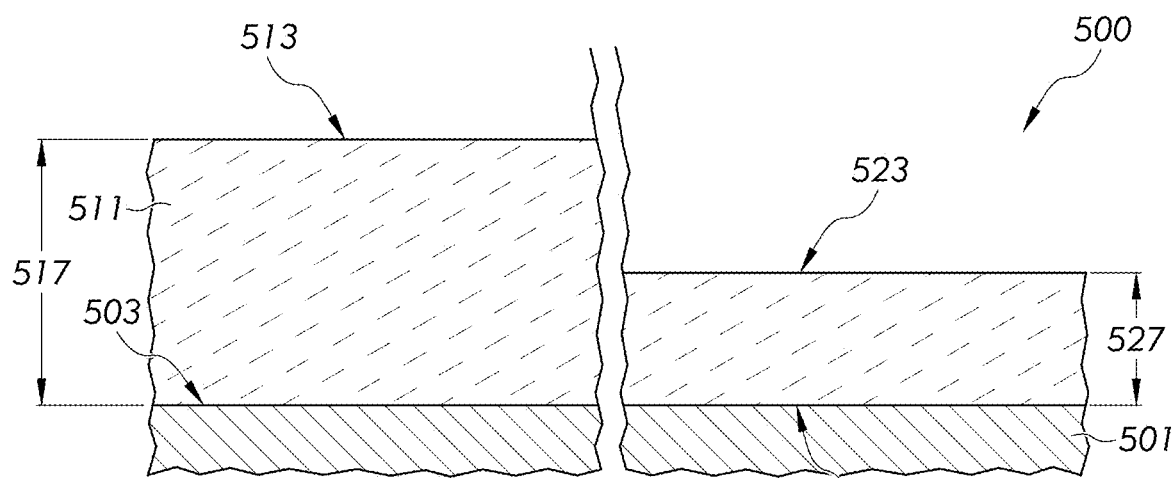
FIG. 5 is a cross-sectional view of a natively colored glass housing including a glass article in accordance with aspects of the disclosure.

Aspects will now be described more fully hereinafter with reference to the accompanying drawings in which example aspects are shown. Whenever possible, the same reference numerals are used throughout the drawings to refer to the same or like parts. FIGS. 3-5 illustrate views of natively colored glass housings 322 and/or 500 including glass articles 511 that can be incorporated to consumer electronic products (e.g., display devices), for example, those shown in FIGS. 1-4. Unless otherwise noted, a discussion of features of aspects of one foldable apparatus can apply equally to corresponding features of any aspects of the disclosure. For example, identical part numbers throughout the disclosure can indicate that, in some aspects, the identified features are identical to one another and that the discussion of the identified feature of one aspect, unless otherwise noted, can apply equally to the identified feature of any of the other aspects of the disclosure.

Aspects of the disclosure can comprise a consumer electronic product. The consumer electronic product can comprise a front surface, a back surface, and side surfaces. The consumer electronic product can further comprise electrical components at least partially within the housing. The electrical components can comprise a controller, a memory, and a display. The display can be at or adjacent to the front surface of the housing. The display can comprise liquid crystal display (LCD), an electrophoretic displays (EPD), an organic light-emitting diode (OLED) display, or a plasma display panel (PDP). The consumer electronic product can comprise a cover substrate disposed over the display. In aspects, at least one of a portion of the housing or the cover substrate comprises the foldable apparatus discussed throughout the disclosure. The consumer electronic product can comprise a portable electronic device, for example, a smartphone, a tablet, a wearable device, or a laptop.

Figure 1:
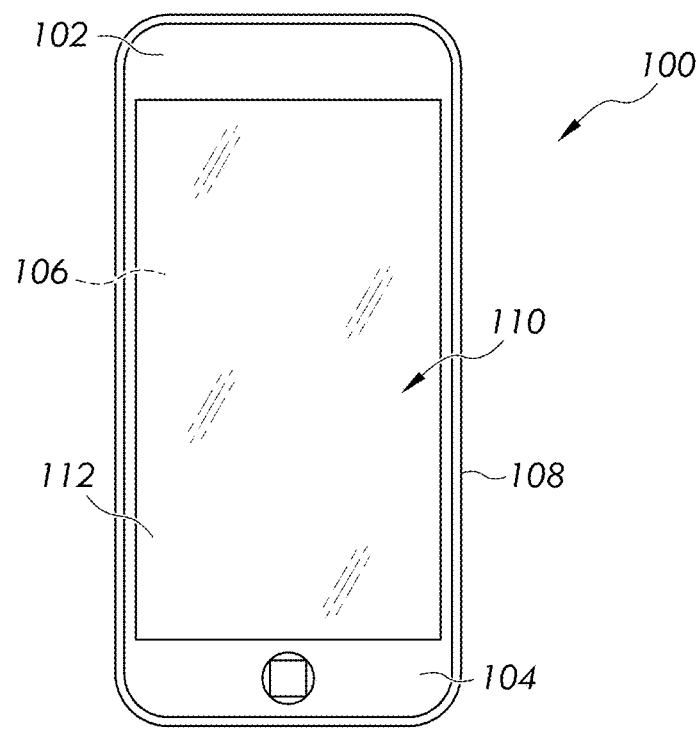
FIG. 1 is a schematic plan view of an example consumer electronic device according to aspects of the disclosure.

The foldable apparatus disclosed herein may be incorporated into another article, for example, an article with a display (or display articles) (e.g., consumer electronics, including mobile phones, tablets, computers, navigation systems, wearable devices (e.g., watches), and the like), architectural articles, transportation articles (e.g., automotive, trains, aircraft, sea craft, etc.), appliance articles, or any article that may benefit from some transparency, scratch-resistance, abrasion resistance or a combination thereof. An exemplary article incorporating any of the foldable apparatus disclosed herein is shown in FIGS. 1-2. Specifically, FIGS. 1-2 show a consumer electronic device 100 including a housing 102 having front 104, back 106, and side surfaces 108. Although not shown, the consumer electronic device 100 can comprise electrical components that are at least partially inside or entirely within the housing. For example, electrical components include at least a controller, a memory, and a display. As shown in FIGS. 1-2, the display 110 can be at or adjacent to the front surface of the housing 102. The consumer electronic device can comprise a cover substrate 112 at or over the front surface of the housing 102 such that it is over the display 110. In aspects, at least a portion of the housing 102 may include the glass article and/or the natively colored glass housing disclosed herein.

Referring to FIGS. 3-4, a communicating device 310 (i.e., electronic device with wireless signal communication capability; e.g., broadband communicating device, cellular phone, smartphone, control panel, console, dashboard, tablet, handheld computer, electronic tool) includes circuitry 312 (see FIG. 4). The consumer electronic device 100 shown in FIGS. 1-2 is an example of the communicating device 310. In aspects, the circuitry 312 includes an antenna 314. The circuitry 312 may further include other components, for example a camera 316 (FIG. 3), printed circuit board, processor, memory, display 110 (FIG. 3), battery, connector port, and other componentry.

In aspects, the antenna 314 can comprise a patterned metal wire or layer, or other such device (e.g., transceiver, receiver, transmitter, antenna array, communication module) configured to transmit and/or receive communication signals at or over a frequency range. A surface area of the antenna is defined as an area within a perimeter 338 surrounding the antenna. In further aspects, the surface area of the antenna can be 25 cm$^2$ or less, 15 cm$^2$ or less, 10 cm$^2$ or less, 100 μm$^2$ or more, 1 mm$^2$ or more, 25 mm$^2$ or more, or 100 mm$^2$ or more. In further aspects, the antenna 314 can be configured for wireless communication (e.g., transmitting, receiving, operating, and/or otherwise communicating) with transmission of signals at a frequency of 100 MHz or more, 1 GHz or more, 10 GHz or more, 24 GHz or more, 24.25 GHz or more, GHz or more, 26 GHz or more, 28 GHz or more, 100 GHz or less, 60 GHz or less, 50 GHz or less, 47 GHz or less, or 40 GHz or less. For example, the antenna may operate in a frequency range from 26 GHz to 40 GHz or from 60 GHz to 80 GHz. Communication at a frequency greater than 26

GHz may be particularly benefited from the present disclosure because such signals may be more inhibited by transmission through solid materials, and may accordingly be improved greatly by use of a housing 102 incorporating the structure 326 described herein. As such, the antenna 314 can be positioned and/or oriented such that signals are transmitted through the structure 326 (e.g., directly facing the structure 326, the structure 326 may overlay at least a portion of the antenna 314). In further aspects, a minimum distance between the antenna 314 to a portion of the glass article defining the structure 326 can be 5 mm or less, 3 mm or less, 2 mm or less, or 0.6 mm or less. Alternatively, the antenna 314 and the portion of the glass article defining the structure 326 may be in direct contact or separated only by a thickness of the coating 328.

In aspects, as shown in FIGS. 3-4, the communicating device 310 includes a housing 102 enclosing some or all of the circuitry 312. The housing 102 may include a frame 320, for example a metallic (e.g., aluminum, steel) sidewall, a natively colored glass housing 322 (e.g., back), and a display 110 (e.g., see FIGS. 1-2). The housing 102 may include alternative structures as well, for example a panel integral with frame forming a back with sidewalls within which circuitry 312 and other components may be located, and/or such as having the housing 102 integrated with a keyboard, touch panel, or other features in addition to or instead of the display.

In aspects, as shown in FIGS. 3-4, the natively colored glass housing 322 may comprise (e.g., include, mostly consist of by weight or volume, be) a glass article 350. The glass article 350 may be flat, may have curved edges, may be bowed, or otherwise. As shown in FIG. 4, The natively colored glass housing 322 may include layer(s) 328, for example a scratch-resistant coating, an anti-reflective, or other coatings on a surface of the glass article 350 (e.g., first major surface 332, second major surface 330 of the glass article 350), and may further include decorative ink and/or other layers on a surface thereof as well. For example, the coating 328 on the second major surface 330 of the glass article can comprise any of the aspects and/or be the same as the reflector 501 discussed below with reference to FIG. 5. Conceivably, although not shown, the natively colored glass housing may simply consist of a sheet of glass, where layers, coatings, etc. are unneeded for the corresponding device.

In aspects, as shown in FIG. 4, the glass article 350 includes a structure 326. The structure 326 may be an integral portion of the glass article 350 such that glass of the glass article 350 continuously extends throughout the glass article 350, including defining the structure 326. For example, the structure 326 may be a recess, trench, bump, plateau, or other feature formed in or on the glass article 350. The glass article 350 may have more than one such structure 326. Such a structure may be formed in many conceivable ways, for example, by etching away a portion of the glass article 350, milling away a portion of the glass article 350, pressing the glass of the glass article 350 in a mold, welding additional glass onto the glass article 350. As such, glass forming the structure 326 may have the same composition as the glass of the glass article 350 outside of the structure 326. The glass of the structure 326 may also share a common microstructure with the glass of the glass article 350 outside of the structure 326, such as having the same types and distributions of crystals, for example if the glass is a glass-ceramic, and/or the same types and distributions of colorants. In aspects, as shown in FIG. 4, the structure 326 is formed as a recess relative to a major surface (e.g., second major surface 330) of the glass article 350. As used herein, the "major surfaces" of the glass article 350 sheet are sides of the sheet having the most surface area (e.g., front and back sides). A major surface may be surrounded by edges of a sheet that extend between the major surfaces. For a more complex body, major surfaces may have areas defined by perimeters of edges, where the major surfaces have surface areas substantially greater than other surfaces of the body (e.g., sidewalls), for example at least 50% greater.

In aspects, as shown in FIG. 4, the glass article 350 comprises a second thickness 337, which is defined as an average distance between the second major surface 330 and the first major surface 332 opposite the first major surface excluding any portion of the glass article 350 including the structure 326 described above. In further aspects, the second thickness 337 can be within one or more of the ranges discussed below for the second thickness 517 with reference to FIG. 5.

In aspects, as shown in FIGS. 3-4, the structure 326 comprises a perimeter 340 on a major surface (e.g., second major surface 330) of the glass article 350, where the perimeter 340 demarcates a first thickness 327 of the structure 326 that differs from the second thickness 337, for example, by 50 µm or more, by 100 µm or more, by 150 µm or more, by 200 µm or more, by 300 µm or more, by 500 µm or more (e.g., located at corner 336 as shown in FIG. 4B). For example, the first thickness 327 of the structure 326 may be 1 mm or less, 800 µm or less, 600 µm or less, 500 µm or less, or 400 µm or less, 300 µm or less, 200 µm or less, 180 µm or less, 150 µm or less, 120 µm or less, 100 µm or less, 80 µm or less, 60 µm or less, 20 µm or more, 40 µm or more, 100 µm or more, 150 µm or more, 200 µm or more, 300 µm or more, 500 µm or more, or 700 µm or more, for example, in a range from 20 µm to 1 mm, from 40 µm to 800 µm, from 100 µm to 700 µm, from 150 µm to 600 µm, from 200 µm to 500 µm, from 300 µm to 400 µm, or any range or subrange therebetween. In aspects, the first thickness 327 can be about 500 µm or less, for example, in a range from 20 µm to 500 µm, from 20 µm to 400 µm, from 20 µm to 300 µm, from 40 µm to 200 µm, from 100 µm to 180 µm, or any range or subrange therebetween. Also, in aspects, the second thickness 337 of the glass article 350 may be 100 µm or more, 300 µm or more, 400 µm or more, 500 µm or more, 600 µm or more, 700 µm or more, 800 µm or more (or any of the ranges described herein for the first thickness 327). For example, the second thickness 337 can be in a range from 100 µm to 5 mm, from 300 µm to 4 mm, from 400 µm to 3 mm, from 500 µm to 3 mm, from 600 µm to 2 mm, from 700 µm to 2 mm, from 800 µm to 1 mm, or any range or subrange therebetween. In aspects, a ratio of the second thickness 337 to the first thickness 327 can be about 3.0 or more (e.g., about 3 or more), about 3.3 or more, about 3.5 or more, about 3.8 or more, about 4.0 or more (e.g., about 4 or more), about 4.3 or more, about 4.5 or more, about 4.8 or more, about 5.0 or more (e.g., about 5 or more), about 5.5 or more, about 8 or less, about 7 or less, about 6.5 or less, about 6.0 or less (e.g., about 6 or less), about 5.7 or less, about 5.4 or less, about 5.0 or less (e.g., about 5 or less), about 4.7 or less, about 4.4 or less, about 4.0 or less (e.g., about 4 or less), about 3.7 or less, or about 3.5 or less. In aspects, a ratio of the second thickness 337 to the first thickness 327 can be in a range from about 3.0 to about 8 (e.g., from 3 to 8), from about 3.0 to about 7 (e.g., from 3 to 7), from about 3.0 to about 6.5, from about 3.0 to about 6.0 (e.g., from 3 to about 6), from about 3.0 to about 5.7, from about 3.0 to about 5.4, from about 3.0 to about 5.0 (e.g., from 3 to 5), from about 3.3 to about 4.7, from about 3.5 to about 4.4, from about 3.8 to about 4.0, or any range or subrange therebetween. Alternatively, although not shown, the first thickness 327 may be greater than the second thickness 337 (where the subscripts of the ratios and color difference defined below would be switched so that subscript 1 refers to the region with the lower thickness, and the order of the thicknesses in the thickness ratio would be switched) by 50 µm or more, by 100 µm or more, by 150 µm or more, by 200 µm or more, by 300 µm or more, by 500 µm or more.

As shown in FIGS. 3-4, the perimeter 340 forms a closed loop on the major surface (e.g., second major surface 330), where a shape of the perimeter 340 may be rectilinear, curved, or curvilinear and can comprise any shape (e.g., square, blocky, ziggurat-shaped with rectangular rows of diminishing length overlaying one another, triangular, oval, or even more complex geometries). For example, the perimeter 340 of the structure 326 may be shaped as a silhouette of a logo and/or registered trademark or other recognizable design or shape. As used herein, a surface area of the structure is defined as the surface area within the perimeter of the structure projected onto the first major surface of the glass article. In aspects, a surface area of the structure 326 may be 100 cm$^2$ or less, 50 cm$^2$ or less, 25 cm$^2$ or less, 25 µm$^2$ or more, 100 µm$^2$ or more, 1 mm$^2$ or more, 25 mm$^2$ or more, or 4 cm$^2$ or more. In aspects, the glass article can comprise a housing of a communicating device and the glass article may have more than one such structure, as shown in FIG. 3, where the structure 326 overlays the antenna 314 while another structure 342 forms a portion of a camera or sensor encasement (e.g., camera 316). In further aspects, the structure 326 and/or 342 can overlay at least a portion and/or all of the surface area corresponding to the antenna 314 and/or the camera 316.

Forming the structure 326 and/or 342 in a middle or interior portion of the glass article 350, spaced inward from outside edges 344 of the glass article 350 (see, FIG. 3) may help mitigate structural weaknesses or stress concentrations of the glass article 350 that may be associated forming the structure 326 and/or 342. Forming edges or corners 334 and/or 336 (see FIGS. 4A-4B) or the perimeter 340 of the structure 326 with a geometry that reduces concentration of stress at the edges or corners 334 and/or 336 may also help strengthen the glass article 350 when forming the structure 326. Such a geometry may include rounding or dulling vertices or corners 334 and/or 336 of the structure 326, as may be done through etching or localized melting/heating (e.g., with a laser). For example, the glass article 350 may smoothly transition between the second thickness 337 and the first thickness 327 at corner 334 and/or 336 over a distance "D" (see FIG. 4A) from 5 µm to 700 µm, from 10 µm to 500 µm, about 20 µm to 500 µm, from 100 µm to 500 µm, or any range or subrange therebetween, as measured in a direction perpendicular to a direction of the second thickness 337.

Throughout the disclosure, CIE color coordinates describe the CIELAB 1976 color space established by the International Commission on Illumination (CIE). Unless otherwise indicated, CIE color coordinates are measured in transmission through the glass article using an F02 illuminant and an observer angle of 10°. The CIELAB 1976 color space expresses color as three values: L* for the lightness from black (0) to white (100), a* from green (−) to red (+), and b* from blue (−) to yellow (+).

FIG. 5 illustrate natively colored glass housings 500 comprising the glass article 511 and the reflector 501. In aspects, the reflector 501 comprises an opaque material. As used herein, opaque means that an average transmittance in the wavelength range of 400 nm to 700 nm through a 1.0 mm thick piece of the material is 10% or less. The average transmittance in the wavelength range of 400 nm to 700 nm is calculated by measuring the transmittance of whole number wavelengths from about 400 nm to about 700 nm and averaging the measurements. In aspects, the reflector comprises a CIE L* value of about 70 or more. An exemplary material for the reflector is aluminum. In further aspects, the reflector can be coated with a reflective coating (e.g., paint, TiO$_2$). In aspects, as shown in FIGS. 5, the glass article 511 can be disposed on and/or contact a surface 503 of the reflector 501 can contact the glass article 511. Providing the reflector can increase a perceived brightness of the glass article.

Unless otherwise indicated, transmittance data (total transmittance and diffuse transmittance) in the visible spectrum is measured with a Lambda 950 UV/Vis/NIR Spectrophotometer manufactured by PerkinElmer Inc. (Waltham, Massachusetts USA). The Lambda 950 apparatus was fitted with a 150 mm integrating sphere. Data was collected using an open beam baseline and a Spectralon® reference reflectance disk. For total transmittance (Total Tx), the sample is fixed at the integrating sphere entry point. The term "average transmittance," as used herein with respect to the visible spectrum, refers to the average of transmittance measurements made within a given wavelength range with each whole numbered wavelength weighted equally. Unless otherwise indicated, as described herein, the "average transmittance" with respect to the visible spectrum is reported over the wavelength range from 380 nm to 750 nm (inclusive of endpoints). Unless otherwise specified, the average transmittance is indicated for article thicknesses from 0.4 mm to 5 mm, inclusive of endpoints. Unless otherwise specified, when average transmittance is indicated, this means that each thickness within the range of thicknesses from 0.4 mm to 5 mm has an average transmittance as specified. For example, colored glass articles having average transmittances of 10% to 92% over the wavelength range from 380 nm to 750 nm means that each thickness within the range of 0.4 mm to 5 mm (e.g., 0.6 mm, 0.9 mm, 2 mm, etc.) has an average transmittance in the range of 10% to 92% for the wavelength range from 380 nm to 750 nm.

As used herein, if a first layer and/or component is described as "disposed over" a second layer and/or component, other layers may or may not be present between the first layer and/or component and the second layer and/or component. Furthermore, "disposed over" does not refer to a relative position with reference to gravity. For example, a first layer and/or component can be considered "disposed over" a second layer and/or component, for example, when the first layer and/or component is positioned underneath, above, or to one side of a second layer and/or component. As used herein, a first layer and/or component described as "bonded to" a second layer and/or component means that the layers and/or components are bonded to each other, either by direct contact and/or bonding between the two layers and/or components or via an adhesive layer. As used herein, a first layer and/or component described as "contacting" or "in contact with" a second layer and/or components refers to direct contact and includes the situations where the layers and/or components are bonded to each other.

Figure 6:
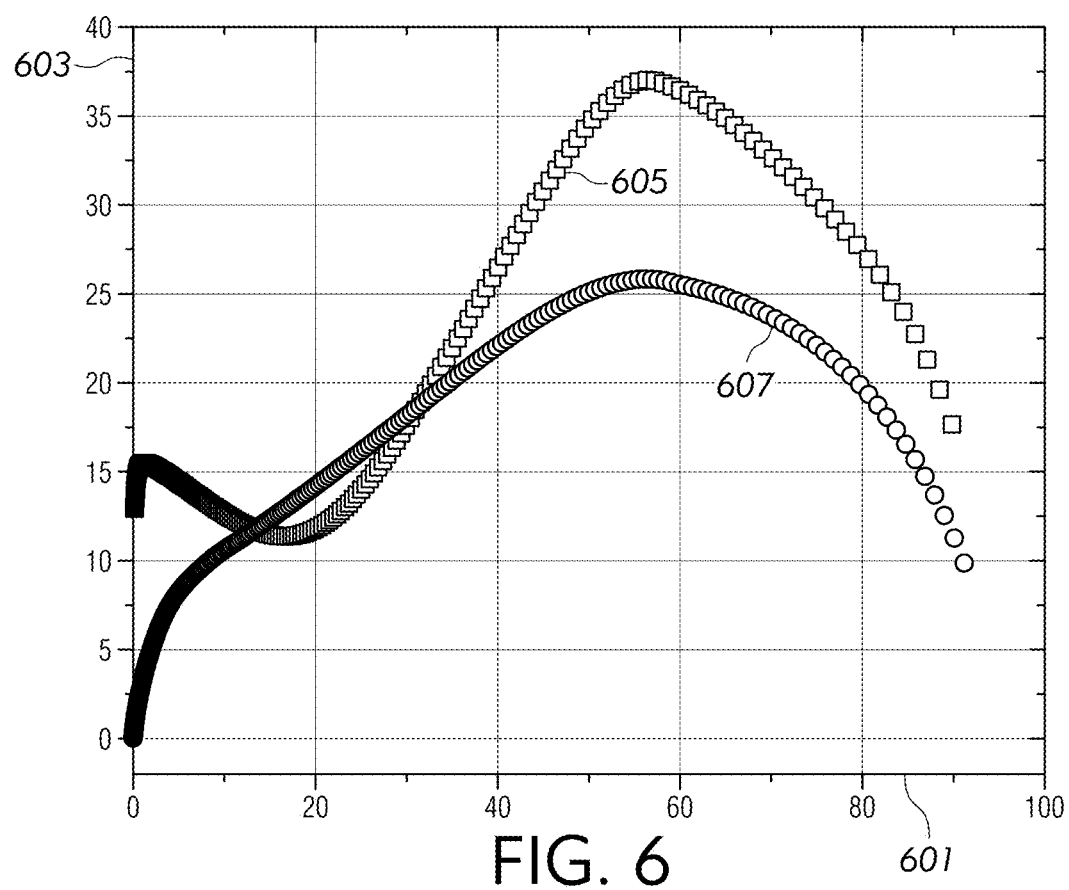
FIG. 6 illustrates a relationship between CIE $L_1$* values and color difference dE94 for glass articles with a blue color.

As shown in FIGS. 5-6, the glass article 511 comprises a first portion comprising a third major surface 523 and a fourth major surface (e.g., shown as coplanar with and/or forming a unitary surface depicted as a second major surface 515) opposite the third major surface 523. In aspects, as shown, the third major surface 523 and/or the fourth major surface (e.g., second major surface 515) can comprise planar surfaces, although other shapes and designs are possible in other aspects. A first thickness 527 of the glass article 511 is defined as an average distance between the third major surface 523 and the fourth major surface (e.g., second major surface 515). In aspects, the first thickness 527 can be about 20 µm or more, 40 µm or more, 100 µm or more, 150 µm or more, 200 µm or more, 300 µm or more, 500 µm or more, 700 µm or more, 1 mm or less, 800 µm or less, 600 µm or less, 500 µm or less, or 400 µm or less, 300 µm or less, 200 µm or less, 180 µm or less, 150 µm or less, 120 µm or less, 100 µm or less, 80 µm or less, 60 µm or less. In aspects, the first thickness 527 can be in a range from 20 µm to 1 mm, from 40 µm to 800 µm, from 100 µm to 700 µm, from 150 µm to 600 µm, from 200 µm to 500 µm, from 300 µm to 400 µm, or any range or subrange therebetween. In aspects, the first thickness 527 can be about 500 µm or less, for example, in a range from 20 µm to 500 µm, from 20 µm to 400 µm, from 20 µm to 300 µm, from 40 µm to 200 µm, from 100 µm to 180 µm, or any range or subrange therebetween. The glass article 511 further comprises a second portion comprising first major surface 513 and a second major surface 515 opposite the first major surface 513. In aspects, as shown, the first major surface 513 and/or the second major surface 515 can comprise planar surfaces, although other shapes and designs are possible in other aspects. A second thickness 517 of the glass article 511 is defined as an average distance between the first major surface 513 and the second major surface 515. In aspects, the second thickness 517 can be 100 µm or more, 300 µm or more, 400 µm or more, 500 µm or more, 600 µm or more, 700 µm or more, 800 µm or more, 5 mm or less, 4 mm or less, 3 mm or less, 2 mm or less, 1 mm or less, 800 µm or less, or 500 µm or less. In aspects, the second thickness 517 can be in a range from 100 µm to 5 mm, from 300 µm to 4 mm, from 400 µm to 3 mm, from 500 µm to 3 mm, from 600 µm to 2 mm, from 700 µm to 2 mm, from 800 µm to 1 mm, or any range or subrange therebetween.

In aspects, a ratio of the second thickness 517 to the first thickness 527 can be about 3.0 or more (e.g., about 3 or more), about 3.3 or more, about 3.5 or more, about 3.8 or more, about 4.0 or more (e.g., about 4 or more), about 4.3 or more, about 4.5 or more, about 4.8 or more, about 5.0 or more (e.g., about 5 or more), about 5.5 or more, about 8 or less, about 7 or less, about 6.5 or less, about 6.0 or less (e.g., about 6 or less), about 5.7 or less, about 5.4 or less, about 5.0 or less (e.g., about 5 or less), about 4.7 or less, about 4.4 or less, about 4.0 or less (e.g., about 4 or less), about 3.7 or less, or about 3.5 or less. In aspects, a ratio of the second thickness 517 to the first thickness 527 can be in a range from about 3.0 to about 8 (e.g., from 3 to 8), from about 3.0 to about 7 (e.g., from 3 to 7), from about 3.0 to about 6.5, from about 3.0 to about 6.0 (e.g., from 3 to about 6), from about 3.0 to about 5.7, from about 3.0 to about 5.4, from about 3.0 to about 5.0 (e.g., from 3 to 5), from about 3.3 to about 4.7, from about 3.5 to about 4.4, from about 3.8 to about 4.0, or any range or subrange therebetween. As discussed herein, providing a thickness ratio from 3 to 8 (e.g., from 3 to 5) can produce a noticeable and aesthetically pleasing between the first region and the second region of the glass article.

As discussed herein, the glass article and/or the natively colored glass housing have a first region and a second region, where the CIE color coordinates of the first region ($L_1$, $a_1$, $b_1$) are different from the CIE color coordinates of the second region ($L_2$, $a_2$, $b_2$). Throughout the disclosure a naïve color difference dE is defined as $dE=\Pi[(L_1-L_2)^2+(a_1-a_2)^2+(b_1-b_2)^2]$. Throughout the disclosure, a color difference dE94 is defined as:

$$dE94 = \sqrt{\left[((L_1-L_2)/K_L)^2 + (dC/S_C)^2 + (dH/S_H)^2\right]}, \text{ where}$$

$$dC = C_1 - C_2,$$

$$C_1 = \sqrt{[a_1^2 + b_1^2]},$$

$$C_2 = \sqrt{[a_2^2 + b_2^2]},$$

$$dH = \sqrt{\left[(a_1-a_2)^2 + (b_1-b_2)^2 - (C_1-C_2)^2\right]}$$

$$S_C = 1 + 0.045 \times C_1, \text{ and}$$

$$S_H = 1 + 0.015 \times C_1.$$

As noted above, the first region (with the first thickness less than the second thickness) is taken as subscript 1. As discussed below with reference to FIG. 9, dE and dE94 do not directly correspond to one another. Instead, dE94 is weighed to better represent the color difference perceived by the human eye than dE. Throughout the disclosure, an a* ratio is defined as $a_2/a_1$, and a b* ratio is defined as $b_2/b_1$. Unless otherwise indicated, the examples discussed herein and the data illustrated in the figures are for a thickness ratio (second thickness divided by the first thickness) is 4.0, although it is expected that other thickness ratios within the ranges discussed herein (e.g., from 3 to 8 or from 3 to 5) exhibit similar relationships. Although not shown, examination of different thickness ratios showed that the entire dE94 curve (e.g., FIGS. 6, 13, 18, and 24) is shifted up (to higher color difference dE94) as the thickness ratio increases and that the entire dE94 curve is shifted down (to lower color difference dE94) as the thickness ratio decreases.

Although two regions of different thickness are shown in FIGS. 4A and 5, it is to be understood that the glass articles of the present disclosure can provide two or more regions with different thicknesses that are associated with different colors despite the glass article comprising substantially the same composition. These different colors can highlight one or more particular features to a user of the corresponding device (e.g., smart phone, tablet, watch), such as a location of an antenna, a camera, a sensor, a logo, and/or other electronics of features. For example, such highlighted identification may help a user of the corresponding device quickly orient the device and/or achieve a handhold thereof for a particular purpose (e.g., receiving a line-of-sight transmission, sensing a particular item, instantly snapping a photo of a moving target). Without sufficient contrast, such feature(s) may otherwise blend in or be hidden within the surrounding structure of the device, which could delay and/or interfere with the intended use of the electronics and/or feature(s). For example, the glass article can provide three or more regions with different thicknesses that have different colors (i.e., are sufficiently contrasting tones to be noticeable by a user). It is to be understood that glass articles can have any number of different regions with associated different thicknesses and colors with sufficiently contrasting tones (e.g., 2 or more, 3 or more, 4 or more, 5 or more, 6 or more, 8 or more, 10 or more, from 2 to 100, from 3 to 50, from 4 to 30, from 50 to 20, from 6 to 10, or any range or subrange therebetween).

In aspects, the color difference dE94 can be 10 or more, 11 or more, 12 or more, 13 or more, 14 or more, 15 or more, 17 or more, 20 or more, 70 or less, 60 or less, 50 or less, 40 or less, 35 or less, 30 or less, 27 or less, 25 or less, 22 or less, or 20 or less. In aspects, the color difference dE94 can be in a range from 10 to 70, from 10 to 60, from 11 to 50, from 11 to 40, from 12 to 35, from 13 to 35, from 14 to 35, from 15 to 30, from 17 to 30, from 20 to 30, from 20 to 27, from 20 to 25, or any range or subrange therebetween. In aspects, the color difference dE94 can be in a range from 11 to 25, from 11 to 30, from 11 to 27, from 11 to 25, from 11 to 22, from 12 to 22, from 15 to 22, from 17 to 20, or any range or subrange therebetween. As demonstrated by the Examples herein, noticeable and/or aesthetically pleasing color differences between the regions of the glass article for dE94 of 10 or more (e.g., from 12 to 35 or from 11 to 22) when the CIE L* value of the first region is 30 or more. Without wishing to be bound by theory, it is believed that glasses having CIELAB color coordinates within the range of CIE L* values from 30 to 96 are transparent to wavelengths of visible light (i.e., wavelengths of light from 380 nm to 750 nm, inclusive of endpoints) rather than opaque while still provided a noticeable color. Glass articles with a CIE L* value greater than 96.5 may appear as colorless, and/or glass articles with a CIE L* value less than 30 may appear as black.

In aspects, as shown in FIG. 5 when the natively colored glass article (e.g., glass article 511) is used in combination with the reflector 501, a color difference between the different regions of the glass article 511 by the user may greater than the color difference dE94 measured as described above. Even when the reflector 501 is coated with a white color (e.g., $TiO_2$), the user perceived color difference, can be greater than (e.g., about twice as great as) the color difference dE94 measured as described above. Without wishing to be bound by theory, ambient light may pass through the glass article 511 to the reflector 501 before being reflected to pass through the glass article 511 a second time before being perceived by a user, which can result in an effective path length of the light through the glass article 511 of about twice the corresponding thickness of the corresponding region of the glass article. The effective path length being about twice the corresponding thickness of the glass article can roughly double the absorption (e.g., based on the Beer-Lambert law) of predetermined wavelengths by the colorant package, resulting in more distinctive colors and thus greater color difference dE94 values between portions of the glass article. For example, an apparent color difference to a view corresponding to a color difference dE94 of 10 can be obtained with a natively colored glass article with a color difference dE94 of 4.5 or more or 5.0 or more (as measured herein) when used in combination with a reflector (e.g., an opaque reflector having a CIE L* value of 70 or more).

In aspects, for example when the natively colored glass article (e.g., glass article 511) is used in combination with the reflector, at least some utility can be provided by different colors associated with different regions, when the color difference dE94 of the glass article (as described above—measured without the reflector in FIG. 5) can be about 1.0 or more, about 1.5 or more, about 2.0 or more, about 2.5 or more, about 3.0 or more, about 4.5 or more, about 5.0 or more, about 5.5 or more, about 6.0 or more, about 6.5 or more, about 7.5 or more, about 8.0 or more, about 8.5 or more, about 9.0 or more, about 9.5 or more, about 10.0 or more, about 11.0 or more, about 12.0 or more, about 13.0 or more, about 14.0 or more, about 15.0 or more, about 17.0 or more, or about 20.0 or more. In aspects, for example when the natively colored glass article (e.g., glass article 511) is used in combination with the reflector, at least some utility can be provided by different colors associated with different regions, when the color difference dE94 of the glass article (as described above—measured without the reflector in FIG. 5) can be in a range from about 1.0 to about 70, from about 1.5 to about 60, from about 2.0 to about 50, from about 2.5 to about 40, from about 3.0 to about 35, from about 3.5 to about 30, from about 4.0 to about 27, from about 4.5 to about 25, from about 5.0 to about 22, from about 5.5 to about 20, from about 6.0 to about 17, from about 6.5 to about 15, from about 7.0 to about 12, from about 7.5 to about 10, or any range or subrange therebetween. In aspects, for example when the natively colored glass article (e.g., glass article 511) is used in combination with the reflector, there can be sufficient contrast in color between regions of the glass article to perform a marking utility. In further aspects, the color difference dE94 the glass article (as described above—measured without the reflector in FIG. 5) can be in a range from 4.5 to about 70, from about 5.0 to about 60, from about 5.5 from about 50, from about 6.0 to about 40, from about 6.5 to about 35, from about 7.0 to about 30, from about 7.5 to about 27, from about 8.0 to about 25, from about 8.5 to about 22, from about 9.0 to about 20, from about 9.5 to about 17, from about 10.0 to about 16, or any range or subrange therebetween. In aspects, preferred ranges for the color difference dE94 (e.g., when used with a reflector) can be from about 4.5 to about 70, from about 10 to about 40, or from about 11 to about 22.

In aspects, the CIE L* value of the first region (e.g., $L_1$) can be 30 or more, 35 or more, 40 or more, 45 or more, 50 or more, 60 or more, 70 or more, 75 or more, 80 or more, 83 or more, 85 or more, 87 or more, 90 or more, 96 or less, 95 or less, 94 or less, 93 or less, 92 or less, 91 or less, 90 or less, 88 or less, 86 or less, 84 or less, 82 or less, 80 or less, 75 or less, 70 or less, 65 or less, 60 or less, 55 or less, 45 or less, or 40 or less. In aspects, the CIE L* value of the first region can be in a range from 30 to 96, from 35 to 95, from 40 to 94, from 50 to 93, from 60 to 92, from 70 to 91, from 75 to 90, from 80 to 88, from 83 to 86, or any range or subrange therebetween. In aspects, the CIE L* value of the first region can be about 75 or less, for example in a range from 30 to 75, from 30 to 70, from 35 to 65, from 40 to 60, from 45 to 55, from 45 to 50, or any range or subrange therebetween. In aspects, the CIE L* value of the first region can be about 80 or more, for example, in a range from 80 to 96, from 80 to 95, from 83 to 94, from 85 to 93, from 87 to 93, from 90 to 92, or any range or subrange therebetween. Providing a CIE L* value of the first region of 30 or more can enable a noticeable color difference, for example, by ensuring that at least one of the regions produces a color that is not perceived as black. For example, glass articles associated with a blue color or a green color can produce a noticeable color difference for a CIE L* value of the first region of 30 or more (e.g., from 30 to 96 or from 35 to 65). Glass articles associated with a red or orange color can produce a noticeable color difference for a CIE L* value of the first region of 50 or more and/or produce colors of both regions that are perceived as non-black for a CIE L* value of the first region of 80 or more (e.g., from 80 to 96, from 80 to 86, or from 85 to 93). Glass articles associated with a yellow or amber color can produce a noticeable color difference for a CIE L* value of the first region of 80 or more (e.g., from 80 to 96, from 80 to 86, or from 85 to 93).

Without wishing to be bound by theory, the CIE L* value of the second region ($L_2$) will be less than or equal to $L_1$ since the greater thickness of the second region is associated with more light absorption (and a lower CIE L* value) than that of the first region. In aspects, the CIE L* value of the second region can be 20 or more, 25 or more, 30 or more, 35 or more, 40 or more, 45 or more, 50 or more, 55 or more, 60 or more, 65 or more, 70 or more, 75 or more, 80 or more, 85 or more, 90 or more, 96 or less, 95 or less, 94 or less, 92 or less, 90 or less, 88 or less, 85 or less, 83 or less, 80 or less, 75 or less, 70 or less, 65 or less, 60 or less, 55 or less, 50 or less, 45 or less, 40 or less, or 35 or less. In aspects, the CIE L* value of the second region can be in a range from 20 to 96, from 20 to 95, 20 to 94, from 25 to 92, from 30 to 92, from 35 to 90, from 40 to 88, from 45 to 85, from 50 to 83, from 55 to 80, from 60 to 75, from 65 to 70, or any range or subrange therebetween. In aspects, the CIE L* value of the second region can be 50 or more, for example, in a range from 50 to 96, from 50 to 95, 50 to 94, from 50 to 92, from 55 to 90, from 60 to 88, from 65 to 85, from 70 to 82, from 75 to 80, or any range or subrange therebetween.

In aspects, the glass article 350 and/or 350 (e.g., first region and/or second region) can exhibit a green color. In further aspects, the first CIE L* value can be within one or more of the corresponding ranges discussed above, for example, from 80 to 96 (e.g., from 80 to 86 or from 85 to 93). In further aspects, the second CIE L* value can be within one or more of the corresponding ranges discussed above, for example, from 30 to 92 or from 50 to 92. In further aspects, the first CIE a* value can be less than 0 (e.g., −0.3 or less) and the first CIE b* value can be 0.0 or more to exhibit a green color. In further aspects, the first CIE a* value can be about −0.3 or less, −0.4 or less, −0.5 or less, −1.0 or less, −2 or less, −5 or less, −8 or less, −10 or less, −12 or less, −15 or less, −40 or less, −30 or less, −25 or less, −22 or less, −20 or less, −18 or less, −16 or less, −14 or less, −12 or less, −10 or less, −8 or less, −6 or less, −4 or less, or −2 or less. In further aspects, the first CIE a* value can be in a range from −40 to −0.3, from −30 to −0.4, from −25 to −0.5, from −25 to −1.0, from −22 to −2, −20 to −5, from −18 to −8, from −16 to −10, from −14 to −12, or any range or subrange therebetween. In further aspects, the second CIE a* value can be within one or more of the above-mentioned ranges for the first CIE a* value, for example, from −0.4 to −30. In further aspects, the first CIE b* value can be 0.0 or more, 0.2 or more, 0.5 or more, 0.8 or more, 1.0 or more, 2 or more, 5 or more, 8 or more, 10 or more, 12 or more, 15 or more, 40 or less, 35 or less, 30 or less, 25 or less, 20 or less, 18 or less, 15 or less, 12 or less, 10 or less, 5 or less, or 2 or less. In further aspects, the first CIE b* value can be in a range from 0.0 to 40, from 0.2 to 35, from 0.5 to 30, from 1.0 to 25, from 2 to 20, from 5 to 18, from 8 to 15, from 10 to 12, or any range or subrange therebetween. In further aspects, the second CIE b* value can be within one or more of the ranges discussed above for the first CIE b* value.

Figure 14:
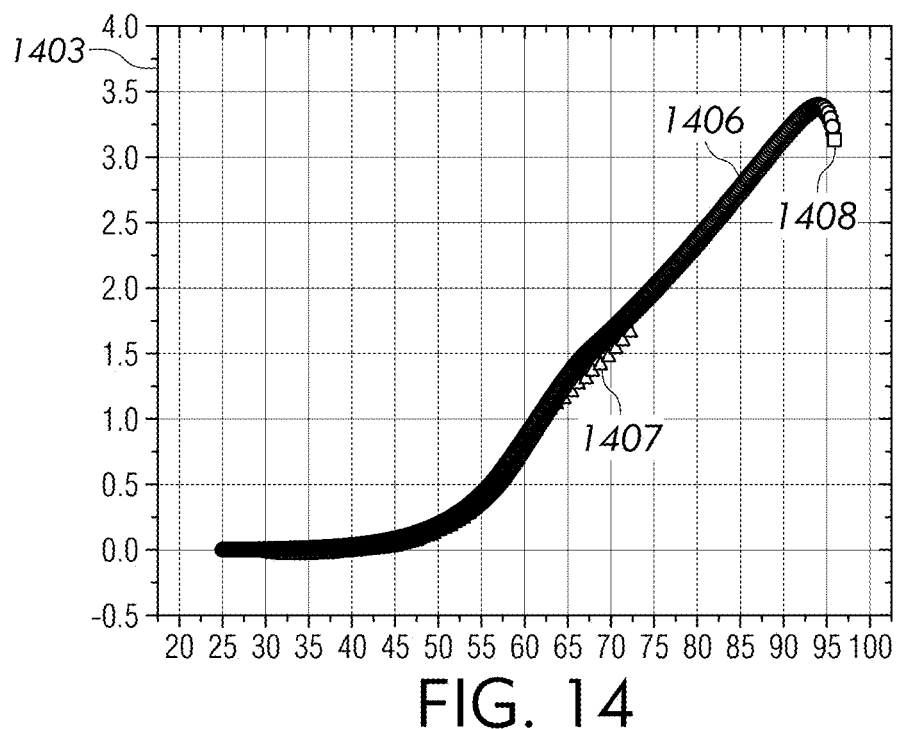
FIG. 14 illustrates a relationship between CIE $L_1$* values and an a* ratio for different concentrations of colorant packages, for example, associated with a green color.

As used herein, an "a* ratio" is defined as the second CIE a* value divided by the first CIE a* value. In further aspects, the a* ratio (of a glass article exhibiting a green color) can be about 2.0 or more, about 2.2 or more, about 2.5 or more, about 2.7 or more, about 3.0 or more, about 4.0 or more, about 5.0 or more, about 8.0 or less, about 7.0 or less, about 6.0 or less, about 5.0 or less, about 4.0 or less, about 3.5 or less, about 3.2 or less, about 3.0 or less, about 2.8 or less, about 2.6 or less, or about 2.4 or less. In further aspects, the a* ratio (of a glass article exhibiting a green color) can be in a range from about 2.0 to about 8.0, from about 2.0 to about 7.0, from about 2.0 to about 6.0, from about 2.0 to about 5.0, from about 2.0 to about 4.0, about 2.0 to about 3.5, from about 2.2 to about 3.2, from about 2.5 to about 3.0, from about 2.7 to about 2.8, or any range or subrange therebetween. In aspects, the a* ratio can be about 3.0 or more, for example, in a range from about 3.0 to about 8.0, from about 4.0 to about 7.0, from about 5.0 to about 6.0, or any range or subrange therebetween. In aspects, an upper limit of the a* ratio can be taken as the thickness ratio (discussed above). As shown in FIG. 14, curves 1406, 1407, and 1408 exhibit an a* ratio (as indicated by the vertical axis 1403) greater than 2.0 (e.g., from 2.0 to 3.5 or from 2.2 to 3.2) for first CIE L* values (as indicated by the horizontal axis 1401) of 80 or more (e.g., from 80 to 96, from 80 to 86, or from 85 to 93). Also, as shown in FIG. 14, curves 1406, 1407, and 1408 largely superimpose on one another. Also, the portion of these curves for first CIE L* values of 60 or more (e.g., 70 or more, 80 or more, or 85 or more) is substantially linear. Consequently, in further aspects, the natively colored glass article can satisfy the relationship |(a* ratio)−0.09×(first L* value)+4.8|<0.1.

Figure 17:
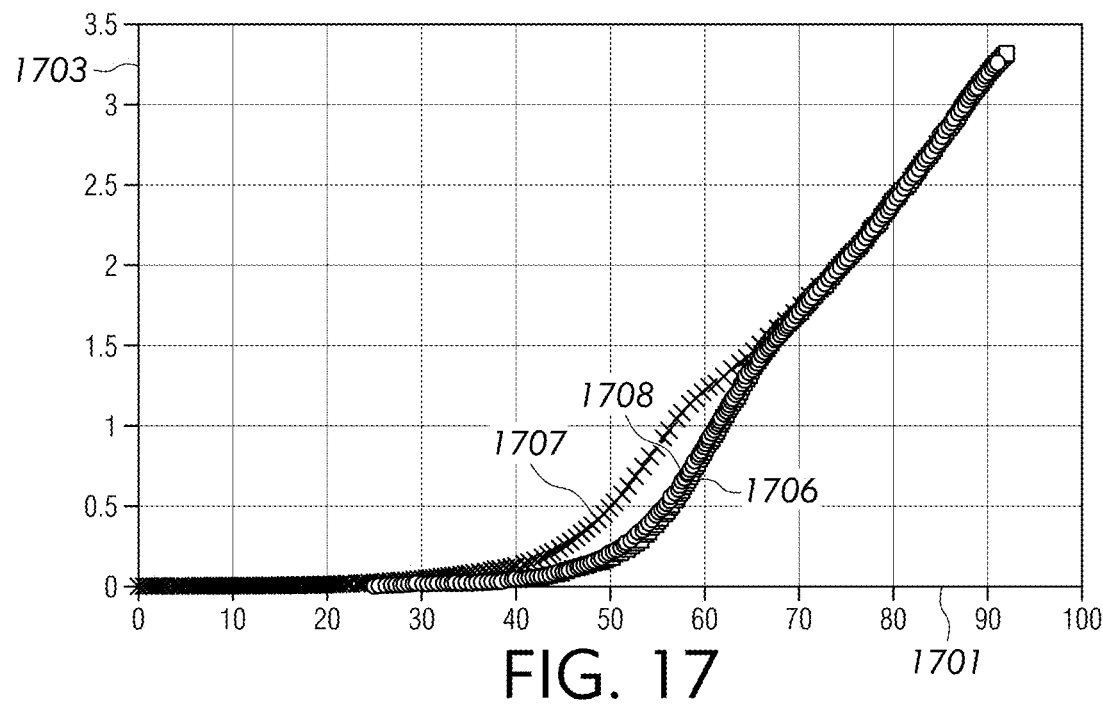
FIG. 17 illustrates a relationship between CIE $L_1^*$ values and a b* ratio for different concentrations of colorant packages, for example, associated with a green color.

As used herein, an "b* ratio" is defined as the second CIE b* value divided by the first CIE b* value. In further aspects, the b* ratio (of a glass article exhibiting a green color) can be about 1.5 or more, about 1.7 or more, about 2.0 or more, about 2.2 or more, about 2.5 or more, about 2.7 or more, about 3.0 or more, about 3.5 or more, about 4.0 or more, about 5.0 or more, about 8.0 or less, about 7.0 or less, about 6.0 or less, about 5.0 or less, about 4.0 or less, about 3.5 or less, about 3.2 or less, about 3.0 or less, about 2.8 or less, about 2.6 or less, about 2.4 or less, about 2.2 or less, about 2.0 or less, or about 1.8 or less. In further aspects, the b* ratio (of a glass article exhibiting a green color) can be in a range from about 1.5 to about 8.0, from about 1.5 to about 7.0, from about 1.5 to about 6.0, from about 1.5 to about 5.0, from about 1.5 to about 4.0, from about 1.5 to about 3.5, from about 1.5 to about 3.2, from about 1.7 to about 3.0, from about 2.0 to about 2.8, from about 2.3 to about 2.6, from about 2.3 to about 2.4, or any range or subrange therebetween. In further aspects, the b* ratio can be about 2.0 or more, for example, from about 2.0 to about 8.0, from about 2.0 to about 7.0, from about 2.0 to about 6.0, from about 2.0 to about 5.0, from about 2.0 to about 4.0, from about 2.0 to about 3.5, from about 2.0 to about 3.2, from about 2.3 to about 3.0, from about 2.4 to about 2.8, from about 2.5 to about 2.6, or any range or subrange therebetween. In further aspects, the b* ratio can be about 3.0 or more, for example, in a range from about 3.0 to about 8.0, from about 3.5 to about 7.0, from about 4.0 to about 6.0, from about 4.0 to about 5.0, or any range or subrange therebetween. In aspects, an upper limit of the b* ratio can be taken as the thickness ratio (discussed above). As shown in FIG. 17, curves 1706, 1707, and 1708 exhibit an b* ratio (as indicated by the vertical axis 1703) greater than 1.5 (e.g., from 1.5 to 3.2 or from 2.3 to 3.0) for first CIE L* values (as indicated by the horizontal axis 1701) of 65 or more (e.g., 70 or more, 80 or more, from 80 to 96, from 80 to 86, or from 85 to 93). Also, as shown in FIG. 17, curves 1706, 1707, and 1708 largely superimpose on one another for a first CIE L* value greater than 65. Also, the portion of these curves for first CIE L* values of 65 or more (e.g., 70 or more, 80 or more, or 85 or more) is substantially linear. Consequently, in further aspects, the natively colored glass article can satisfy the relationship |(b* ratio)−0.077×(first CIE L* value)+3.8|<0.05. Based on the relationships noted in FIGS. 14 and 17, in further aspects, the natively colored glass article can satisfy the relationship |(a* ratio)−1.17×(b* ratio)−0.36|<0.1.

Figure 13:
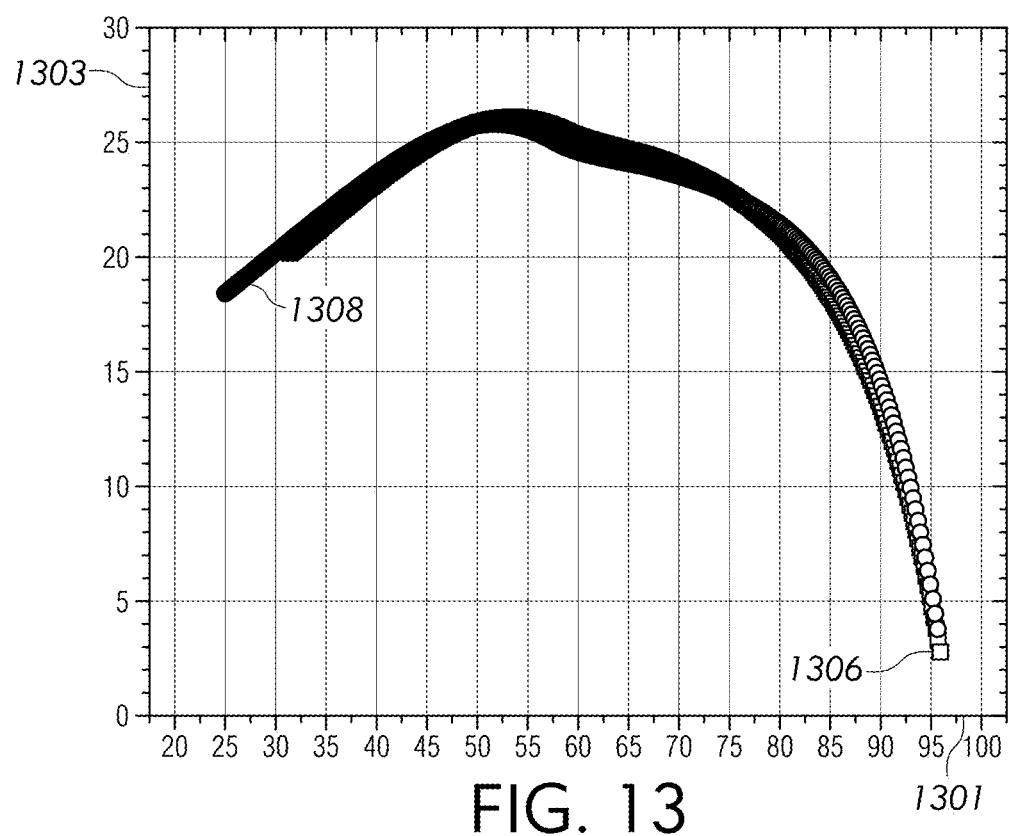
FIG. 13 illustrates a relationship between CIE $L_1$* values and color difference dE94 for glass articles with a green color.

In further aspects, the color difference dE94 (of a glass article exhibiting a green color) can be about 10 or more, about 12 or more, about 14 or more, about 16 or more, about 18 or more, about 20 or more, about 30 or less, about 27 or less, about 25 or less, about 22 or less, about 20 or less, about 17 or less, or about 15 or less, for example, from about 10 to about 30, from about 12 to about 27, from about 14 to about 25, from about 16 to about 22, from about 18 to about 20, or any range or subrange therebetween. As shown in FIG. 13, the curves 1306 and 1308 exhibit a dE94 value (as indicated by the vertical axis 1303) greater than about 3 concurrent with a first CIE L* value (as indicated by the horizontal axis 1301) of 30 or more. For a first L* value for from 30 to 92 (e.g., 50 or more, 80 or more, from 80 to 96, from 80 to 86, or from 85 to 93), the color difference dE94 is 10 or more. In further aspects, as discussed above, a lower color difference dE94 can provide a marking utility when used with a reflector, for example, the color difference dE94 can be from about 3.0 to about 30, from about 3.5 to about 30, from about 4.0 to about 27, from about 4.5 to about 27, from about 5.0 to about 25, from about 5.5 to about 25, from about 6.0 to about 22, from about 6.5 to about 22, from about 7.0 to about 20, from about 7.5 to about 20, from about 8.0 to about 17, from about 8.5 to about 17, from about 9.0 to about 15, from about 9.5 to about 15, or any range or subrange therebetween. In further aspects, preferred ranges for the color difference dE94 can be in a range from 3.0 to 30, from 5.0 to 27, or from 10 to 27.

Figure 16A:
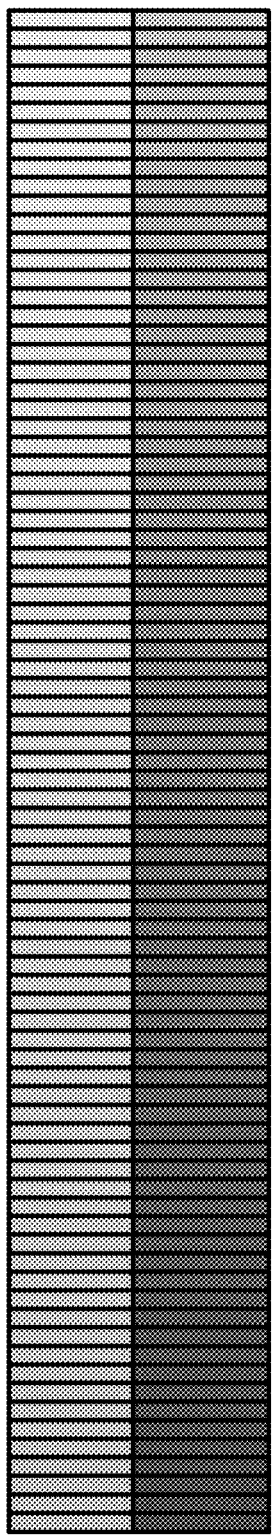
FIGS. 16A-16C illustrate colors of the different regions in the glass article for different concentrations of another colorant package associated with a green color.
Figure 16B:
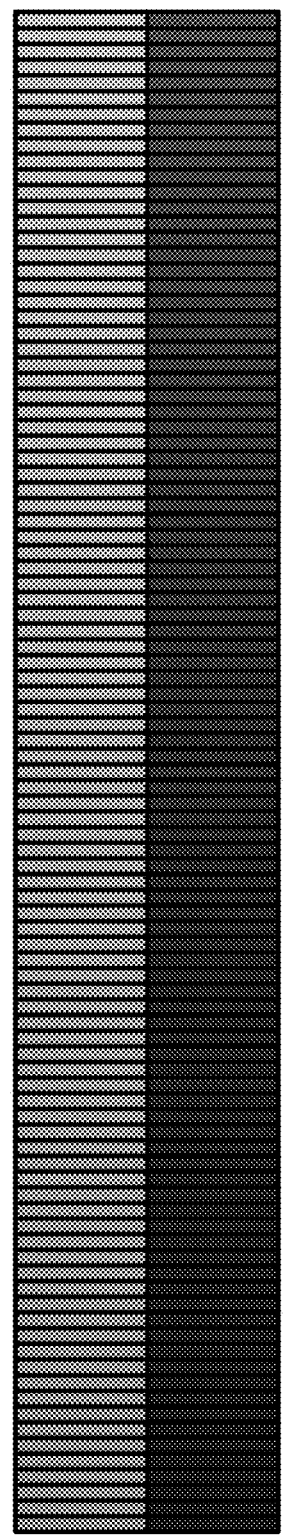
Figure 16C:
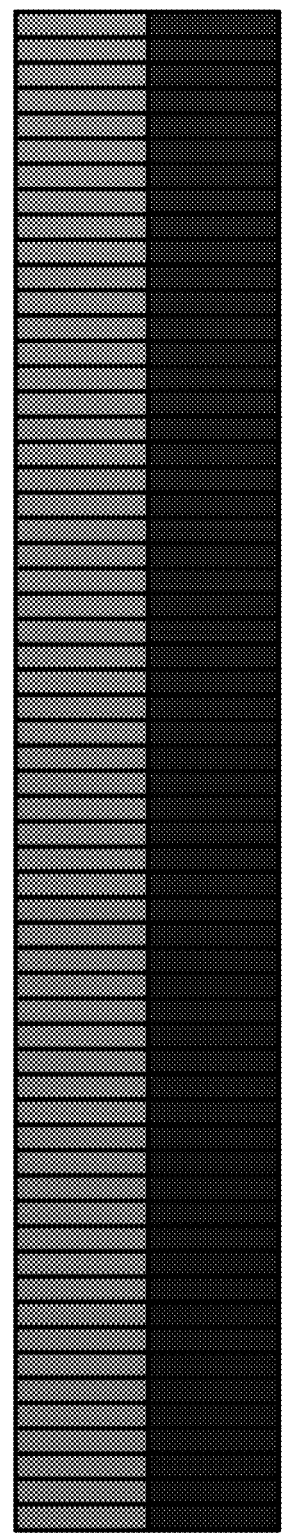

FIGS. 16A-16C illustrates pairs of colors that would be exhibited for a second colorant package (Package B) at a thickness ratio of 4.0 for different concentrations of the colorant package (in terms of relative concentration) with the left color corresponding to the first region and the right color corresponding to the second region. From top to bottom, FIG. 16A shows relative concentrations from 2.4 to 10.2, FIG. 16B shows relative concentrations from 10.5 to 20.2, and FIG. 16C shows relative concentrations from 20.5 to 26.2. Consequently, the L* value at each relative concentration decreases going from FIG. 16A to FIG. 16C and from top to bottom of each series. In FIG. 16C, the right color (second portion) is quite dark and may be perceived as black; however, the contrast in color is easily perceptible. In FIG. 16C, the first portion (left) can be perceived as a fern green. Towards the top of FIG. 16B (and from the bottom of FIG. 16A), the right color can be perceived as a non-black color (e.g., green) to provide two non-black colors that are perceptibly different. For example, in FIG. 16B, the first portion (left) can be perceived as an emerald green and the second portion (right) can be perceived as sea green. In FIG. 16A, the first portion (left) can be perceived as a light pastel green and the second portion (right) can be perceived as a spruce green. In view of the results discussed in FIG. 13, the pairs of colors in FIG. 16A exhibit a dE94 of 10 or more.

Figure 15A:
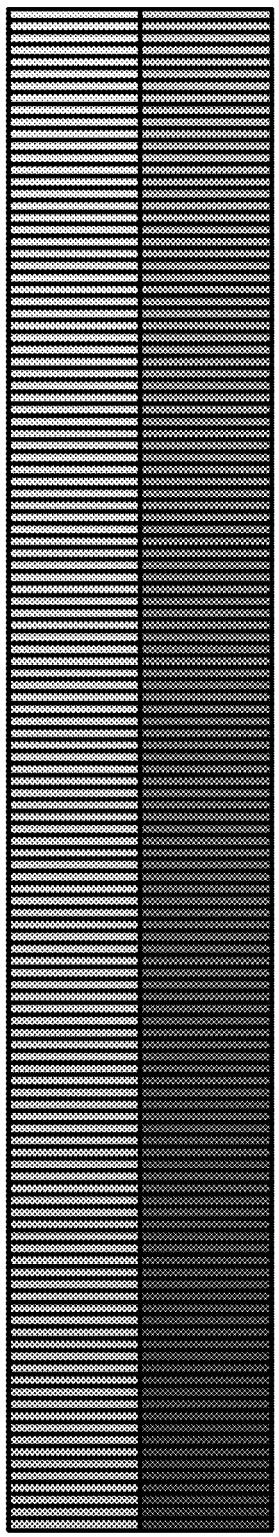
FIGS. 15A-15C illustrate colors of the different regions in the glass article for different concentrations of a colorant package associated with a green color.
Figure 15B:
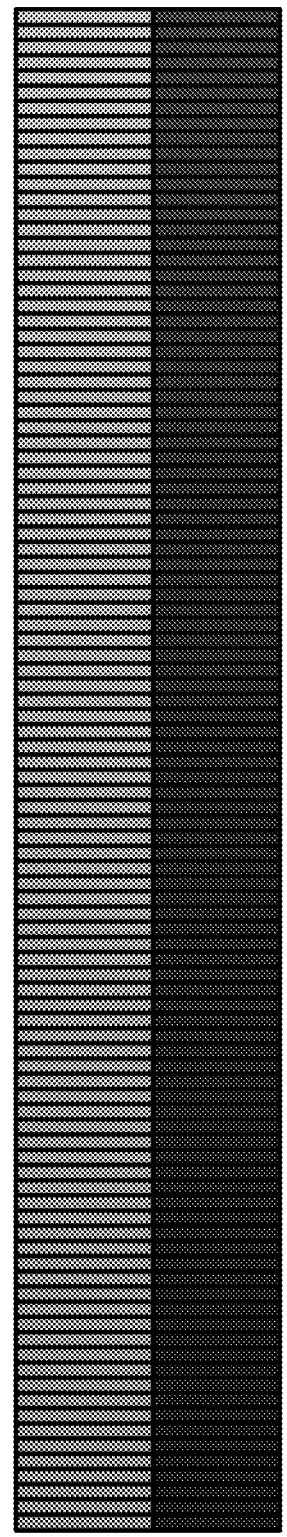
Figure 15C:
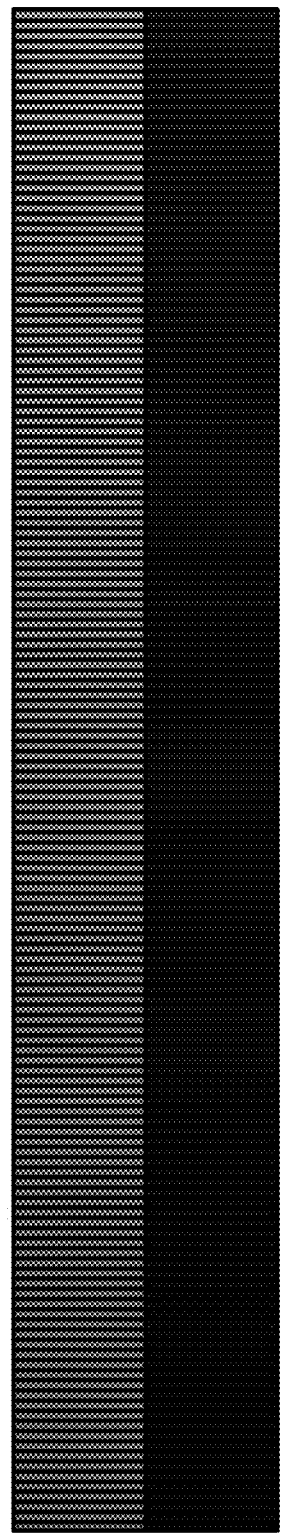

FIGS. 15A-15C illustrates pairs of colors that would be exhibited for a first colorant package (Package A) at a thickness ratio of 4.0 for different concentrations of the colorant package (in terms of relative concentration) with the left color corresponding to the first region and the right color corresponding to the second region. From top to bottom, FIG. 15A shows relative concentrations from 2.4 to 14.8, FIG. 15B shows relative concentrations from 15 to 24.8, and FIG. 15C shows relative concentrations from 25 to 40. Consequently, the L* value at each relative concentration decreases going from FIG. 15A to FIG. 15C and from top to bottom of each series. In FIG. 15C, the right color (second portion) is quite dark and may be perceived as black; however, the contrast in color is easily perceptible. In FIG. 15C, the first portion (left) can be perceived as a hunter green. In FIG. 15B, the first portion (left) can be perceived as a gray green, and the second portion (right) can be perceived as a dark evergreen. Towards the bottom of FIG. 15A, the right color can be perceived as a non-black color (e.g., green) to provide two non-black colors that are perceptibly different. For example, in FIG. 15A, the first portion (left) can be perceived as pistachio and the second portion (right) can be perceived as an olive green. In view of the results discussed in FIG. 13, the pairs of colors in FIG. 15A exhibit a dE94 of 10 or more. Compared to Package B (in FIGS. 16A-16C), Package A (in FIGS. 15A-15C) exhibits a darker color than Package B for the same relative concentration.

In aspects, the glass article 350 and/or 350 (e.g., first region and/or second region) can exhibit a blue color. In further aspects, the first CIE L* value can be within one or more of the corresponding ranges discussed above, for example, from 30 to 96 (e.g., from 35 to 65 or from 80 to 93). In further aspects, the second CIE L* value can be within one or more of the corresponding ranges discussed above, for example, from 30 to 92 or from 50 to 92. In further aspects, the first CIE a* value can be −10 or more (e.g., 0 or more) and the first CIE b* value can be less than 0 (e.g., −5 or less) to exhibit a blue color. In further aspects, the first CIE a* value can be about −10 or more, −5 or more, −2 or more, −1.0 or more, 0.0 or more, 0.3 or more, 1.0 or more, 2 or more, 5 or more, 7 or more, 10 or more, 12 or more, 15 or more, 60 or less, 40 or less, 30 or less, 20 or less, 17 or less, 15 or less, 12 or less, 10 or less, 8 or less, 6 or less, 4 or less, 2 or less, 0.0 or less, −0.3 or less, −1.0 or less, or −2 or less. In further aspects, the first CIE a* value can be in a range from −10 to 60, from −10 to 40, from −10 to 20, from −5 to 17, from −2 to 15, −1.0 to 12, from 0.0 to 10, from 0.3 to 8, from 1.0 to 6, from 2 to 4, or any range or subrange therebetween. In further aspects, the first CIE a* value can be 0 or more, for example, in a range from 0 to 20, from 0.3 to 17, from 1.0 to 15, from 2 to 12, from 5 to 10, or any range or subrange therebetween. In further aspects, the second CIE a* value can be within one or more of the above-mentioned ranges for the first CIE a* value or from 0 to 60, from 0.3 to 60, from 1.0 to 60, from 5 to 60, from 10 to 60, from 20 to 60, from 30 to 60, from 40 to 50, or any range or subrange therebetween. In further aspects, the first CIE b* value can be −90 or more, −80 or more, −70 or more, −60 or more, −50 or more, −40 or more, −30 or more, −25 or more, −20 or more, −15 or more, −10 or more, −5 or less, −8 or less, −10 or less, −12 or less, −15 or less, −18 or less, −20 or less, −22 or less, −25 or less, −27 or less, −30 or less, −40 or less, −50 or less, −60 or less, or −70 or less. In further aspects, the first CIE b* value can be in a range from −70 to −5, from −60 to −8, from −50 to −10, from −40 to −12, from −30 to −15, from −25 to −17, from −25 to −20, or any range or subrange therebetween. In further aspects, the first CIE b* value can be about −30 or less, for example, in a range from −70 to −30, from −60 to −40, from −50 to −40, or any range or subrange therebetween. In further aspects, the second CIE b* value can be within one or more of the ranges discussed above for the first CIE b* value or in a range from −90 to −20, from −90 to −25, from −90 to −30, from −90 to −40, from −90 to −50, from −90 to −60, from −80 to −70, or any range or subrange therebetween.

Figure 10:
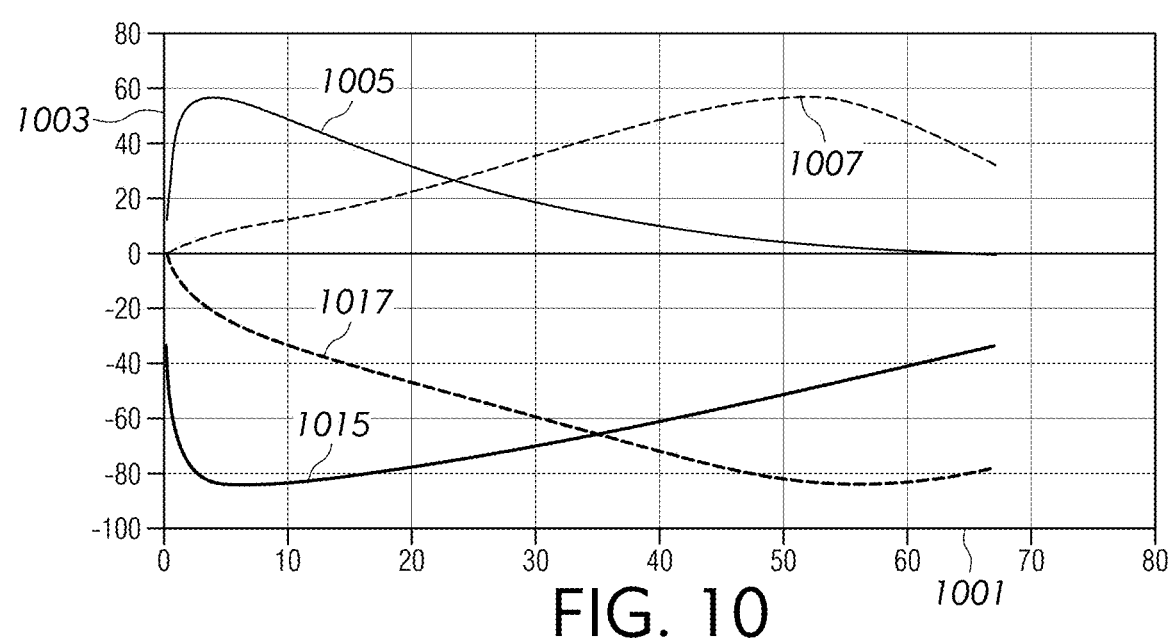
FIG. 10 illustrates relationships between a CIE $L_1$* value versus CIE a* values and CIE b* values for the first region and the second region across different concentrations of a colorant package associated with a blue color.

In further aspects, (for a glass article exhibiting a blue color) the second CIE a* value can be greater than the first CIE a* value (e.g., by 0.2 or more, 0.5 or more, 1.0 or more, 2 or more, 5 or more, 10 or more, 15 or more, 20 or more, 30 or more, or 40 or more), and/or the first CIE b* value can be greater than the second CIE b* value (e.g., by 0.2 or more, 0.5 or more, 1.0 or more, 2 or more, or 5 or more). For example, FIG. 10 shows that the second CIE a* value (curve 1007) is greater than the first CIE a* value (curve 1005) (when the vertical axis 1003 represents CIE a* values and) when the first CIE L* value is greater than 25 (e.g., 30 or more or from 35 to 65) as indicated by the horizontal axis 1001. Also, FIG. 10 shows that the first CIE b* value (curve 1015) is greater than the second CIE b* value (curve 1017) (when the vertical axis 1003 represents CIE b* values and) when the first CIE L* value is greater than 35 (e.g., 35 or more or from 35 to 65) as indicated by the horizontal axis 1001. In aspects, the natively colored glass housing satisfies the relationship |(first CIE L* value)−1.1×(first CIE b* value)+106|<5. As shown in FIG. 10, the first CIE b* value (curve 1015) is substantially linear when the first CIE b* value is 30 or more (e.g., from 35 to 65), which satisfies the above-mentioned relationship between the first CIE L* value and the first CIE b* value.

Figure 12:
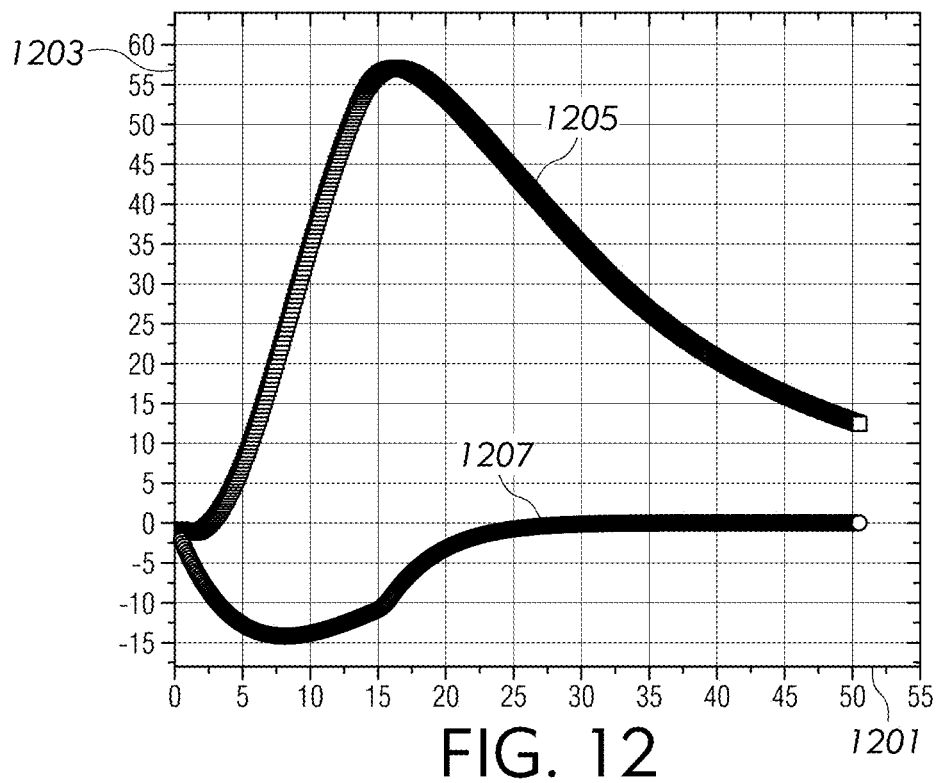
FIG. 12 illustrates a relationship between a CIE $L_1$* value and a difference in CIE a* values for different concentrations of a colorant package associated with a blue color.

In further aspects, a difference in CIE a* values (e.g., the first CIE a* value minus the second CIE a* value; for a glass article exhibiting a blue color) can be about 15 or more, about 20 or more, about 25 or more, about 30 or more, about 40 or more, about 45 or more, about 50 or more, about 70 or less, about 67 or less, about 65 or less, about 60 or less, about 55 or less, about 50 or less, about 45 or less, about 40 or less, about 35 or less, about 30 or less, or about 25 or less. In further aspects, a difference in CIE a* values (e.g., the first CIE a* value minus the second CIE a* value) can be in a range from about 15 to about 70, from about 20 to about 67, from about 25 to about 67, from about 30 to about 67, from about 35 to about 65, from about 40 to about 60, from about 50 to about 55, or any range or subrange therebetween. For example, FIG. 12 shows how the difference in a* values (e.g., as indicated by a distance between curve 1015 and curve 1017 with the vertical axis 1003 corresponding to a* values in FIG. 10 corresponding to curve 1205) as indicated by curves 1205 and 1207 varies as the relative concentration (as indicated by the horizontal axis 1201) changes. As shown, the difference in CIE a* values for curve 1205 ranges from about 7 and 12 at the endpoints to a maximum difference in CIE a* values of about 67. As shown, the difference in CIE a* values for curve 1207 ranges from about 0 at the endpoints to a maximum difference in CIE a* values of about −15. In further aspects, an absolute value of the difference in CIE a* values can be 1 or more, 5 or more, 10 or more, 15 or more, 20 or more, 25 or more, 30 or more, 40 or more, 50 or more, 70 or less, 65 or less, 60 or less, 55 or less, 60 or less, 55 or less, 50 or less 45 or less, 40 or less, 35 or less, 30 or less, 25 or less, 20 or less, or 10 or less. In further aspects, an absolute value of the difference in CIE a* values can be in a range from 1 to 70, from 5 to 70, from 10 to 65, from 15 to 65, from 20 to 60, from 25 to 60, from 30 to 55, from 35 to 50, from 40 to 45, or any range or subrange therebetween.

Figure 11:
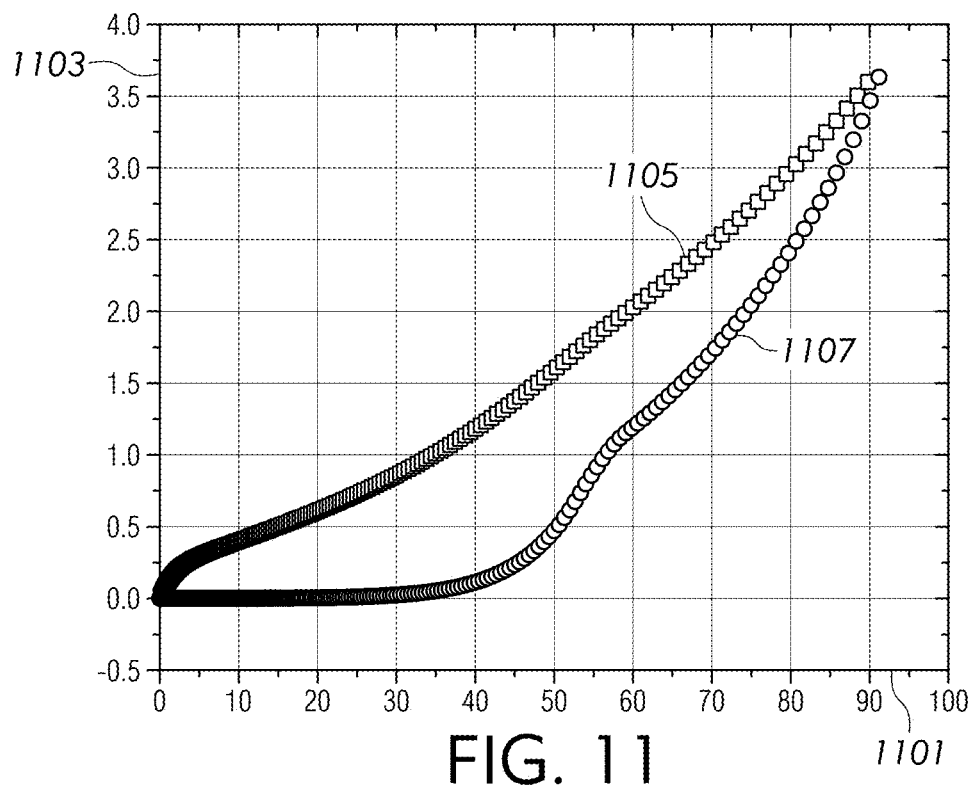
FIG. 11 illustrates a relationship between a CIE $L_1$* value and a b* ratio for different concentrations of colorant packages associated with a blue color.

FIG. 11 presents the relationship between the first CIE L* value (as indicated by the horizontal axis 1101) and the b* ratio (as indicated by the vertical axis 1103) (e.g., for a glass article exhibiting a blue color). For curve 1105, the b* ratio is greater than 1 when the first CIE L* value is 35 or more (e.g., from 35 to 65). On the other hand, curve 1107 has a b* ratio from 0.2 to 1.0 when the first CIE L* value is from 45 to about 55 and a b* ratio of 1.0 or more when the first CIE L* value is about 55 or more (e.g., from 55 to 65). As shown, curves 1105 and 1107 converge as the first CIE L* value increases (e.g., towards a value of 96).

In further aspects, the color difference dE94 (of a glass article exhibiting a blue color) can be about 10 or more, about 12 or more, about 14 or more, about 16 or more, about 18 or more, about 20 or more, about 35 or less, about 32 or less, about 30 or less, about 27 or less, about 25 or less, about 22 or less, about 20 or less, about 17 or less, or about 15 or less, for example, from about 10 to about 35, from about 12 to about 32, from about 14 to about 30, from about 16 to about 27, from about 18 to about 25, from about 20 to about 22, or any range or subrange therebetween. As shown in FIG. 6, the curves 605 and 607 exhibit a dE94 value (as indicated by the vertical axis 603) greater than about 10 concurrent with a first L* value (as indicated by the horizontal axis 601) of 30 or more (e.g., from 30 to 92, from 30 to 65 or from 35 to 65), the color difference dE94 is 10 or more. For the range shown in FIG. 6, curves 605 and 607 have maximum color difference dE94 from about 45 to about 65 (e.g., dE94 of about 22 or more), from about 50 to 60 (e.g., dE94 of about 25 or more), or about 55.

Figure 7A:
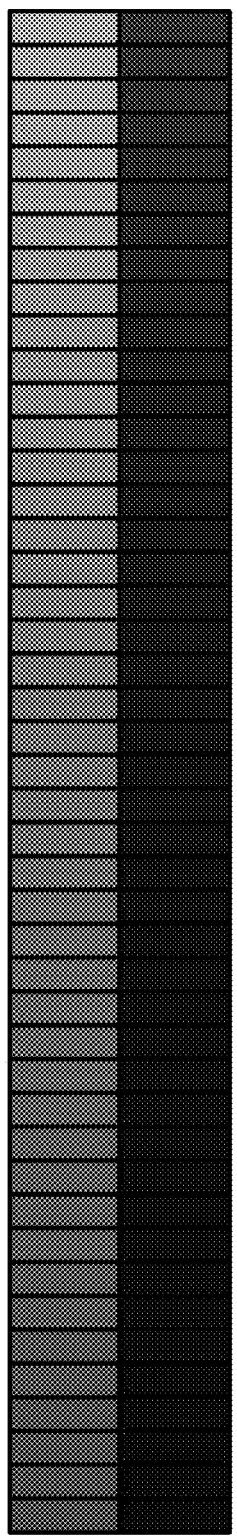
FIGS. 7A-7B illustrate colors of the different regions in the glass article for different concentrations of a colorant package associated with a blue color.
Figure 7B:
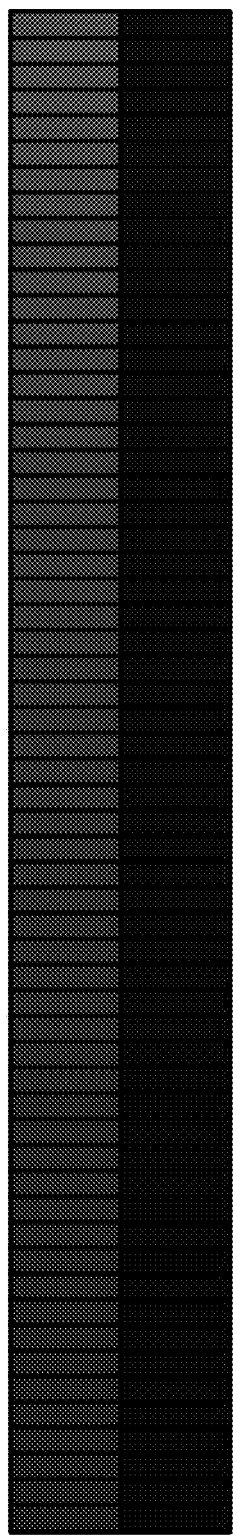

FIGS. 7A-7B illustrates pairs of colors that would be exhibited for a third colorant package (Package C) at a thickness ratio of 4.0 for different concentrations of the colorant package (in terms of relative concentration) with the left color corresponding to the first region and the right color corresponding to the second region. From top to bottom, FIG. 7A shows relative concentrations from 2.4 to 6.8, and FIG. 7B shows relative concentrations from 7 to 12. Consequently, the L* value at each relative concentration decreases going from FIG. 7A to FIG. 7B and from top to bottom of each series. In FIG. 7B and the bottom half of FIG. 7A, the right color (second portion) is quite dark and may be perceived as black. However, the contrast in color is still easily perceptible for all of FIG. 7A and the top half of FIG. 7B, which corresponds to a first L* value of 30 or more. In FIG. 7B, the first portion (left) can be perceived as a midnight blue. For the top half of FIG. 7A, the right color can be perceived as a non-black color (e.g., blue) to provide two non-black colors that are perceptibly different. In view of the results discussed in FIG. 13, the pairs of colors in FIG. 7A exhibit a dE94 (curve 607 in FIG. 6) of 10 or more, 15 or more, 20 or more, or from 30 to 38. In FIG. 7A, the first portion (left) can be perceived as a sky blue to a denim blue and the second portion can be perceived as a midnight blue.

Figure 8A:
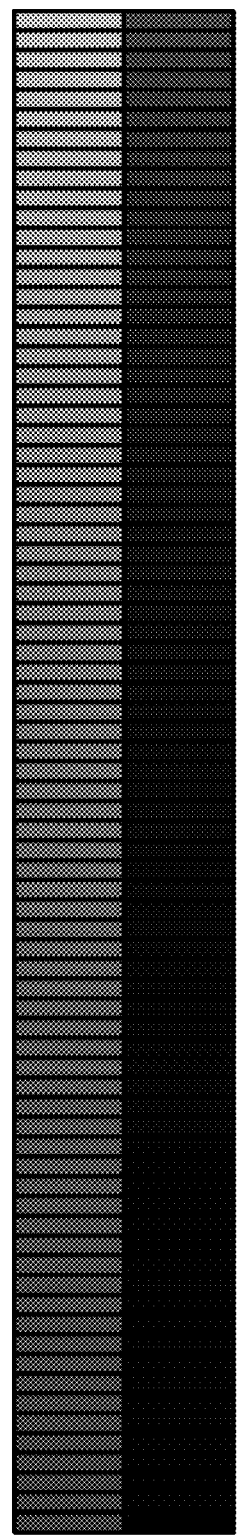
FIG. 8A-8B illustrate colors of the different regions in the glass article for different concentrations of another colorant package associated with a blue color.
Figure 8B:
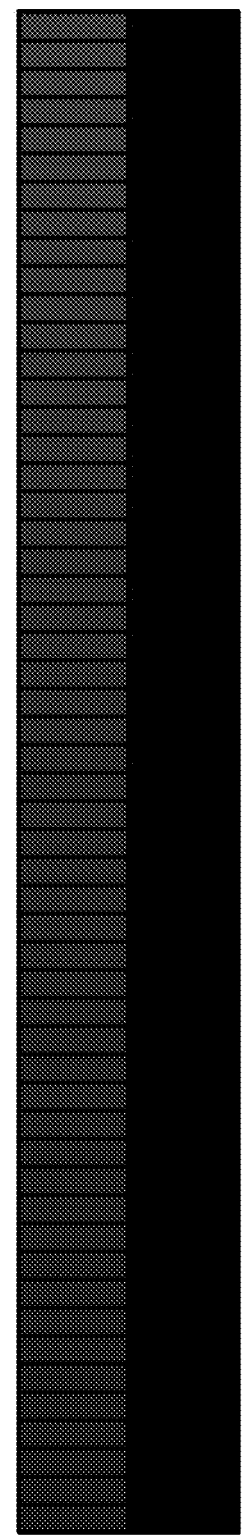

FIGS. 8A-8B illustrates pairs of colors that would be exhibited for a fourth colorant package (Package D) at a thickness ratio of 4.0 for different concentrations of the colorant package (in terms of relative concentration) with the left color corresponding to the first region and the right color corresponding to the second region. From top to bottom, FIG. 8A shows relative concentrations from 2.4 to 9.8, and FIG. 8B shows relative concentrations from 10 to 15.5. Consequently, the L* value at each relative concentration decreases going from FIG. 8A to FIG. 8B and from top to bottom of each series. Although not shown, color pairs for a relative concentration greater than 15.5 were both very dark and could be perceived a different shades of black (corresponding to the region of curve 1107 with a b* ratio of about 0 in FIG. 11). In FIG. 8B and the bottom two-thirds of FIG. 8A, the right color (second portion) is quite dark and may be perceived as black. However, the contrast in color is easily perceptible for the top half of FIG. 8B and all of FIG. 8A. In FIG. 8B, the first portion (left) can be perceived as a dark turquoise. For the top third of FIG. 8A, the right color can be perceived as a non-black color (e.g., blue) to provide two non-black colors that are perceptibly different. In view of the results discussed in FIG. 6, the pairs of colors in FIG. 8A (curve 605 in FIG. 6) exhibit a dE94 of 10 or more (e.g., 15 or more, 20 or more, or from 20 to 28). In FIG. 8A, the first portion (left) can be perceived as a cove blue and the second portion (right) can be perceived as a dark slate. Compared to Package C (in FIGS. 7A-7B), Package D (in FIGS. 8B-8A) exhibits a more muted color and/or darker color than Package C for the same relative concentration.

In aspects, the glass article 350 and/or 350 (e.g., first region and/or second region) can exhibit a yellow color or an amber color. In further aspects, the first CIE L* value can be within one or more of the corresponding ranges discussed above, for example, from 80 to 96 (e.g., from 80 to 86 or from 85 to 93). In further aspects, the second CIE L* value can be within one or more of the corresponding ranges discussed above, for example, from 30 to 92, from 50 to 92, or from 50 to 80. In further aspects, the first CIE a* value can be −10 or more (e.g., 0 or more) and the first CIE b* value can be 5 or more (e.g., 20 or more) to exhibit a yellow color or an amber color. In further aspects, the first CIE a* value can be about −10 or more, −5 or more, −2 or more, −1.0 or more, 0.0 or more, 0.3 or more, 1.0 or more, 2 or more, 5 or more, 7 or more, 10 or more, 12 or more, 15 or more, 40 or less, 30 or less, 25 or less, 22 or less, 20 or less, 17 or less, 15 or less, 12 or less, 10 or less, 8 or less, 6 or less, 4 or less, 2 or less, 0.0 or less, −0.3 or less, −1.0 or less, or −2 or less. In further aspects, the second CIE a* value can be within one or more of the above-mentioned ranges for the first CIE a* value, for example, in a range from −10 to 40, from 0 to 30, or any range or subrange therebetween. In further aspects, the first CIE b* value can be 5 or more, 7 or more, 10 or more, 12 or more, 15 or more, 20 or more, 25 or more, 30 or more, 35 or more, 40 or more, 45 or more, 50 or more, 120 or less, 110 or less, 100 or less, 90 or less, 80 or less, 70 or less, 60 or less, 50 or less, 40 or less, 30 or less, or 20 or less. In further aspects, the first CIE b* value can be in a range from 5 to 120, from 5 to 110, from 7 to 100, from 7 to 90, from 10 to 80, from 20 to 70, from 30 to 60, from 40 to 50, or any range or subrange therebetween. In further aspects, the second CIE b* value can be within one or more of the ranges discussed above for the first CIE b* value, for example, in a range from about 20 to 120, from 20 to 100, from 25 to 90, from 30 to 90, or from 40 to 80. Alternatively, the second CIE b* value can be in a range from 40 to 120, from 60 to 120, from 70 to 110, from 75 to 110, from 80 to 100, from 90 to 100, or any range or subrange therebetween; and the first CIE b* value can be in a range from 20 to 120, from 25 to 110, from 30 to 100, from 40 to 90, from 50 to 80, from 60 to 70, or any range or subrange therebetween.

Figure 21:
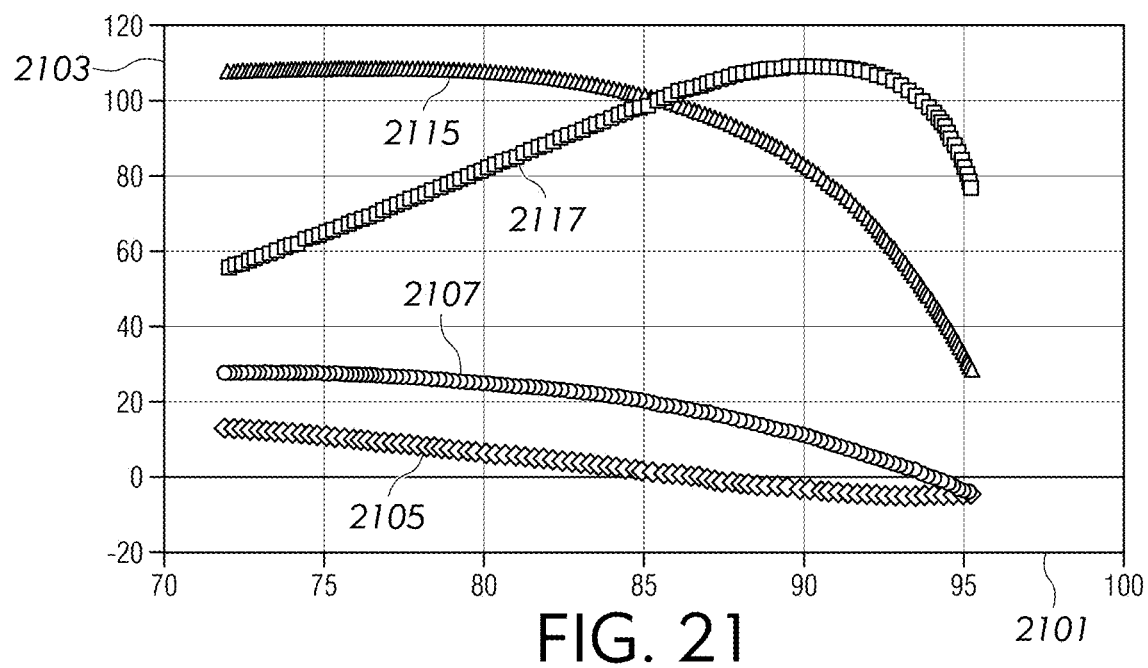
FIG. 21 illustrates relationships between a CIE $L_1^*$ value versus CIE a* values and CIE b* values for the first region and the second region across different concentrations of another colorant package associated with a yellow or amber color.

In further aspects, the second CIE b* value can be less than the first CIE b* value, and the first CIE a* value can be less than the second CIE a* value. For example, FIG. 21 shows a relationship between the first L* value (as indicated by the horizontal axis 2101) and the first CIE b* value (curve 2115) or the second CIE b* value (curve 2117) (when the vertical axis 2103 correspond to CIE b* values). As shown, when the first L* value is about 86 or less (e.g., from 80 to 86), the first CIE b* value (curve 2115) is greater than the second CIE b* value (curve 2117). Curve 2105 corresponds to the first CIE a* value and curve 2107 corresponds to the second CIE a* value when the vertical axis 2103 corresponds to the CIE b* value. As shown, when the first L* value is about 86 or less (e.g., from 80 to 86), the second CIE a* value (curve 2107) is greater than the first CIE a* value (curve 2105). Further, as shown, the second CIE a* value (curve 2107) can be 0.0 or more and the first CIE a* value (curve 2105) can be 0.0 or more.

In further aspects, the second CIE b* value can be greater than the first CIE b* value, and the first CIE a* value can be greater than the second CIE a* value. As shown in FIG. 21, when the first L* value is about 86 or more (e.g., from 86 to 96 or from 86 to 93), the second CIE b* value (curve 2117) is greater than the first CIE b* value (curve 2115). As shown, when the first L* value is about 86 or more (e.g., from 86 to 96 or from 86 to 93), the second CIE a* value (curve 2107) is greater than the first CIE a* value (curve 2105). Further, as shown, the second CIE a* value (curve 2107) can be 0.0 or more and the first CIE a* value (curve 2105) can be 0.0 or less, for example, when the first CIE L* value is about 88 or more.

Figure 20:
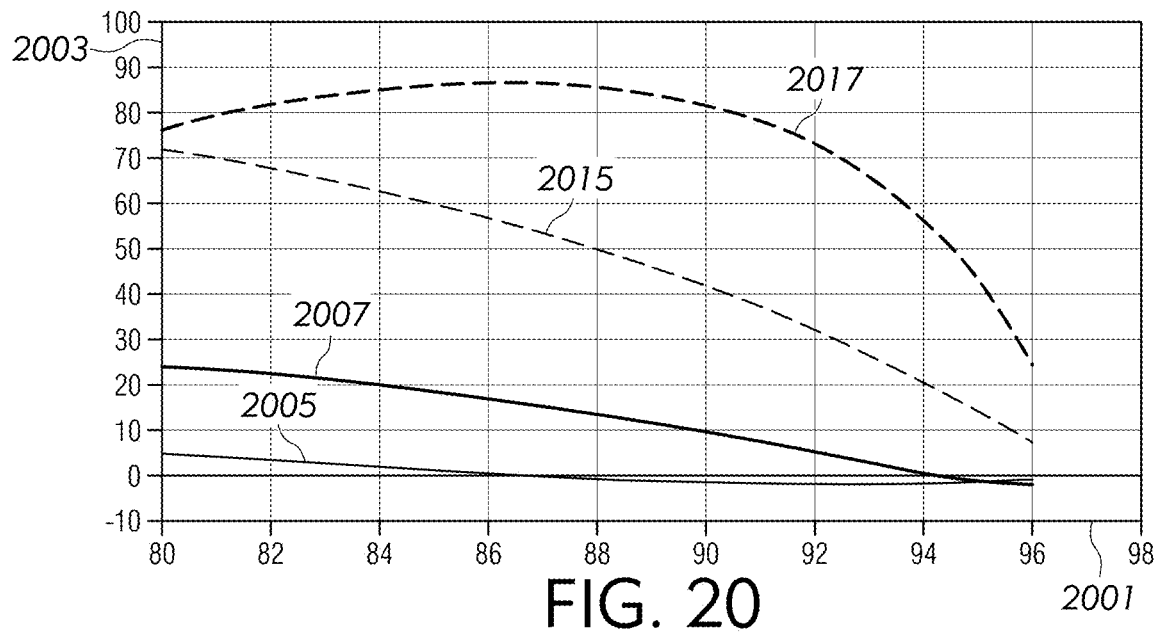
FIG. 20 illustrates relationships between a CIE $L_1^*$ value versus CIE a* values and CIE b* values for the first region and the second region across different concentrations of a colorant package associated with a yellow or amber color.

In further aspects, the natively colored glass article can satisfy the relationship |(first CIE L* value)−3.5×(first CIE b* value)+198.5|<1. As shown in FIG. 20, when the first L* value is about 80 or more (e.g., from 80 to 96 or from 86 to 96) as indicated by the horizontal axis 2001, the second CIE b* value (curve 2017) is greater than the first CIE b* value (curve 2105), when the vertical axis 2003 represents the CIE b* values. Also shown, when the first L* value is about 80 or more (e.g., from 80 to 96 or from 86 to 96), the second CIE a* value (curve 2007) is greater than the first CIE a* value (curve 2005) when the vertical axis 2003 corresponds to CIE a* values. Further, a portion of the first CIE b* value (curve 2015) when the CIE L* value is about 88 or more (e.g., from 90 to 96) can be approximated by a line, where the relationship is |(first CIE L* value)−3.5×(first CIE b* value)+198.5|<1.

Figure 22:
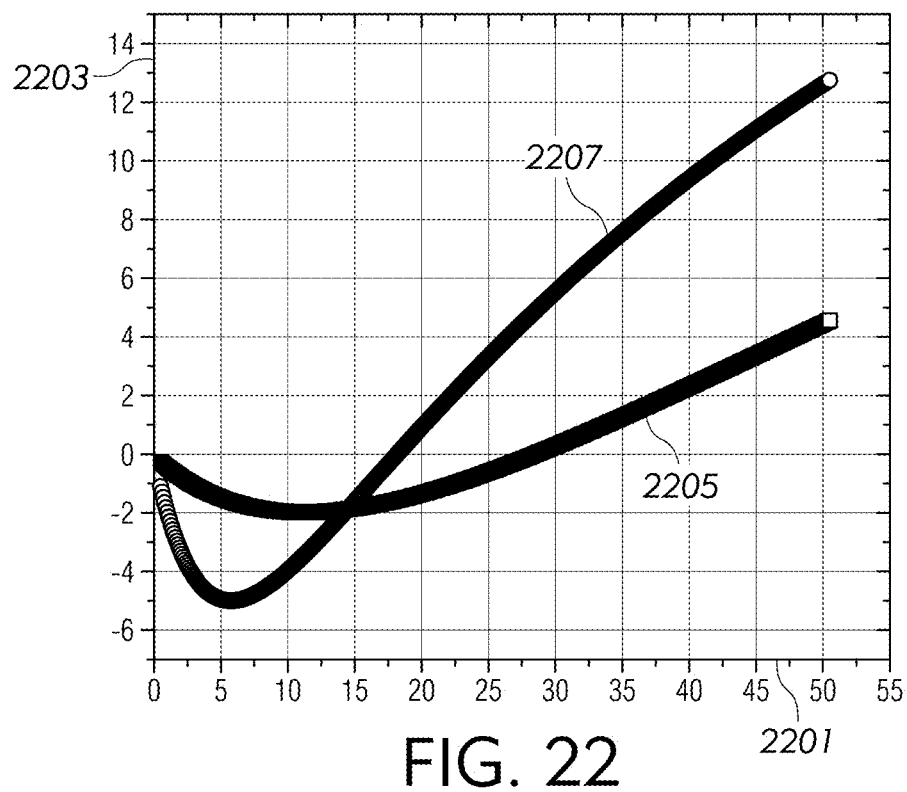
FIG. 22 illustrates a relationship between a CIE $L_1^*$ value and a difference in CIE a* values for different concentrations of a colorant package associated with a yellow or amber color.

In further aspects, (for a glass article exhibiting a yellow color or an amber color) the second CIE a* value can be greater than the first CIE a* value (e.g., by 0.2 or more, 0.5 or more, 1.0 or more, 2 or more, 5 or more, 10 or more, 15 or more, 20 or more, 30 or more, or 40 or more), and/or the first CIE b* value can be greater than the second CIE b* value (e.g., by 0.2 or more, 0.5 or more, 1.0 or more, 2 or more, or 5 or more). As discussed above, these relationships are shown in FIG. 20 when the first CIE L* value is about 80 or more (e.g., from 80 to 96) and in FIG. 21 when the first CIE L* value is about 86 or more (e.g., from 86 to 96). In further aspects, a difference in CIE a* values (e.g., the first CIE a* value minus the second CIE a* value) can be about 15 or more, about 17 or more, about 20 or more, about 22 or more, about 30 or less, about 25 or less, about 22 or less, about 20 or less, or about 18 or less. In further aspects, a difference in CIE a* values (e.g., the first CIE a* value minus the second CIE a* value) can be in a range from about 15 to about 30, from about 15 to about 25, from about 17 to about 22, from about 17 to about 20, or any range or subrange therebetween. For example, FIGS. 20-21 shows how the difference in a* values (as indicated by a distance between curve 2007 and curve 2005 with the vertical axis 2003 corresponding to the difference a* values), which can be within the above-mentioned ranges in this paragraph. Alternatively, in further aspects, a difference in CIE a* values can be about 2 or more, about 4 or more, about 6 or more, about 8 or more, about 10 or more, about 20 or less, about 17 or less, about 15 or less, about 12 or less, about 10 or less, or about 7 or less. In further aspects, a difference in CIE a* values can be in a range from 2 to 20, from 4 to 17, from 6 to 15, from 8 to 12, from 8 to 10, or any range or subrange therebetween. For example, FIG. 22 illustrates a relationship between a difference in CIE a* values (vertical axis 2203) and the relative concentration of the colorant package (horizontal axis 2201). In FIG. 22, curves 2205 and 2207 increase as the relative concentration increases.

Figure 23:
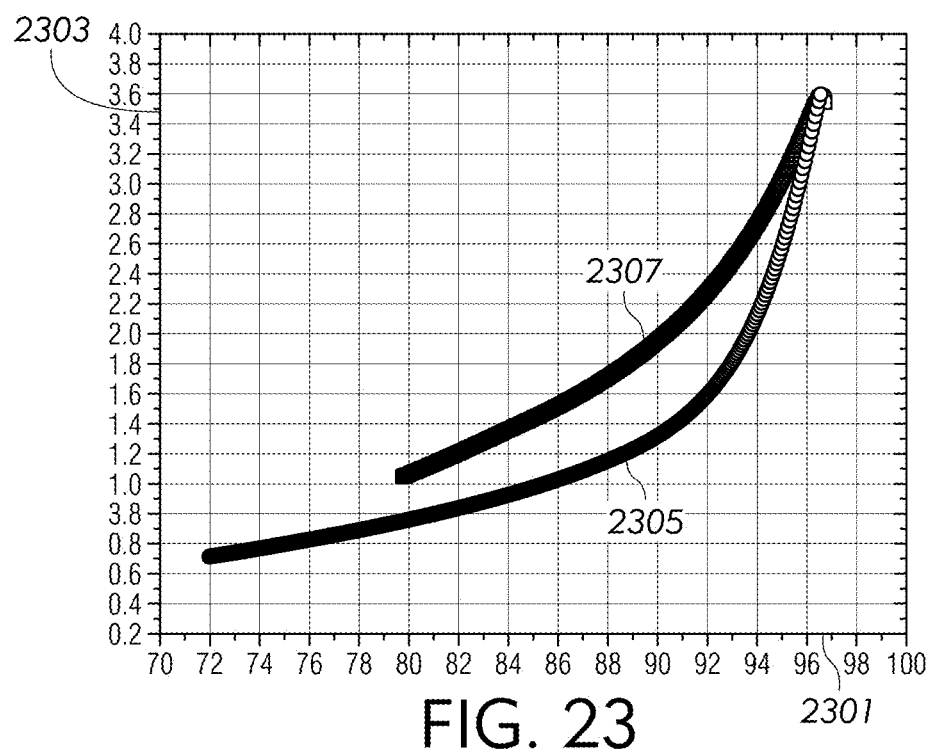
FIG. 23 illustrates a relationship between CIE $L_1^*$ values and a b* ratio for different concentrations of colorant packages associated with a yellow or amber color.

In further aspects, a b* ratio (of a glass article exhibiting a yellow color or an amber color) can be about 0.5 or more, about 0.6 or more, about 0.75 or more, about 0.8 or more, about 0.9 or more, about 1.0 or more, about 1.1 or more, about 1.3 or more, about 1.5 or more, about 1.7 or more, about 2.0 or more, about 3.0 or more, about 4.0 or more, about 5.0 or more, about 7.0 or less, about 6.0 or less, about 5.0 or less, about 4.0 or less, about 3.4 or less, about 3.0 or less, about 2.7 or less, about 2.5 or less, about 2.3 or less, about 2.0 or less, about 1.7 or less, about 1.5 or less, about 1.3 or less, about 1.1 or less, about 1.0 or less, about 0.9 or less, about 0.85 or less, or about 0.80 or less. In further aspects, a b* ratio can be in a range from about 0.5 to about 7.0, from about 0.5 to about 6.0, from about 0.5 to about 5.0, from about 0.5 to about 4.0, from about 0.5 to about 3.4, from about 0.5 to about 3.0, from about 0.6 to about 2.5, from about 0.6 to about 2.0, from about 0.75 to about 1.5, from about 0.75 to about 1.1, from about 0.75 to about 0.9, from about 0.8 to about 0.85, or any range or subrange therebetween. Alternatively, in further aspects, a b* ratio can be in a range from about 0.75 to about 3.4, from about 0.75 to about 3.0, from about 0.9 to about 2.7, from about 1.0 to about 2.5, from about 1.1 to about 2.3, from about 1.3 to about 2.0, from about 1.5 to about 1.7, or any range or subrange therebetween. In further aspects, the b* ratio can be about 3.0 or more, for example, from about 3.0 to about 7.0, from about 4.0 to about 6.0, from about 5.0 to about 6.0, or any range or subrange therebetween. In further aspects, the natively colored glass article can satisfy the relationship |(b* ratio)−0.10×(first L* value)+6.97|<0.1. FIG. 23 presents the relationship between the first CIE L* value (as indicated by the horizontal axis 2301) and the b* ratio (as indicated by the vertical axis 2303). For curve 2305, the b* ratio is from about 0.75 to about 0.9 when the first CIE L* value is from about 80 to about 86 (see also curves 2115 and 2117 in FIG. 21). Curve 2305 also exhibits a b* ratio from about 1.1 to about 2.3 when the first CIE L* value is from about 87 to about 94. Also, curve 2307 exhibits a b* ratio from about 1.1 to about 2.3 when the first CIE L* value is from about 80 to about 93. Additionally, curves 2305 and 2307 satisfy the relationship mentioned above in this paragraph between the b* ratio and the first L* value.

Figure 18:
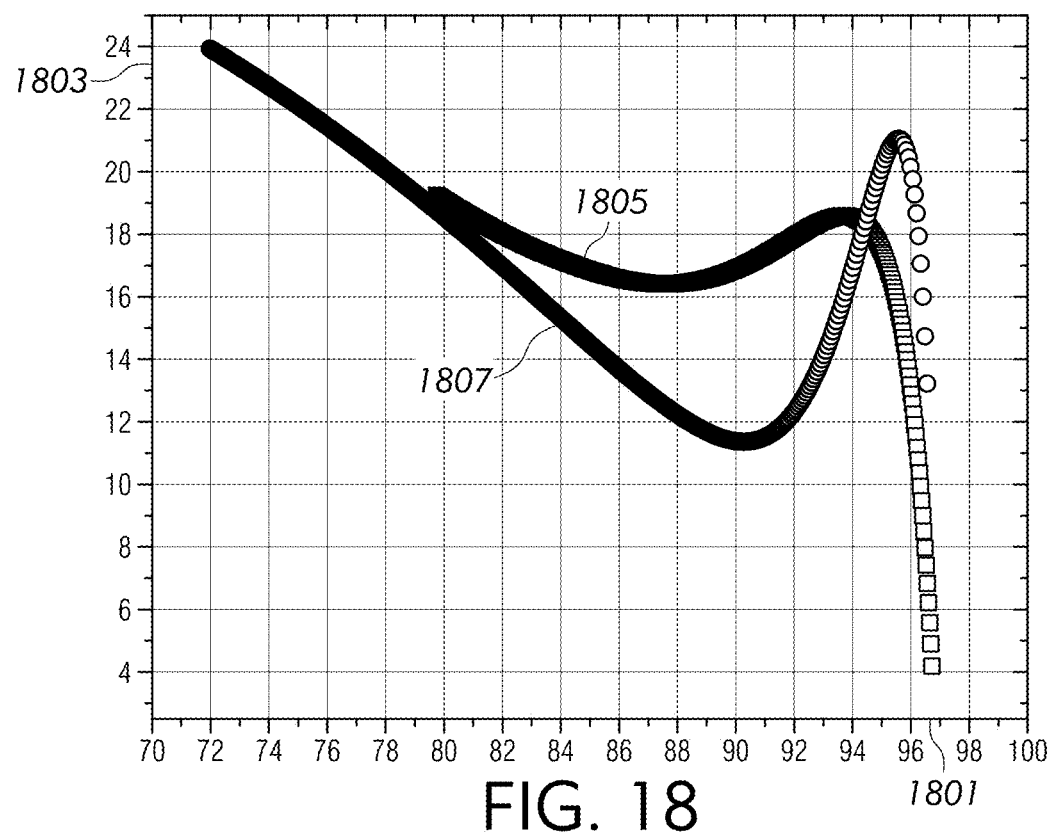
FIG. 18 illustrates a relationship between CIE $L_1^*$ values and color difference dE94 for glass articles with a yellow or amber color.

In further aspects, the color difference dE94 (of a glass article exhibiting a yellow color or an amber color) can be about 10 or more, about 11 or more, about 12 or more, about 14 or more, about 16 or more, about 18 or more, about 20 or more, about 30 or less, about 25 or less, about 22 or less, about 20 or less, about 17 or less, or about 15 or less, for example, from about 10 to about 30, from about 11 to about 27, from about 12 to about 25, from about 15 to about 22, from about 17 to about 20, or any range or subrange therebetween. As shown in FIG. 18, the curves 1805 and 1807 exhibit a dE94 value (as indicated by the vertical axis 1803) greater than 10 concurrent with a first L* value (as indicated by the horizontal axis 1801) from 70 to about 96 (e.g., from 80 to 96, from 86 to 93). Above a first L* value of about 96 (e.g., from about 96.0 to about 96.5), the color difference dE94 sharply decreases. In further aspects, a discussed in the next paragraph, the color difference dE94 can be lower than 10 and still provide utility associated with different colors associated with different regions (e.g., when using the glass article with a reflector). For the range shown in FIG. 18, curve 1805 has local maxima in color difference dE94 around a first CIE L* value of 80 and a first CIE L* value of about 94.

In further aspects, for example when the natively colored glass article (e.g., exhibiting a yellow color or an amber color) is used in combination with the reflector, at least some utility can be provided by different colors associated with different regions, when the color difference dE94 of the glass article can be in a range from about 1.0 to about 30, from about 1.5 to about 30, from about 2.0 to about 25, from about 2.5 to about 25, from about 3.0 to about 22, from about 3.5 to about 22, from about 4.0 to about 20, from about 4.5 to about 20, from about 5.0 to about 20, from about 5.5 to about 17, from about 6.0 to about 17, from about 6.5 to about 15, from about 7.0 to about 12, from about 7.5 to about 10, or any range or subrange therebetween. In further aspects, for example when the natively colored glass article (e.g., exhibiting a yellow color or an amber color) is used in combination with the reflector, there can be sufficient contrast in color between regions of the glass article to perform a marking utility when the color difference dE94 the glass article is in a range from 4.5 to about 30, from about 5.0 to about 30, from about 5.5 from about 25, from about 6.0 to about 25, from about 6.5 to about 22, from about 7.0 to about 22, from about 7.5 to about 20, from about 8.0 to about 20, from about 8.5 to about 17, from about 9.0 to about 17, from about 9.5 to about 15, from about 10.0 to about 15, or any range or subrange therebetween. In aspects, preferred ranges for the color difference dE94 (e.g., when the glass article exhibits a yellow color or an amber color) can be from about 1.0 to about 30, from about 4.5 to about 27, or from about 10 to about 20.

Figure 19A:
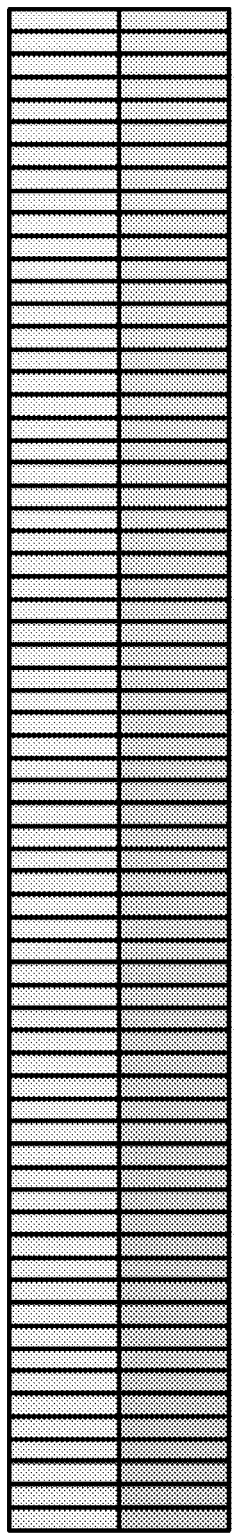
FIGS. 19A-19D illustrate colors of the different regions in the glass article for different concentrations of a colorant package associated with a yellow or amber color.
Figure 19B:
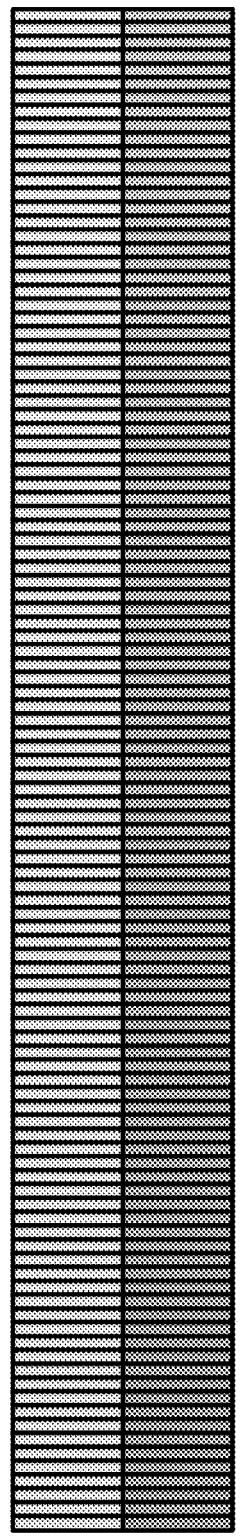
Figure 19C:
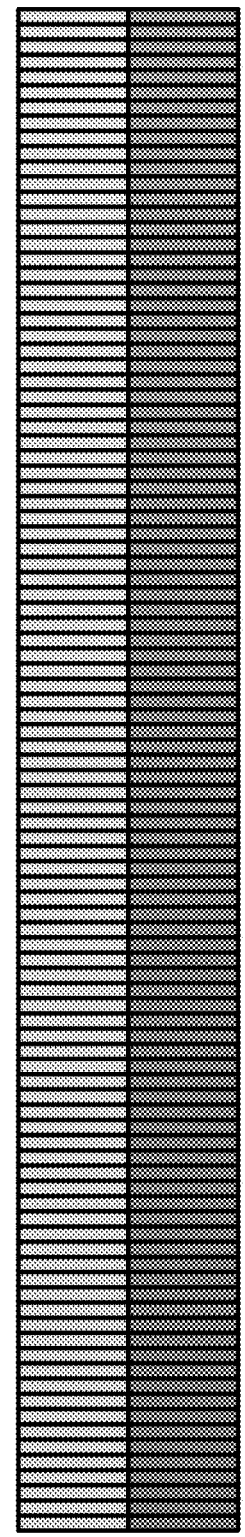
Figure 19D:
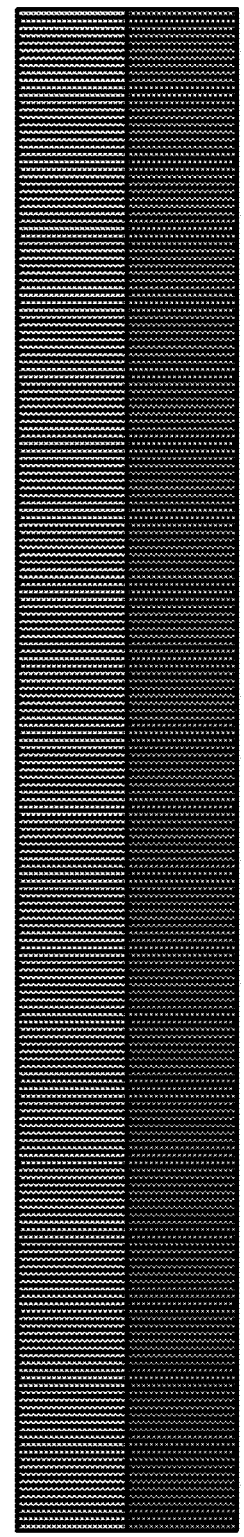

FIGS. 19A-19D illustrates pairs of colors that would be exhibited for a sixth colorant package (Package E) at a thickness ratio of 4.0 for different concentrations of the colorant package (in terms of relative concentration) with the left color corresponding to the first region and the right color corresponding to the second region. From top to bottom, FIG. 19A shows relative concentrations from 2.4 to 8.8, FIG. 19B shows relative concentrations from 9 to 19.8, FIG. 19C shows relative concentrations from 20 to 29.8, and FIG. 19D shows relative concentrations from 30 to 50. Consequently, the L* value at each relative concentration decreases going from FIG. 19A to FIG. 19D and from top to bottom of each series. In FIG. 19D, the right color (second portion) may be perceived as brown (rather than yellow or amber); however, the colors of the portions are noticeably different. In FIG. 19C, a nice contrast is present between the straw yellow of the first portion (left) and a goldenrod of the second portion (right). In FIGS. 19B, a nice contrast is present between the school bus yellow of the first portion (right) and the amber or mustard of the second portion (left). In FIG. 19A, a nice contrast is also present between the daffodil of the first portion (right) and the golden yellow or school bus yellow of the second portion (left). Consequently, aesthetically pleasing contrasts between pairs of colors can be achieved for most (or all) of the range illustrated in FIGS. 19A-19D, which have a dE94 from 10 to 25 (or one of the ranges mentioned in the previous paragraph).

In aspects, the glass article 350 and/or 350 (e.g., first region and/or second region) can exhibit an orange color, a brown color, or a red color. In further aspects, the first CIE L* value can be within one or more of the corresponding ranges discussed above, for example, from 80 to 96 (e.g., from 80 to 93 or from 85 to 93). In further aspects, the second CIE L* value can be within one or more of the corresponding ranges discussed above, for example, from 30 to 92 or from 50 to 92. In further aspects, the first CIE a* value can be 0.0 (e.g., 1 or more) and the first CIE b* value can be −5 or more (e.g., 0 or more) to exhibit a red color, a brown color, or an orange color. In further aspects, the first CIE a* value can be about 0.0 or more, 0.3 or more, 1.0 or more, 2 or more, 5 or more, 7 or more, 10 or more, 12 or more, 15 or more, 20 or more, 25 or more, 50 or less, 40 or less, 35 or less 30 or less, 25 or less, 20 or less, 17 or less, 15 or less, 12 or less, 10 or less, 8 or less, 6 or less, 4 or less, or 2 or less. In further aspects, the first CIE a* value can be in a range from 0.0 to 50, from 0.3 to 40, from 1.0 to 40, from 2 to 35, from 5 to 30, 7 to 25, from 10 to 20, from 12 to 17, or any range or subrange therebetween. In further aspects, the second CIE a* value can be within one or more of the above-mentioned ranges for the first CIE a* value, for example, from 1 to 50, from 5 to 40, or from 10 to 35. In further aspects, the first CIE b* value can be −5 or more, −1 or more, 0.0 or more, 0.3 or more, 1.0 or more, 2 or more, 5 or more, 7 or more, 10 or more, 12 or more, 15 or more, 17 or less, 20 or more, 25 or more, 30 or more, 50 or less, 40 or less, 35 or less, 30 or less, 25 or less, 20 or less, 15 or less, 10 or less, 7 or less, 5 or less, or 2 or less. In further aspects, the first CIE b* value can be in a range from −5 to 50, from −2 to 50, from 0.0 to 40, from 0.3 to 40, from 1 to 35, from 2 to 35, from 5 to 30, from 7 to 25, from 10 to 20, from 12 to 15, or any range or subrange therebetween. In further aspects, the second CIE b* value can be within one or more of the ranges discussed above for the first CIE b* value.

Figure 24:
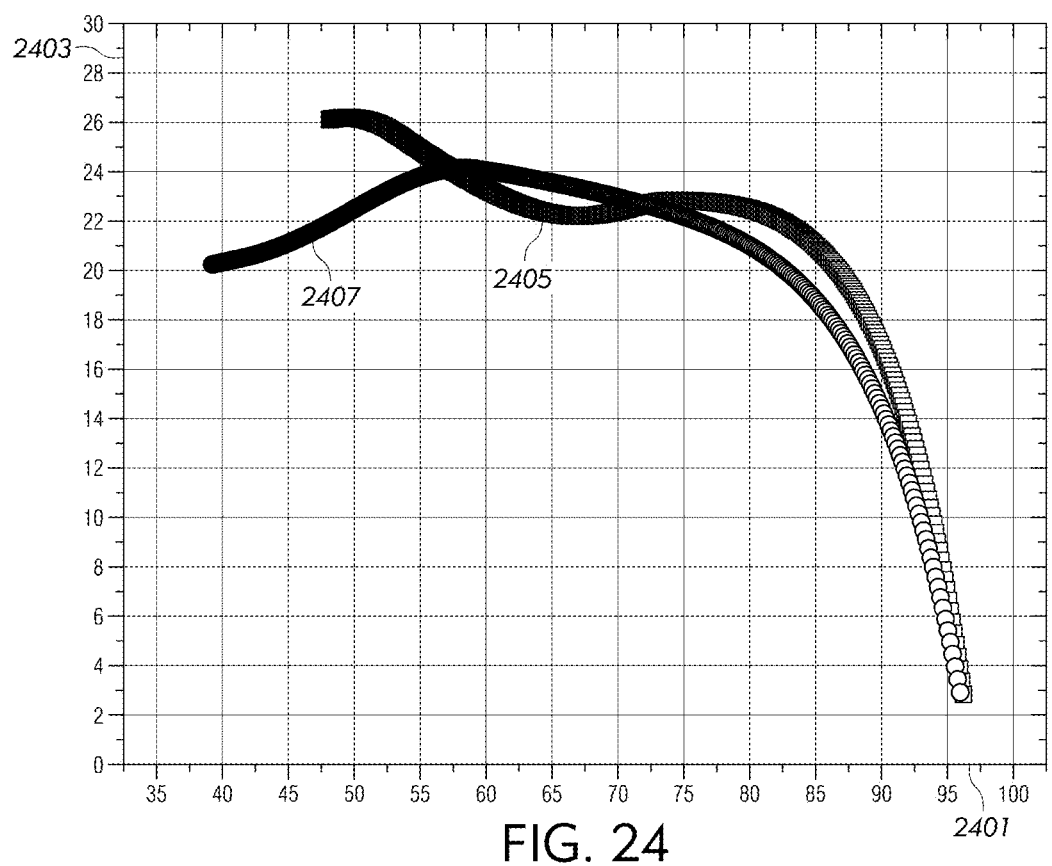
FIG. 24 illustrates a relationship between CIE $L_1^*$ values and color difference dE94 for glass articles with a red or orange color.

In further aspects, the color difference dE94 (of a glass article exhibiting a red color, a brown color, or an orange color) can be about 10 or more, about 11 or more, about 12 or more, about 14 or more, about 16 or more, about 18 or more, about 20 or more, about 30 or less, about 27 or less, about 25 or less, about 22 or less, about 20 or less, about 17 or less, or about 15 or less. In further aspects, the color difference dE94 can be in a range from about 10 to about 30, from about 11 to about 27, from about 12 to about 25, from about 14 to about 22, from about 16 to about 20, from about 18 to about 20, or any range or subrange therebetween. In further aspects, the natively colored glass housing satisfies the relationship |(dE94)+1.05×(first L* value)−110.2|<2.5 or (dE94)+1.05×(first L* value)−110.2<2.0. As shown in FIG. 24, the curves 2405 and 2407 exhibit a dE94 value (as indicated by the vertical axis 2403) greater than about 2.5 concurrent with a first L* value (as indicated by the horizontal axis 2401) from 50 to 96.5 (e.g., from 60 to 96, from 80 to 96). Curves 2405 and 2407 exhibit a dE94 value of 10 or more concurrent with a first L* from 50 to about 93 (e.g., from 60 to 93, from 80 to 93, or from 85 to 93). When the first L* value is about 80 or more, curves 2405 and 2407 converge (e.g., decreasing color difference dE94) as the first L* value increases. For this range, the natively colored glass housing satisfies the relationship |(dE94)+1.05×(first L* value)−110.2<2.5 and (dE94)+1.05×(first L* value)−110.2<2.0.

In further aspects, as discussed above, a lower color difference dE94 (e.g., when the glass article exhibits an orange color or a red color) can provide a marking utility when used with a reflector, for example, the color difference dE94 can be from about 3.0 to about 30, from about 3.5 to about 30, from about 4.0 to about 27, from about 4.5 to about 27, from about 5.0 to about 25, from about 5.5 to about 25, from about 6.0 to about 22, from about 6.5 to about 22, from about 7.0 to about 20, from about 7.5 to about 20, from about 8.0 to about 17, from about 8.5 to about 17, from about 9.0 to about 15, from about 9.5 to about 15, or any range or subrange therebetween. In further aspects, preferred ranges for the color difference dE94 can be in a range from 3.0 to 30, from 5.0 to 27, or from 10 to 25.

Figure 26A:
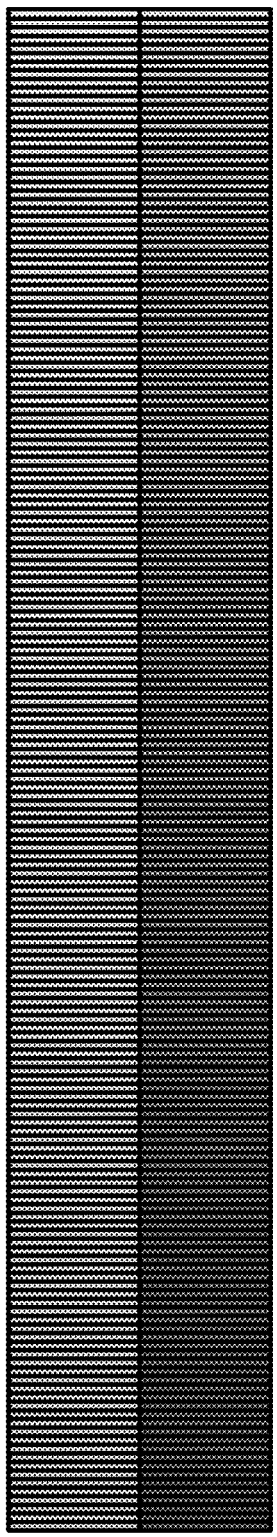
FIGS. 26A-26C illustrate colors of the different regions in the glass article for different concentrations of a colorant package associated with a red or orange color.
Figure 26B:
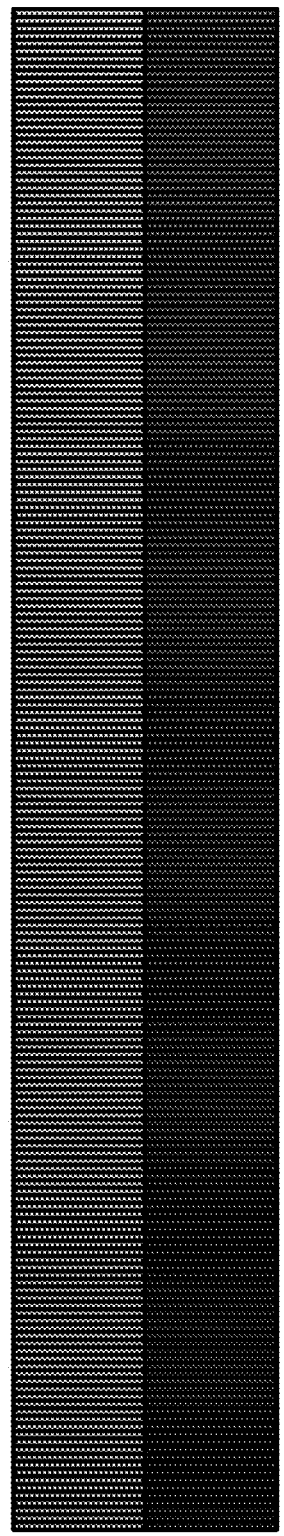
Figure 26C:
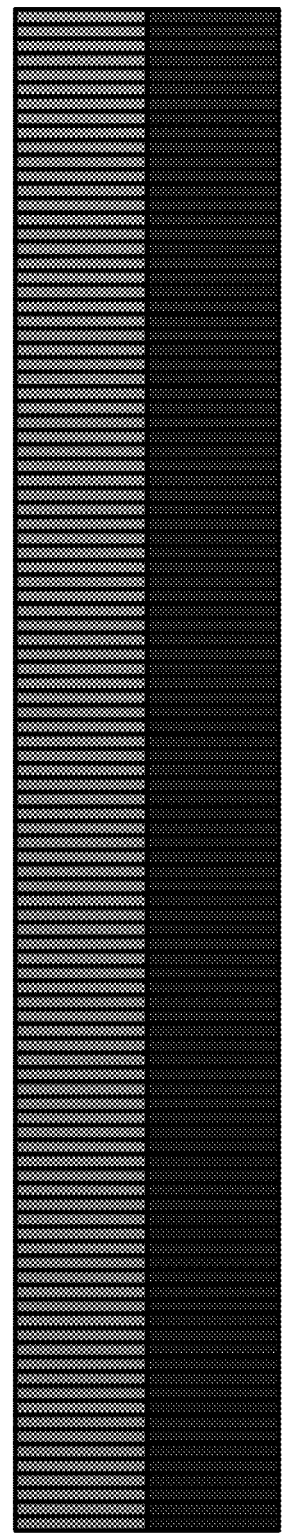

FIGS. 26A-26C illustrates pairs of colors that would be exhibited for a seventh colorant package (Package G) at a thickness ratio of 4.0 for different concentrations of the colorant package (in terms of relative concentration) with the left color corresponding to the first region and the right color corresponding to the second region. From top to bottom, FIG. 26A shows relative concentrations from 2.4 to 19.8, FIG. 26B shows relative concentrations from 20 to 39.8, and FIG. 26C shows relative concentrations from 40 to 50.5. Consequently, the L* value at each relative concentration decreases going from FIG. 26A to FIG. 26C and from top to bottom of each series. In FIG. 26C, the first portion (left) can be perceived as a bronze and the second portion (right) can be perceived as a dark chocolate. In FIGS. 26B, the first portion (left) can be perceived as cinnamon and the second portion (X) can be perceived as brown. In FIG. 26A, the first portion (left) can be perceived as a cream or a light mocha and the second portion (right) can be perceived as maple syrup.

Figure 27A:
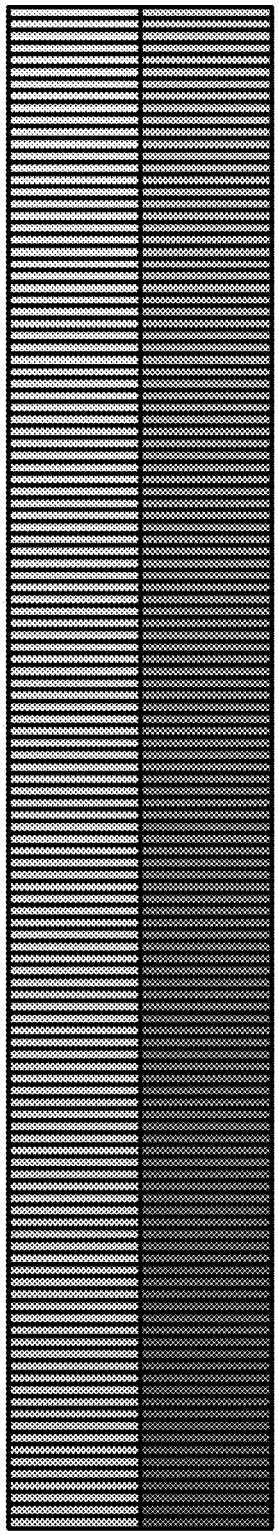
FIGS. 27A-27C illustrate colors of the different regions in the glass article for different concentrations of a colorant package associated with a red or orange color.
Figure 27B:
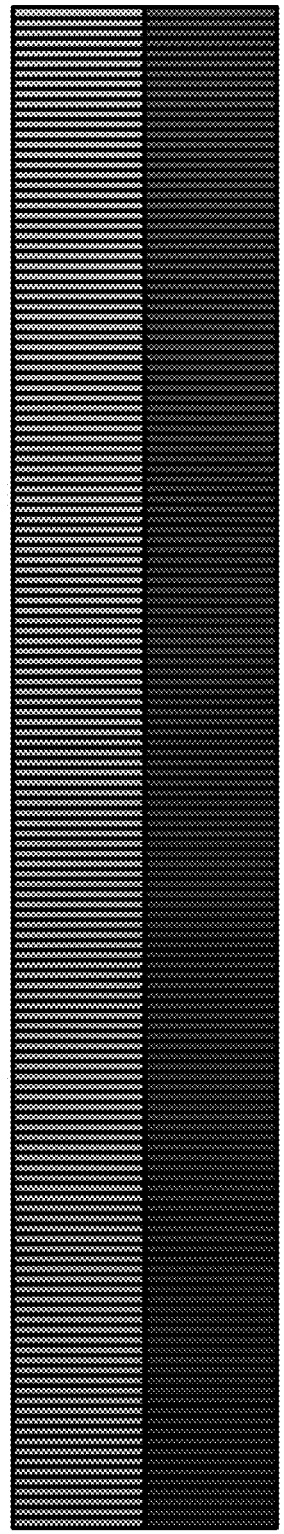
Figure 27C:
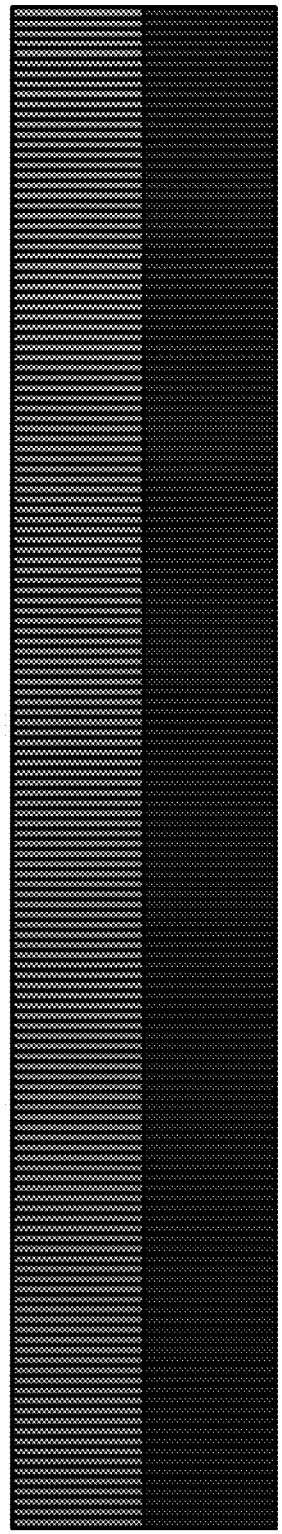

FIGS. 27A-27C illustrates pairs of colors that would be exhibited for an eighth colorant package (Package H) at a thickness ratio of 4.0 for different concentrations of the colorant package (in terms of relative concentration) with the left color corresponding to the first region and the right color corresponding to the second region. From top to bottom, FIG. 27A shows relative concentrations from 2.4 to 14.8, FIG. 27B shows relative concentrations from 15 to 29.8, and FIG. 27C shows relative concentrations from 30 to 45. Consequently, the L* value at each relative concentration decreases going from FIG. 27A to FIG. 27C and from top to bottom of each series. In FIG. 27C, the first portion (left) can be perceived as magenta and the second portion (right) may be perceived as a dark color (e.g., black). In FIG. 27B, the first portion (left) can be perceived as a blush and the second portion (right) can be perceived as a maroon or a burgundy. In FIG. 27A, the first portion (left) can be perceived as a soft pink and the second portion (right) can be perceived as a ruby. Compared to Package G (in FIGS. 26A-26C), Package H (in FIGS. 8B-8A) exhibits more pink-red colors while Package G exhibits more orange-brown colors.

In aspects, the glass article 350 and/or 511 comprises an average transmittance over the wavelength range from 400 nm to 750 nm of 10% or more, about 15% or more, 20% or more, about 25% or more, about 30% or more, 40% or more, 60% or more, 70% or more, 75% or more, 80% or more, 82% or more, 85% or more, 87% or more, 92% or less, 91% or less, 90% or less, 89% or less, 88% or less, 87% or less 86% or less, 85% or less, 80% or less, 75% or less, or 70% or less. In aspects, the glass article 350 and/or 511 comprises an average transmittance over the wavelength range from 400 nm to 750 nm from 10% to 92%, from 15% to 92%, from 20% to 91%, from 25% to 91%, from 30% to 90%, from 40% to 90%, from 60% to 89%, from 70% to 88%, from 75% to 87%, from 80% to 86%, from 82% to 85%, or any range or subrange therebetween.

In aspects, the color exhibited by glass article 350 and/or 511 can correspond to at least one 10 nm band with lower transmittance than the average transmittance over the visible spectrum (e.g., from 400 nm to 700 nm). In aspects, the glass article 350 and/or 511 can exhibit a total transmittance of at least one 10 nm band within the wavelength range of 380 nm to 750 nm that is 3% or more, 5% or more, 8% or more, 10% or more, 20% or more, 40% or more 50% or more, 60% or more, 70% or more, 80% or less, 78% or less, 75% or less, 72% or less, 70% or less, 68% or less, or 65% or less. In aspects, the glass article 350 and/or 511 can exhibit a total transmittance of at least one 10 nm band within the wavelength range of 380 nm to 750 nm in a range from 3% to 80%, from 5% to 78%, from 8% to 75%, from 10% to 72%, from 20% to 70%, from 40% to 68%, from 50% to 65%, or any range or subrange therebetween.

The glass article 511 and/or 350 comprises a glass-based material. In aspects, the glass-based material can comprise a pencil hardness of 8H or more, for example, 9H or more. As used herein, pencil hardness is measured using ASTM D 3363-20 with standard lead graded pencils. Throughout the disclosure, an elastic modulus (e.g., Young's modulus) and/ or a Poisson's ratio is measured using ISO 527-1:2019. In aspects, the glass article 511 and/or 350 can comprise an elastic modulus in a range from about 40 GPa to about 140 GPa, from about 50 GPa to about 100 GPa, from about 60 GPa to about 80 GPa, or any range or subrange therebetween.

As used herein, "glass-based" includes both glasses and glass-ceramics, wherein glass-ceramics have one or more crystalline phases and an amorphous, residual glass phase. A glass-based material may comprise an amorphous material (e.g., glass) and optionally one or more crystalline materials (e.g., ceramic). Amorphous materials and glass-based materials may be strengthened. As used herein, the term "strengthened" may refer to a material that has been chemically strengthened, for example, through ion exchange of larger ions for smaller ions in the surface of the glass article, as discussed below. However, other strengthening methods, for example, thermal tempering, or utilizing a mismatch of the coefficient of thermal expansion between portions of the glass article to create compressive stress and central tension regions, may be utilized to form strengthened glass articles. Exemplary glass-based materials, which may be free of lithia or not, comprise soda lime glass, alkali aluminosilicate glass, alkali-containing borosilicate glass, alkali-containing aluminoborosilicate glass, alkali-containing phosphosilicate glass, and alkali-containing aluminophosphosilicate glass. In aspects, glass-based material can comprise an alkali-containing glass or an alkali-free glass, either of which may be free of lithia or not. In aspects, the glass material can be alkali-free and/or comprise a low content of alkali metals (e.g., $R_2O$ of about 10 mol % or less, wherein $R_2O$ comprises $Li_2O$ $Na_2O$, $K_2O$, or the more expansive list provided below). In one or more aspects, a glass-based material may comprise, in mole percent (mol %): $SiO_2$ in a range from about 40 mol % to about 80 mol %, $Al_2O_3$ in a range from about 5 mol % to about 30 mol %, $B_2O_3$ in a range from 0 mol % to about 10 mol %, $ZrO_2$ in a range from 0 mol % to about 5 mol %, $P_2O_5$ in a range from 0 mol % to about 15 mol %, $TiO_2$ in a range from 0 mol % to about 2 mol %, $R_2O$ in a range from 0 mol % to about 20 mol %, and RO in a range from 0 mol % to about 15 mol %. As used herein, $R_2O$ can refer to an alkali-metal oxide, including $Li_2O$, $Na_2O$, and $K_2O$. As used herein, RO can refer to MgO, CaO, SrO, BaO, and ZnO. In further aspects, the glass-based material may comprise (in mol %) from about 50 mol % to about 75 mol % $SiO_2$, from about 7 mol % to about 20 mol % $Al_2O_3$, from about 13 mol % to about 20 mol % of at least one alkali metal oxide ($R_2O$), and at least one of $B_2O_3$ or $P_2O_5$. In further aspects, the glass-based material may comprise (in mol %) from 60 mol % to 65 mol % $SiO_2$, from 12 mol % to 17 mol % $Al_2O_3$, from 3 mol % to 6 mol % $B_2O_3$, from 13 mol % to 20 mol % of at least one alkali metal oxide ($R_2O$), from 0.5 mol % to 4 mol % CaO, from 0 mol % to 1 mol % ZnO, from 0 mol % to 1 mol % $ZrO_2$, and from 0.01 mol % to 0.25 mol % $SnO_2$. In any of the aspects, the glass-based material can comprise from 0.2 mol % to 0.5 mol % $ZrO_2$. In aspects, a glass-based material may optionally further comprise in a range from 0 mol % to about 2 mol % of each of $Na_2SO_4$, NaCl, NaF, NaBr, $K_2SO_4$, KCl, KF, KBr, $As_2O_3$, $Sb_2O_3$, $SnO_2$, $Fe_2O_3$, MnO, $MnO_2$, $MnO_3$, $Mn_2O_3$, $Mn_3O_4$, $Mn_2O_7$. In aspects, the glass-based material can comprise a colorant selected from a group consisting of silver, gold, chromium, cobalt, titanium, nickel, cerium, copper, and combinations thereof. For example, the glass-based material can comprise titanium oxide, zirconia, iron oxide, cerium oxide, or combinations thereof. In further aspects, the glass-based material can comprise from 5 parts-per-million (ppm) to 15 ppm gold.

Unless otherwise indicated, compositions are specified in mole percent (mol %). The terms "0 mol %" and "free," when used to describe the concentration and/or absence of a particular constituent component in a glass composition, means that the constituent component is not present in the glass composition. The term "substantially free," when used to describe the concentration and/or absence of a particular constituent component in a glass composition and the resultant colored glass article, means that the constituent component is not intentionally added to the glass composition and the resultant colored glass article. However, the glass composition and the resultant colored glass article may contain traces of the constituent component as a contaminant or tramp in amounts of less than 200 ppm unless specified otherwise herein. It is noted that the definition of "substantially free" is exclusive of gold (Au) which may be intentionally added to the glass composition in relatively small amounts, for example and without limitation, amounts less than 200 ppm (or the equivalent in mol %) to achieve a desired color in the resultant colored glass article.

"Glass-ceramics" include materials produced through controlled crystallization of glass. In aspects, glass-ceramics have about 1% to about 99% crystallinity. Examples of suitable glass-ceramics may include $Li_2O$—$Al_2O_3$—$SiO_2$ system (i.e., LAS-System) glass-ceramics, MgO—$Al_2O_3$—$SiO_2$ system (i.e., MAS-System) glass-ceramics, ZnO×$Al_2O_3$×$nSiO_2$ (i.e., ZAS system), and/or glass-ceramics that include a predominant crystal phase including β-quartz solid solution, β-spodumene, cordierite, petalite, and/or lithium disilicate. The glass-ceramic materials may be strengthened using the chemical strengthening processes. In one or more aspects, MAS-System glass-ceramic materials may be strengthened in $Li_2SO_4$ molten salt, whereby an exchange of $2Li^+$ for $Mg^{2+}$ can occur. In aspects, the glass article 511 and/or 350 can be a glass-ceramic comprising one or more crystalline phases. In further aspects, a total amount of the one or more crystalline phases, as a weight % (wt %) of the glass article 511 and/or 350, can be about 10 wt % or less, about 8 wt % or less, about 6 wt % or less, about 4 wt % or less, about 4 wt % or less, about 2 wt % or less, about 1 wt % or less, about 0.1 wt % or more, about 0.5 wt % or more, or about 1 wt % or more.

The glass articles described herein may be described as aluminoborosilicate glass compositions and colored glass articles and comprise $SiO_2$, $Al_2O_3$, and $B_2O_3$. Additionally, the glass articles described herein include one or more colorants in a colorant package to impart a desired color to the resultant colored glass article. The glass articles described herein also include alkali oxides (e.g., $Li_2O$ and $Na_2O$) to enable the ion-exchangeability of the colored glass articles. In aspects, the glass articles described herein may further include other components to improve colorant retention and produce colored glass articles having the desired color. In aspects, the difference between $R_2O$ and $Al_2O_3$ (i.e. $R_2O$ (mol %)—$Al_2O_3$ (mol %)) in the glass articles described herein may be adjusted to produce a desired observable color (e.g., pink, purple, red, orange, or blue). In aspects, the viscosity of the glass composition may be adjusted to prevent devitrification of the glass composition.

In aspects of glass-based compositions described herein, the concentration of constituent components (e.g., $SiO_2$, $Al_2O_3$, $Li_2O$, and the like) are given in mole percent (mol %) on an oxide basis, unless otherwise specified. Components of the alkali aluminosilicate glass-based composition according to embodiments are discussed individually below.

It should be understood that any of the variously recited ranges of one component may be individually combined with any of the variously recited ranges for any other component. As used herein, a trailing 0 in a number is intended to represent a significant digit for that number. For example, the number "1.0" includes two significant digits, and the number "1.00" includes three significant digits. Throughout the disclosure, the composition of glass-based articles and/or glass-based substrates refers to the composition of the formed article or substrate as determined in wt % by: X-ray fluorescence and comparison with standard samples for alumina, phosphorous, alkaline earth metals, transition metals (e.g., ZnO, $TiO_2$, $Fe_2O_3$, $SnO_2$), sodium oxide, and potassium oxide; an amount of $B_2O_3$ is measured using inductively coupled plasma (ICP) methods; an amount of lithium oxide ($Li_2O$) is measured using flame emission spectroscopy; and an amount of $SiO_2$ is taken as the balance of material (i.e., 100%—materials measured using X-ray fluorescence, ICP, and flame emission spectroscopy), and then the composition is converted from wt % to mol %, as reported herein. The composition refers to the composition of the formed article or substrate—not the raw materials added to form the glass-based article and/or glass-based substrate.

$SiO_2$ is the primary glass former in the glass articles described herein and may function to stabilize the network structure of the colored glass articles. The concentration of $SiO_2$ in the glass articles should be sufficiently high (e.g., 40 mol % or more) to enhance the chemical durability of the glass composition and, in particular, the resistance of the glass composition to degradation upon exposure to acidic solutions, basic solutions, and in water. The amount of $SiO_2$ may be limited (e.g., 80 mol % or less) to control the melting point of the glass composition, as the melting point of pure $SiO_2$ or high $SiO_2$ glasses is undesirably high. Thus, limiting the concentration of $SiO_2$ may aid in improving the meltability and the formability of the resultant colored glass article. In aspects, the glass article may comprise from 40 mol % to 80 mol % $SiO_2$, from 50 mol % to 75 mol % $SiO_2$, or from 57 mol % to 65 mol % $SiO_2$. In aspects, the glass article may comprise from about 45.0 mol % to about 67.0 mol % $SiO_2$, from 53.0 mol % to 66.0 mol % $SiO_2$, or from 60.0 mol % to 65.0 mol % $SiO_2$. In aspects, the concentration of $SiO_2$ in the glass article may be 40 mol % or more, 45 mol % or more, 50 mol % or more, 52 mol % or more, 53 mol % or more, 54 mol % or more, 55 mol % or more, 56 mol % or more, 57 mol % or more, 58 mol % or more, 60 mol % or more, 80 mol % or less, 75 mol % or less, 73 mol % or less, 71 mol % or less 70 mol % or less, 68 mol % or less, 67 mol % or less, 66 mol % or less, 65 mol % or less 64 mol % or less, 63 mol % or less, 62 mol % or less, 61 mol % or less, 60 mol % or less, or 59 mol % or less. In aspects, the concentration of $SiO_2$ in the glass article may be from 40 mol % to 70 mol %, 45 mol % to 70 mol %, from 50 mol % to about 68 mol %, from about 52 mol % to about 68 mol %, from about 53 mol % to about 67 mol %, from about 54 mol % to about 67 mol %, from about 55 mol % to about 66 mol %, from about 56 mol % to about 65 mol %, from about 57 mol % to about 65 mol %, from about 58 mol % to about 65 mol %, from about 60 mol % to about 65 mol %, from about 60 mol % to about 64 mol %, from about 60 mol % to about 63 mol %, from about 60 mol % to about 62 mol %, or any range or subrange therebetween.

Like $SiO_2$, $Al_2O_3$ may also stabilize the glass network and additionally provides improved mechanical properties and chemical durability to the glass article. The amount of $Al_2O_3$ may also be tailored to control the viscosity of the glass composition. $Al_2O_3$ may be included such that the resultant glass article has the desired fracture toughness (e.g., greater than or equal to 0.7 MPa·m$^{1/2}$). However, if the amount of $Al_2O_3$ is too high (e.g., 25 mol % or more), the viscosity of the glass melt may increase, thereby diminishing the formability of the glass article. In aspects, if the amount of $Al_2O_3$ is too high, the solubility of one or more colorants of the colorant package in the glass melt may decrease, resulting in the formation of undesirable crystal phases in the glass. For example and without limitation, when the colorant package includes $Cr_2O_3$, the solubility of $Cr_2O_3$ in the glass melt may decrease with increasing $Al_2O_3$ concentrations (e.g., concentrations greater than or equal to 17.5 mol %), leading to the precipitation of undesirable crystal phases. Without wishing to be bound by theory, it is hypothesized that similar behavior may occur with colorants other than $Cr_2O_3$. Accordingly, in aspects, the glass com article may comprise from 7 mol % to 25 mol % $Al_2O_3$, from 10 mol % to 20 mol % $Al_2O_3$, or from 12 mol % to 17 mol % $Al_2O_3$. In aspects, the glass article may comprise from 10 mol % to 20 mol % $Al_2O_3$, from 10 mol % to about 17.5 mol % $Al_2O_3$, or from 12 mol % to about 17.25 mol % $Al_2O_3$. In aspects, the glass article may comprise from 11 mol % to 19 mol % $Al_2O_3$ or from 14 mol % to 17 mol % $Al_2O_3$. In aspects, the concentration of $Al_2O_3$ in the glass article may be 7 mol % or more, 8 mol % or more, 9 mol % or more, 10 mol % or more, 11 mol % or more 12 mol % or more, 12.5 mol % or more, 13 mol % or more, 13.5 mol % or more, 14 mol % or more, 14.5 mol % or more, 15 mol % or more, 15.5 mol % or more, 16 mol % or more, 25 mol % or less, 23 mol % or less, 20 mol % or less, 19 mol % or less, 18 mol % or less, 17.5 mol % or less, 17.25 mol % or less, 17 mol % or less, 16.75 mol % or less, or 16 mol % or less. In aspects, the concentration of $Al_2O_3$ in the glass article may be from 7 mol % to 25 mol %, from 7 mol % to 23 mol %, from 8 mol % to 20 mol %, from 9 mol % to 19 mol %, from 10 mol % to 18 mol %, from 11 mol % to 17.5 mol %, from 12 mol % to 17.25 mol %, from 13 mol % to 17 mol %, from 14 mol % to 16.75 mol %, from 14.5 mol % to 16 mol %, or any range or subrange therebetween.

$B_2O_3$ decreases the melting point of the glass composition, which may improve retention of certain colorants in the glass, for example and without limitation, Au. $B_2O_3$ may also improve the damage resistance of the resultant colored glass article. In addition, $B_2O_3$ may be added to reduce the formation of non-bridging oxygen, the presence of which may reduce fracture toughness. The concentration of $B_2O_3$ should be sufficiently high (e.g., 1 mol % or more) to reduce the melting point of the glass composition, improve the formability, and increase the fracture toughness of the colored glass article. However, if $B_2O_3$ is too high (e.g., 15 mol % or more), the annealing point and strain point may decrease, which increases stress relaxation and reduces the overall strength of the colored glass article. In aspects, the glass article may comprise from 1.0 mol % to 15 mol % $B_2O_3$, from 2.0 mol % to 10 mol % $B_2O_3$, or from 4 mol % to 8 mol % $B_2O_3$. In aspects, the glass article may comprise from 3.0 mol % to 12 mol % $B_2O_3$, from 3.5 mol % to 8.0 mol % $B_2O_3$, or from 4.0 mol % to 6.0 mol % $B_2O_3$. In aspects, the concentration of $B_2O_3$ in the glass article may be 1 mol % or more, 2 mol % or more, 3 mol % or more, 3.5 mol % or more, 4 mol % or more, 4.5 mol % or more, 5 mol % or more, 5.5 mol % or more, 15 mol % or less, 12 mol % or less, 10 mol % or less, 9 mol % or less, 8 mol % or less, 7.5 mol % or less, 7 mol % or less, 6.5 mol % or less, or 6 mol % or less. In aspects, the concentration of $B_2O_3$ in the glass article may be from 1 mol % to 15 mol %, from 2 mol % to 12 mol %, from 3 mol % to 10 mol %, from 3.5 mol % to 9 mol %, from 4 mol % to 8 mol %, from 4.5 mol % to 7.5 mol %, from 5 mol % to 7 mol %, from 5.5 mol % to 6.5 mol %, or any range or subrange therebetween.

As described above, the glass articles may contain alkali oxides (e.g., $Li_2O$, $Na_2O$, and $K_2O$) to enable the ion-exchangeability of the glass articles.

$Li_2O$ aids in the ion-exchangeability of the glass article and also reduces the softening point of the glass composition, thereby increasing the formability of the glass articles. The addition of $Li_2O$ facilitates the exchange of both $Na^+$ and $K^+$ cations into the glass for strengthening the glass and also facilitates producing a relatively high surface compressive stress and relatively deep depth of compression, improving the mechanical characteristics of the resultant colored glass article. In addition, $Li_2O$ decreases the melting point of the glass composition, which may improve retention of colorants in the glass, for example and without limitation, Au. The concentration of $Li_2O$ in the glass articles should be sufficiently high (e.g., 1 mol % or more) to reduce the melting point of the glass composition and achieve the desired maximum central tension (e.g., 40 MPa or more) following ion exchange. However, if the amount of $Li_2O$ is too high (e.g., greater than 20 mol %), the liquidus temperature may increase, thereby diminishing the manufacturability of the colored glass article. In aspects, the glass article may comprise from 1 mol % to 20 mol % $Li_2O$, from 5 mol % to 18 mol % $Li_2O$, or from 8 mol % to 15 mol % $Li_2O$. In aspects, the glass article may comprise from 3.0 mol % to 18.0 mol % $Li_2O$, from 8.0 mol % to 14.0 mol % $Li_2O$, or from 9.0 mol % to 13.5 mol % $Li_2O$. In aspects, the concentration of $Li_2O$ in the glass article may be 1 mol % or more, 3 mol % or more, 5 mol % or more, 7 mol % or more, 7.5 mol % or more, 8 mol % or more, 8.5 mol % or more, 8.8 mol % or more, 9 mol % or more, 9.2 mol % or more, 9.4 mol % or more, 9.6 mol % or more, 9.8 mol % or more, 10 mol % or more, 11 mol % or more, 11.5 mol % or more, 12 mol % or more, 20 mol % or less, 18 mol % or less, 17 mol % or less, 16 mol % or less, 15 mol % or less, 14 mol % or less, 13.5 mol % or less, 13 mol % or less, 12.5 mol % or less, 12 mol % or less, 11.5 mol % or less, or 11 mol % or less. In aspects, the concentration of $Li_2O$ in the glass article may be from 1 mol % to 20 mol %, from 3 mol % to 18 mol %, from 5 mol % to 17 mol %, from 7 mol % to 16 mol %, from 7.5 mol % to 15 mol %, from 8 mol % to 14 mol %, from 8.5 mol % to 13.5 mol %, from 8.8 mol % to 13 mol %, from 9 mol % to 12.5 mol %, from 9.2 mol % to 12.5 mol %, from 9.4 mol % to 12 mol %, from 9.6 mol % to 12 mol %, from 9.8 mol % to 11.5 mol %, from 10 mol % to 11 mol %, or any range or subrange therebetween.

$Na_2O$ improves diffusivity of alkali ions in the glass and thereby reduces ion-exchange time and helps achieve the desired surface compressive stress (e.g., 300 MPa or more). The addition of $Na_2O$ also facilitates the exchange of $K^+$ cations into the glass for strengthening and improving the mechanical characteristics of the resultant colored glass article. $Na_2O$ also improves the formability of the colored glass article. In addition, $Na_2O$ decreases the melting point of the glass composition, which may improve retention of certain colorants in the glass, for example, Au. However, if too much $Na_2O$ is added to the glass composition, the melting point may be too low. In aspects, the concentration of $Li_2O$ present in the glass article may be greater than the concentration of $Na_2O$ present in the glass article. In aspects, the glass article may comprise from 1.0 mol % to 12 mol % $Na_2O$, from 1.5 mol % to 8.0 mol % $Na_2O$, or from 1.5 mol % to 6.0 mol % $Na_2O$. In aspects, the concentration of $Na_2O$ in the glass article may be greater than 0 mol %, 0.01 mol % or more, 0.5 mol % or more, 1 mol % or more, 1.5 mol % or more, 2 mol % or more, 2.5 mol % or more, 3 mol % or more, 3.5 mol % or more, 4 mol % or more, 4.5 mol % or more, 15 mol % or less, 12 mol % or less, 10 mol % or less, 9 mol % or less, 8.5 mol % or less, 8 mol % or less, 7.5 mol % or less, 7 mol % or less, 6.5 mol % or less, 6 mol % or less, 5.5 mol % or less, 5 mol % or less, 4.5 mol % or less, or 4 mol % or less. In aspects, the concentration of $Na_2O$ in the glass article may be from greater than 0 mol % to 15 mol %, from 0.01 mol % to 12 mol %, from 0.5 mol % to 12 mol %, from 1 mol % to 10 mol %, from 1.5 mol % to 9 mol %, from 2 mol % to 8.5 mol %, from 2.5 mol % to 8 mol %, from 3 mol % to 7.5 mol %, from 3.5 mol % to 7 mol %, from 4 mol % to 6.5 mol %, from 4.5 mol % to 6 mol %, or any range or subrange therebetween In aspects, the concentration of $Na_2O$ in the glass article may be from 0.5 mol % to 10 mol %, from 1 mol % to 9 mol %, from 1 mol % to 8 mol %, from 1 mol % to 7 mol %, from 1 mol % to 6.5 mol %, from 1 mol % to 6 mol %, from 1 mol % to 5.5 mol %, from 1 mol % to 5 mol %, from 1.5 mol % to 4.5 mol %, from 2 mol % to 4 mol %, or any range or subrange therebetween.

$K_2O$, when included, promotes ion-exchange and may increase the depth of compression and decrease the melting point to improve the formability of the colored glass article. However, adding too much $K_2O$ may cause the surface compressive stress and melting point to be too low. Accordingly, in aspects, the amount of $K_2O$ added to the glass composition may be limited. In aspects, the glass article may optionally comprise from greater than 0 mol % to 3 mol % $K_2O$, from greater than 0.01 mol % to 1.0 mol % $K_2O$, or from 0.1 mol % to 0.7 mol % $K_2O$. In aspects, the concentration of $K_2O$ in the glass article may be greater than 0 mol %, 0.01 mol % or more, 0.1 mol % or more, 0.2 mol % or more, 0.25 mol % or more, 0.3 mol % or more, 0.4 mol % or more, 0.5 mol % or more, 3 mol % or less, 2.5 mol % or less, 2 mol % or less, 1.5 mol % or less, 1 mol % or less, 0.7 mol % or less, 0.5 mol % or less, or 0.25 mol % or less. In aspects, the concentration of $K_2O$ in the glass article may be from greater 0 mol % to 3 mol %, from 0.01 mol % to 2.5 mol %, from 0.1 mol % to 2 mol %, from 0.2 mol % to 1.5 mol %, from 0.25 mol % to 1 mol %, from 0.3 mol % to 0.7 mol %, from 0.4 mol % to 0.5 mol %, or any range or subrange therebetween.

$R_2O$, as used herein, is the sum (in mol %) of $Li_2O$, $Na_2O$, and $K_2O$ present in the glass article (i.e., $R_2O=Li_2O$ (mol %)+$Na_2O$ (mol %)+$K_2O$ (mol %). Like $B_2O_3$, the alkali oxides aid in decreasing the softening point and molding temperature of the glass composition, thereby offsetting the increase in the softening point and molding temperature of the glass composition due to higher amounts of $SiO_2$ in the glass composition, for example. The softening point and molding temperature may be further reduced by including combinations of alkali oxides (e.g., two or more alkali oxides) in the glass composition, a phenomenon referred to as the "mixed alkali effect." However, it has been found that if the amount of alkali oxide is too high, the average coefficient of thermal expansion of the glass composition increases to greater than $100 \times 10^{-7}/°$ C., which may be undesirable. In aspects, the concentration of $R_2O$ in the glass article can be from 5 mol % to 20 mol %, from 8 mol % to 19 mol %, or from 10 mol % to 18 mol %. In aspects, the concentration of $R_2O$ in the glass article can be 5 mol % or more, 6 mol % or more, 8 mol % or more, 10 mol % or more, 11 mol % or more, 12.0 mol % or more, 12.5 mol % or more, 13.0 mol % or more, 13.5 mol % or more, 14.0 mol % or more, 20 mol % or less, 19 mol % or less, 18 mol % or less, 17 mol % or less, 16.0 mol % or less, or 15.0 mol % or less. In aspects, the concentration of $R_2O$ in the glass article can range from 5 mol % to 20 mol %, from 6 mol % to 19 mol %, from 8 mol % to 18 mol %, from 10 mol % to 18 mol %, from 11 mol % to 17 mol %, from 12 mol % to 17 mol %, from 13.0 mol % to 16.0 mol %, from 13.5 mol % to 15.5 mol %, from 14.0 mol % to 15.0 mol %, or any range or subrange therebetween.

In aspects, a difference between $R_2O$ and $Al_2O_3$ (i.e. $R_2O$ (mol %)—$Al_2O_3$ (mol %)) in the glass article may be adjusted to produce a desired observable color (e.g., pink, purple, red, orange, or blue). The analyzed $R_2O$—$Al_2O_3$ of the glass article, along with the added colorant package, may correlate with the observable color of the colored glass article after an optional heat treatment, as discussed herein. In aspects, $R_2O$—$Al_2O_3$ in the glass article may be from -5 mol % to 7 mol % or from -3 mol % to 2 mol %. In aspects, $R_2O$—$Al_2O_3$ in the glass article may be from -3 mol % to 6 mol % or from -1 mol % to 5 mol %. In aspects, $R_2O$—$Al_2O_3$ in the glass article may be from -5 mol % to 1.5 mol % or from -3 mol % to 1.5 mol %. In aspects, $R_2O$—$Al_2O_3$ in the glass article may be from 1.5 mol % to 7 mol % or from 1.5 mol % to 5 mol %. In aspects, $R_2O$—$Al_2O_3$ in the glass article may be -5 mol % or more, -4 mol % or more, -3 mol % or more, -2.5 mol % or more, -2 mol % or more, -1.5 mol % or more, 0.2 mol % or more, 0.5 mol % or more, 1 mol % or more, 1.5 mol % or more, 2 mol % or more, 7 mol % or less, 6.5 mol % or less, 6 mol % or less, 5.5 mol % or less, 5 mol % or less, 4.5 mol % or less, 4 mol % or less, 3.5 mol % or less, 3 mol % or less, 2.5 mol % or less, 2 mol % or less, 1.5 mol % or less, 1 mol % or less, or 0.5 mol % or less. In aspects, $R_2O$—$Al_2O_3$ in the glass article may be from -5 mol % to 7 mol %, from -4 mol % to 6.5 mol %, from -3 mol % to 6 mol %, from -2.5 mol % to 5.5 mol % from -2 mol % to 5 mol %, from -1.5 mol % to 4.5 mol %, from 0.2 mol % to 4 mol %, from 0.5 mol % to 3.5 mol %, from 1 mol % to 3 mol %, from 1.5 mol % to 2.5 mol %, or any range or subrange therebetween.

In aspects, the glass articles described herein further include MgO and/or ZnO to improve retention of colorants in the glass, such as Au or the like, for example, by lowering the melting point of the glass composition. Decreasing the melting point of the glass composition may help improve colorant retention because the glass compositions may be melted at relatively lower temperatures and the evaporation of colorants from the glass, such as gold, may be reduced. Without wishing to be bound by theory, it is also believed that partially replacing $Li_2O$ and/or $Na_2O$ with MgO and/or ZnO may also help improve retention of the colorants. Specifically, $Li_2O$ and/or $Na_2O$ is included in the batch glass composition as lithium carbonate and sodium carbonate, respectively. Upon melting the glass composition, carbonate gas is released from the glass composition. Colorants such as Au escape from the glass composition within the carbonate gas. Therefore, the improved colorant retention may be due to the reduced amount of carbonate. Further, it is believed that MgO and/or ZnO may improve the solubility of some colorants in the glass (e.g., $Cr_2O_3$), thereby avoiding the formation of undesirable crystal phases (e.g., Cr-spinel crystals) and expanding the color gamut that may be achieved by the resultant colored glass articles. As used herein, "color gamut" refers to the pallet of colors that may be achieved by the colored glass articles within the CIELAB color space. For example, in aspects where the colorant includes $Cr_2O_3$, the sum of MgO and ZnO present in the glass article (i.e., MgO (mol %)+ZnO (mol %)) may be from greater than 0 mol % to 6 mol % or 4.5 mol % or less. Without wishing to be bound by theory, it is hypothesized that similar behavior may occur with colorants other than Au and $Cr_2O_3$. In aspects, the sum (in mol %) of MgO and ZnO present in the glass article (i.e., MgO (mol %)+ZnO (mol %)) can be from 0 mol % to 6 mol %, from 0.1 mol % to 4 mol %, or from 0.5 mol % to 2.0 mol %. In aspects, the sum (in mol %) of MgO and ZnO present in the glass article (i.e., MgO (mol %)+ZnO (mol %)) may be greater than 0 mol %, 0.1 mol % or more, 0.5 mol % or more, 1.0 mol % or more, 1.5 mol % or more, 2.0 mol % or more, 2.5 mol % or more, 3 mol % or more, 3.5 mol % or more, 6 mol % or less, 5 mol % or less, 4 mol % or less, 3.5 mol % or less, 3.0 mol % or less, 2.5 mol % or less, 2.0 mol % or less, or 1.5 mol % or less. In aspects, the sum of MgO and ZnO in the glass may be from greater than 0 mol % to 7 mol %, from 0.1 mol % to 6 mol %, from 0.5 mol % to 5 mol %, from 0.5 mol % to 4 mol %, from 1.0 mol % to 3.5 mol %, from 1.0 mol % to 3.0 mol %, from 1.0 mol % to 2.5 mol %, from 1.5 mol % to 2.0 mol %, or any range or subrange therebetween.

In addition to improving colorant retention, MgO lowers the viscosity of the glass compositions, which enhances the formability, the strain point, and the Young's modulus, and may improve ion-exchangeability. However, when too much MgO is added to the glass composition, the diffusivity of sodium and potassium ions in the glass composition decreases which, in turn, adversely impacts the ion-exchange performance (i.e., the ability to ion-exchange) of the resultant colored glass article. In aspects, the glass article may comprise from greater than 0 mol % to 8 mol % MgO, from 0 mol % to 4.5 mol % MgO, or from 0.5 mol % to 2.0 mol %. In aspects, the glass article may comprise from 0.5 mol % to 7 mol % MgO. In aspects, the concentration of MgO in the glass article may be greater than 0 mol %, 0.5 mol % or more, 1 mol % or more, 1.5 mol % or more, 2 mol % or more, 2.5 mol % or more, 8 mol % or less, 7 mol % or less, 6 mol % or less, 5 mol % or less, 4 mol % or less, 3.5 mol % or less, 3 mol % or less, 2.5 mol % or less, 2 mol % or less, 1.5 mol % or less, or 1 mol % or less. In aspects, the concentration of MgO in the glass article may be from greater than or equal to 0 mol % to 8 mol %, from 0.5 mol % to 7 mol %, from 0.5 mol % to 6 mol %, from 1 mol % to 5 mol %, from 1 mol % to 4 mol %, from 1.5 mol % to 3.5 mol %, from 1.5 mol % to 3 mol %, from 1.5 mol % to 2 mol %, or any range or subrange therebetween. In aspects, the glass article may be substantially free or free of MgO.

In addition to improving colorant retention, ZnO lowers the viscosity of the glass compositions, which enhances the formability, the strain point, and the Young's modulus, and may improve ion-exchangeability. However, when too much ZnO is added to the glass composition, the diffusivity of sodium and potassium ions in the glass composition decreases which, in turn, adversely impacts the ion-exchange performance (i.e., the ability to ion-exchange) of the resultant colored glass article. In aspects, the glass article may comprise from greater than 0 mol % to 5 mol % ZnO, from greater than 0 mol % to 4.5 mol % ZnO, from 0.1 mol % to 4 mol % ZnO, from 0.25 mol % to 1.25 mol %, or from 0.5 mol % to 1 mol %. In aspects, the concentration of ZnO in the glass article may be greater than 0 mol %, 0.1 mol % or more, 0.25 mol % or more, 0.5 mol % or more, 0.7 mol % or more, 1 mol % or more, 1.5 mol % or more, 2 mol % or more, 5 mol % or less, 4.5 mol % or less, 4 mol % or less, 3.5 mol % or less, 3 mol % or less, 2.5 mol % or less, 2 mol % or less, 1.75 mol % or less, 1.5 mol % or less, 1.25 mol % or less, or 1 mol % or less. In aspects, the concentration of ZnO in the glass composition may be from greater than 0 mol % to 5 mol %, from 0.1 mol % to 4.5 mol %, from 0.25 mol % to 4 mol %, from 0.5 mol % to 3.5 mol %, from 0.75 mol % to 3 mol %, from 1 mol % to 2.5 mol %, from 1.5 mol % to 2 mol %, or any range or subrange therebetween. In aspects, the glass article may be substantially free or free of ZnO.

Like ZnO and the alkaline earth oxide MgO, other alkaline earth oxides, for example CaO, SrO, and BaO, decrease the melting point of the glass composition. Accordingly, CaO, SrO, and/or BaO may be included in the glass articles to lower the melting point of the glass composition, which may help improve colorant retention.

In aspects, the glass articles described herein may further comprise CaO. CaO lowers the viscosity of a glass composition, which enhances the formability, the strain point and the Young's modulus, and may improve the ion-exchange-ability. However, when too much CaO is added to the glass composition, the diffusivity of sodium and potassium ions in the glass composition decreases which, in turn, adversely impacts the ion-exchange performance (i.e., the ability to ion-exchange) of the resultant glass. In aspects, the concentration of CaO in the glass article may be from 0 mol % to 7 mol %, from 0.5 mol % to 6 mol %, or from 1.0 mol % to 5.0 mol %. In aspects, the concentration of CaO in the glass article may be 0 mol % or more, 0.25 mol % or more, 0.5 mol % or more, 0.75 mol % or more, 1.0 mol % or more, 1.25 mol % or more, 1.50 mol % or more, 2.0 mol % or more, 2.5 mol % or more, 7 mol % or less, 6.5 mol % or less, 6 mol % or less, 5.5 mol % or less, 5.0 mol % or less, 4.5 mol % or less, 4.0 mol % or less, 3.5 mol % or less, 3.0 mol % or less, 2.5 mol % or less, 2.0 mol % or less, 1.75 mol % or less, 1.5 mol % or less, 1.25 mol % or less, or 1.0 mol % or less. In aspects, the concentration of CaO in the glass article may be from greater than 0 mol % to 7 mol %, from greater than 0 mol % to 6.5 mol %, from 0.5 mol % to 6 mol %, from 0.75 mol % to 5.5 mol %, from 1.0 mol % to 5.0 mol %, from 1.25 mol % to 4.5 mol %, from 1.5 mol % to 4.0 mol %, from 2.0 mol % to 3.5 mol %, from 2.5 mol % to 3.0 mol %, or any range or subrange therebetween.

In aspects, the concentration of SrO in the glass article may be greater than 0 mol %, 0.25 mol % or more, 0.5 mol % or more, 0.75 mol % or more, 1 mol % or more, 2 mol % or less, 1.75 mol % or less, 1.5 mol % or less, 1.25 mol % or less, or 1 mol % or less. In aspects, the concentration of SrO in the glass article may be from greater than 0 mol % to 2 mol %, from 0.25 mol % to 1.75 mol %, from 0.5 mol % to 1.5 mol %, from 0.75 mol % to 1.25 mol %, from 0.75 mol % to 1 mol %, or any range or subrange therebetween. In aspects, the glass article may be substantially free or free of SrO.

In aspects, the concentration of BaO in the glass article may be greater than 0 mol %, 0.25 mol % or more, 0.5 mol % or more, 0.75 mol % or more, 1 mol % or more, 2 mol % or less, 1.75 mol % or less, 1.5 mol % or less, 1.25 mol % or less, or 1 mol % or less. aspects, the concentration of BaO in the glass article may be from greater than 0 mol % to 2 mol %, from 0.25 mol % to 1.75 mol %, from 0.5 mol % to 1.5 mol %, from 0.75 mol % to 1.25 mol %, from 0.75 mol % to 1 mol %, or any range or subrange therebetween. In aspects, the glass article may be substantially free or free of BaO.

R'O, as used herein, is the sum (in mol %) of MgO, ZnO, CaO, BaO, and SrO (i.e. R'O=MgO (mol %)+ZnO (mol %)+CaO (mol %)+BaO (mol %)+SrO (mol %)). In aspects, the concentration of R'O in the glass article can be from 0 mol % to 8 mol %, from 0.01 mol % to 7 mol %, or from 1.0 mol % to 2.0 mol %. In aspects, the concentration of R'O in the glass article may be greater than 0 mol %, 0.01 mol % or more, 0.5 mol % or more, 1.0 mol % or more, 1.5 mol % or more, 2.0 mol % or more, 2.5 mol % or more, 8 mol % or less, 7 mol % or less, 6 mol % or less, 5 mol % or less, 4.5 mol % or less, 4 mol % or less, or 3.5 mol % or less. In aspects, the concentration of R'O in the glass article may be from greater than 0 mol % to 8 mol %, from 0.01 mol % to 7 mol %, from 0.5 mol % to 6 mol % from 0.5 mol % to 5 mol %, from 0.5 mol % to 4.5 mol %, from 1.0 mol % to 4.0 mol %, from 1.0 mol % to 3.5 mol %, from 1.5 mol % to 3.5 mol %, from 2.0 mol % to 3.0 mol %, or any range or subrange therebetween. In aspects, the concentration of R'O can be about 2 mol % or less, for example in a range from about 0 mol % to about 2.0 mol %, from about 0.01 mol % to about 1.5 mol %, from about 0.01 mol % to about 1.0 mol %, from about 0.5 mol % to about 1.0 mol %. In aspects, the concentration of R'O in the glass article can be about 2.0 mol % or more, for example in a range from about 2.0 mol % to about 7 mol %, from about 2.5 mol % to about 7 mol %, from about 3 mol % to about 6.5 mol %, from about 3 mol % to about 6 mol %, or any range or subrange therebetween. In aspects, a sum of $R_2O$, CaO, MgO, and ZnO ($R_2O$ (mol %)+CaO (mol %)+MgO (mol %)+ZnO (mol %) may be 35 mol % or less, for example, from 5 mol % to 30 mol %, from 8 mol % to 30 mol %, from 10 mol % to 25 mol %, from 12 mol % to 25 mol %, from 15 mol % to 20 mol %, 18 mol % to 20 mol %, or any range or subrange therebetween.

In aspects, a sum of $Al_2O_3$, MgO, and ZnO present in the glass article (i.e., $Al_2O_3$ (mol %)+MgO (mol %)+ZnO (mol %)) may be from 12 mol % to 22 mol %. Without wishing to be bound by theory, it is believed that combinations of $Al_2O_3$, MgO, and ZnO within this range may aid in avoiding the formation of undesired crystal phases in the resultant colored glass articles. For example and without limitation, when the colorant package in the glass article includes $Cr_2O_3$, combinations of $Al_2O_3$, MgO, and ZnO within this range may avoid the formation of Cr-spinel crystals by increasing the solubility of the $Cr_2O_3$ colorant and thereby expanding the color gamut that may be achieved in the resultant colored glass articles. In aspects, a sum of $Al_2O_3$, MgO, and ZnO in the glass article may be from 13 mol % to 21.5 mol %. In aspects, the sum of $Al_2O_3$, MgO, and ZnO in the glass article may be 12 mol % or more, 13 mol % or more, 14 mol % or more, 15 mol % or more, 16 mol % or more, 22 mol % or less, 21.5 mol % or less, 21 mol % or less, 20.5 mol % or less, or 20 mol % or less. In aspects, the sum of $Al_2O_3$, MgO, and ZnO in the glass article may be from 12 mol % to 22 mol %, from 13 mol % to 21.5 mol %, from 14 mol % to 21 mol %, from 15 mol % to 20.5 mol %, from 16 mol % to 20 mol %, or any range or subrange therebetween.

In aspects, a sum of $Al_2O_3$, MgO, CaO, and ZnO present in the glass article (i.e., $Al_2O_3$ (mol %)+MgO (mol %)+CaO (mol %)+ZnO (mol %)) may be from 12 mol % to 24 mol %. Without wishing to be bound by theory, it is believed that combinations of $Al_2O_3$, MgO, CaO, and ZnO within this range may aid in avoiding the formation of undesired crystal phases in the glass article. In addition, a relatively high concentration of high field strength modifiers, for example Mg, Ca, and Zn cations, may also improve the mechanical properties, for example fracture toughness, elastic modulus, and drop test performance, of the resultant colored glass article. In aspects, a sum of $Al_2O_3$, MgO, CaO, and ZnO in the glass article may be from 12 mol % to 24 mol %. In aspects, the sum of $Al_2O_3$, MgO, CaO, and ZnO in the glass article may be 12 mol % or more, 13 mol % or more, 14 mol % or more, 15 mol % or more, 16 mol % or more, 24 mol % or less, 23 mol % or less, 22 mol % or less, 21.5 mol % or less, 21 mol % or less, 20.5 mol % or less, or 20 mol % or less. aspects, the sum of $Al_2O_3$, MgO, CaO, and ZnO in the glass article may be from 12 mol % to 24 mol %, from 13 mol % to 23 mol %, from 13 mol % to 22 mol %, from 14 mol % to 21.5 mol %, from 14 mol % to 21 mol %, from 15 mol % to 20.5 mol %, from 16 mol % to 20 mol %, or any range or subrange therebetween.

In aspects, the glass article may optionally include Cl, which may enable growth of particular crystal phases containing colorant. For example, when the colorant package included in the glass comprises Au, the inclusion of Cl may enable the growth of certain Au crystals. In aspects, the concentration of Cl in the glass article may be greater than 0 mol %, 0.1 mol % or more, 0.5 mol % or less, or 0.25 mol % or less. In aspects, the concentration of Cl in the glass article may be from greater than 0 mol % to 0.5 mol %, from 0.1 mol % to 0.25 mol %, or any range or subrange therebetween. In aspects, the glass article may be substantially free or free of Cl. In aspects where the colorant package comprises Ag, the glass article can include less than 100 ppm of halides, including Cl.

In aspects, the glass articles described herein may further comprise $ZrO_2$. Without wishing to be bound by theory, it is believed that $ZrO_2$ may act as a multivalent species that serves as redox couples to supply oxygen to certain colorants, for example Au, during relatively low-temperature heat treatment, which helps improve retention of the colorant. $ZrO_2$ may also act as an additional colorant, producing colored glass articles that may be, for example, red in color. In aspects, the glass article may comprise $ZrO_2$ in an amount of 0.01 mol % or more, 0.1 mol % or more, 0.2 mol % or more 0.25 mol % or more, 0.5 mol % or more, 0.75 mol % or more, 1 mol % or more, 2 mol % or less, 1.75 mol % or less, 1.5 mol % or less, 1 mol % or less, or 0.5 mol % or less. In aspects, the glass article may comprise $ZrO_2$ in an amount from 0.01 mol % to 2 mol %, from 0.1 mol % to 1.75 mol %, from 0.2 mol % to 1.5 mol %, from 0.25 mol % to 1.25 mol %, from 0.25 mol % to 1 mol %, from 0.25 mol % to 0.5 mol %, or any range or subrange therebetween.

In aspects, the glass compositions and the resultant colored glass articles described herein may further comprise $Fe_2O_3$, which may help improve colorant retention. $Fe_2O_3$ is a multivalent species that serves as redox couples to supply oxygen to certain colorants, for example Au, during relatively low-temperature heat treatment, which helps improve retention of the colorant. $Fe_2O_3$ may also act as a colorant, producing colored glass articles that may be, for example, be pink or red in color. In aspects, the glass article may comprise $Fe_2O_3$ in an amount of greater than 0 mol %, 0.001 mol % or more, 0.01 mol % or more, 0.02 mol % or more, 0.05 mol % or more, 0.1 mol % or more, 1 mol % or less, 0.75 mol % or less, 0.5 mol % or less, 0.25 mol % or less, or 0.1 mol % or less. In aspects, the glass article may comprise $Fe_2O_3$ in an amount from greater than 0 mol % to 1 mol %, from 0.001 mol % to 0.75 mol %, from 0.01 mol % to 0.5 mol %, from 0.02 mol % to 0.25 mol %, from 0.05 mol % to 0.1 mol %, or any range or subrange therebetween. In aspects, the glass article may comprise $Fe_2O_3$ in an amount of 100 parts-per-million (ppm) or more, 150 ppm or more, 200 ppm or more, 250 ppm or more, 300 ppm or more, 350 ppm or more, 400 ppm or less, 1,000 ppm or less, 600 ppm or less, 550 ppm or less, 500 ppm or less, or 450 ppm or less. In aspects, the glass article can comprise $Fe_2O_3$ in an amount from about 100 ppm to about 1,000 ppm, from about 150 ppm to about 600 ppm, from about 200 ppm to about 550 ppm, from about 250 ppm to about 500 ppm, or any range or subrange therebetween. In aspects, the glass article may be substantially free or free of $Fe_2O_3$.

In aspects, the glass compositions and the resultant colored glass articles described herein may further comprise $SnO_2$, $Sb_2O_3$, and/or $Bi_2O_3$. Like MgO and ZnO, $SnO_2$, $Sb_2O_3$, and $Bi_2O_3$ may help lower the melting point of the glass composition. Accordingly, $SnO_2$, $Sb_2O_3$, and/or $Bi_2O_3$ may be included in the glass articles to lower the melting point and improve colorant retention. In aspects in which the colorant package includes Ag, $SnO_2$ also aids in the reduction of Ag in the glass leading to the formation of silver particles in the glass. Without wishing to be bound by theory, in aspects where the colorant package includes Au, it is believed that additions of $SnO_2$ may also aid in the reduction of Au in the glass, leading to the formation of gold particles. In aspects that include $SnO_2$ and/or $Sb_2O_3$, the $SnO_2$ and/or $Sb_2O_3$ may also function as a fining agent.

In aspects, the glass article may comprise $SnO_2$ in an amount of greater than 0 mol %, 0.01 mol % or more, 0.05 mol % or more, 0.1 mol % or more, 0.25 mol % or more, 1 mol % or less, 0.75 mol % or less, 0.5 mol % or less, 0.25 mol % or less, or 0.1 mol % or less. In aspects, the glass article may comprise $SnO_2$ in an amount from greater than 0 mol % to 1 mol %, from 0.01 mol % to 0.75 mol %, from 0.05 mol % to 0.5 mol %, from 0.1 mol % to 0.25 mol %, or any range or subrange therebetween. In aspects, the glass article may be substantially free or free of $SnO_2$.

In aspects, the concentration of $Sb_2O_3$ in the glass article may be greater than 0 mol %, 0.01 mol % or more, 0.05 mol % or more, 0.1 mol % or more, 1 mol % or less, 0.75 mol % or less, 0.5 mol % or less, 0.25 mol % or less, or 0.1 mol % or less. aspects, the concentration of $Sb_2O_3$ in the glass article may be from greater than 0 mol % to 1 mol %, from 0.01 mol % to 0.75 mol %, from 0.05 mol % to 0.5 mol %, from 0.1 mol % to 0.25 mol %, or any range or subrange therebetween. In aspects, the glass article may be substantially free or free of $Sb_2O_3$. In aspects, the glass article can comprise $Sb_2O_3$ in an amount from 0.01 wt % to about 0.5 wt %, from 0.02 wt % to about 0.4 wt %, from 0.05 wt % to about 0.3 wt %, from 0.1 wt % to about 0.2 wt %, or any range or subrange therebetween.

In aspects, the concentration of $Bi_2O_3$ in the glass article may be greater than 0 mol %, 0.01 mol % or more, 0.05 mol % or more, 0.1 mol % or more, 1 mol % or less, 0.75 mol % or less, 0.5 mol % or less, 0.25 mol % or less, or 0.1 mol % or less. In aspects, the concentration of $Bi_2O_3$ in the glass article may be from greater than 0 mol % to 1 mol %, from 0.01 mol % to 0.75 mol %, from 0.05 mol % to 0.5 mol %, from 0.1 mol % to 0.25 mol %, or any range or subrange therebetween. In aspects, the glass article may be substantially free or free of $Bi_2O_3$.

In aspects, the concentration of $SO_3$ in the glass article may be 0.1 mol % or less, 0.01 mol % or less, or 0.001 mol % or less. In aspects, the glass article may be substantially free or free of $SO_3$.

In aspects, the glass articles described herein may further comprise a reduced concentration or be substantially free or free of $P_2O_5$. In aspects where $P_2O_5$ is included, the $P_2O_5$ may enhance the ion exchange characteristics of the resultant colored glass article. However, an increased concentration (i.e., greater than 1 mol %) of $P_2O_5$ may reduce the retention of one or more colorants in the colorant package. Without wishing to be bound by theory, it is believed that $P_2O_5$ may be more volatile than other glass network formers, for example $SiO_2$, which may contribute to reduced retention of colorants in the colorant package. In aspects, the concentration of $P_2O_5$ in the glass article may comprise be greater than 0 mol %, 0.1 mol % or more, 0.25 mol % or more, 1 mol % or less, 0.75 mol % or less, 0.5 mol % or less, or 0.25 mol % or less. In aspects, the concentration of $P_2O_5$ in the glass article may comprise be from greater than 0 mol % to 1 mol %, from 0.1 mol % to 0.75 mol %, from 0.25 mol % to 0.5 mol %, or any range or subrange therebetween. In aspects, the glass article may be substantially free or free of $P_2O_5$.

As used herein, a "multi-valent colorant" comprises at least two oxidation states where the oxidation state of the colorant is non-zero and two or more of the at least two oxidation states exhibit a color, as measured by absorbance from 400 nm to 750 nm or CIE a* and/or b* values. For example, chromium is a multi-valent colorant because chromium can exist as $Cr^{3+}$ and $Cr^{6+}$, where $Cr^{3+}$ is associated with a green color and $Cr^{6+}$ can be associated with a yellow color. Likewise, cerium is a multi-valent colorant because cerium can exist as $Ce^{4+}$ and $Ce^{3+}$, where $Ce^{4+}$ is associated with a yellow color and $Ce^{3+}$ is associated with a red color. Likewise, titanium is a multi-valent colorant because titanium can exist as $Ti^{2+}$ and $Ti^{4+}$, where $Ti^{2+}$ is associated with a purple color and $Ti^{4+}$ is associated with a white color or maybe colorless. Likewise, copper is a multi-valent colorant because copper can exist as $Cu^{1+}$ and $Cu^{2+}$, where $Cu^{1+}$ is associated with a green color and $Cu^{2+}$ is associated with a blue color. Likewise, nickel is a multi-valent colorant because nickel can exist as $Ni^{2+}$ and $Ni^{3+}$, where $Ni^{2+}$ is associated with yellow color and $Ni^{3+}$ is associated with purple color. Likewise, vanadium is a multi-valent colorant because vanadium can exist as $V^{4+}$ and $V^{5+}$, where $V^{4+}$ is associated with a green color and $V^{5+}$ is associated with a blue color. However, "multi-valent colorants" of the present disclosure do not include iron. While iron and/or manganese can be included in colorant packages of glasses of the present disclosure (e.g., as a redox couple for the multi-valent colorant), the colorant package will further include a multi-valent colorant in accordance with aspects of the present disclosure.

As used herein, a "molar ratio" of the multi-valent colorant in the glass article refers to an amount of the multi-valent colorant in the reduced form divided by a total amount of the multivalent colorant (i.e., the sum of the amount of the multi-valent colorant in the reduced form and the sum of the amount of the multi-valent colorant in the oxidized form). As used herein, the oxidized form has a higher oxidation state corresponding to fewer electrons than the reduced form. For example, chromium can exist as $Cr^{3+}$ and $Cr^{6+}$, where $Cr^{6+}$ is the oxidized form and $Cr^{3+}$ is the reduced form. Also, as discussed above, as used herein, a multi-valent colorant comprises at least two oxidation states where the oxidation state of the colorant is non-zero and two or more of the at least two oxidation states exhibit a color, as measured by absorbance from 400 nm to 750 nm or CIE a* and/or b* values. The molar ratio can be determined through X-ray photoelectron spectroscopy (XPS) or through correlation of the transmittance or absorbance spectrum with known reference samples.

In aspects, a molar ratio of the multi-valent colorant in the glass article can be about 0.1 or more, about 0.2 or more, about 0.3 or more, about 0.4 or more, about 0.5 or more, about 0.55 or more, about 0.6 or more, about 0.7 or more, about 0.9 or less, about 0.8 or less, about 0.75 or less, about 0.7 or less, about 0.65 or less, about 0.6 or less, about 0.5 or less, or about 0.4 or less. In aspects, the molar ratio of the multi-valent colorant in the glass article can range from about 0.1 to about 0.9, from about 0.2 to about 0.9, from about 0.3 to about 0.9, from about 0.4 to about 0.9, from about 0.5 to about 0.9, from about 0.55 to about 0.8, from about 0.6 to about 0.75, from about 0.6 to about 0.7, from about 0.6 to about 0.65, or any range or subrange therebetween. Alternatively, in aspects, the molar ratio of the multi-valent colorant can range from about 0.3 to about 0.9, from about 0.4 to about 0.8, from about 0.5 to about 0.75, from about 0.5 to about 0.7, from about 0.5 to about 0.65, from about 0.5 to about 0.6, or any range or subrange therebetween. Controlling the molar ratio of the multi-valent colorant can enable the glass article to reliably produce a predetermined color (e.g., CIE color coordinates). Controlling the molar ratio of the multi-valent colorant can increase a color gamut and/or a resolution of the colors obtained for a predetermined colorant package including the multi-valent colorant.

In aspects, the glass articles can comprise at least one colorant in a colorant package that functions to impart a desired color to the glass article. In aspects, the colorant package may comprise at least one of Au, Ag, $Cr_2O_3$, transition metal oxides (e.g., CuO, NiO, $Co_3O_4$, $TiO_2$, $Cr_2O_3$), rare earth metal oxides (e.g., $CeO_2$), and/or combinations thereof. In aspects, the glass articles may be from $1\times10^{-6}$ mol % to 10 mol % of colorant (i.e., the sum of all colorants in the colorant package). In aspects, the concentration of the colorant package in the glass article may be $1\times10^{-6}$ mol % or more, 0.0005 mol % or more, 0.001 mol % or more, 0.01 mol % or more, 0.1 mol % or more, 10 mol % or less, 9.5 mol % or less, 9 mol % or less, 8.5 mol % or less, 8 mol % or less, 7.5 mol % or less, 7 mol % or less, 6.5 mol % or less, 6 mol % or less, 5.5 mol % or less, 5 mol % or less, 4.5 mol % or less, 4 mol % or less, 3.5 mol % or less, 3 mol % or less, 2.5 mol % or less, 2 mol % or less 1.5 mol % or less 1 mol % or less, 0.5 mol % or less. In aspects, the concentration of the colorant package in the glass article may be from $1\times10^{-6}$ mol % to 10 mol %, from $1\times10^{-6}$ mol % to 9 mol %, from $1\times10^{-6}$ mol % to 8 mol %, from 0.0005 mol % to 7 mol %, from 0.0005 mol % to 6 mol %, from 0.0005 mol % to 5 mol %, from 0.001 mol % to 4 mol %, from 0.001 mol % to 3 mol %, from 0.001 mol % to 2 mol %, from 0.01 mol % to 1.5 mol %, from 0.01 mol % to 1 mol %, from 0.1 mol % to about 0.5 mol %, or any range or subrange therebetween. In aspects, the concentration of the colorant package in the glass article may be from $1\times10^{-6}$ mol % to 1 mol %, from 0.0005 mol % to about 0.5 mol %, from 0.001 mol % to 0.25 mol %, from 0.01 mol % to 0.1 mol %, or any range or subrange therebetween.

In aspects, the colorant package in the glass articles may include colorants that comprise or consist of transition metal oxides, rare earth oxides, or combinations thereof, to achieve a desired color. In aspects, transition metal oxides and/or rare earth oxides may be included in the glass compositions as the sole colorant or in combination with other colorants. In aspects, colorants based on transition metal oxides and/or rare earth oxides may include NiO, $Co_3O_4$, $Cr_2O_3$, CuO, $CeO_2$, $TiO_2$ and/or combinations thereof. In aspects, colorants based on transition metal oxides and/or rare earth oxides may further include oxides of V, Mn, Fe, Cu, Zr, Nb, Mo, Tc, Ru, Rh, Pd, Cd, Hf, Ta, W, Re, Os, Ir, Pt, Pr, Nd, Sm, Eu, Gd, Tb, Dy, Ho, and Er.

In aspects, the glass article may comprise a concentration of $NiO+Co_3O_4+Cr_2O_3+CuO+CeO_2+TiO_2$ of greater than 0 mol %, 0.001 mol % or more, 0.01 mol % or more, 0.02 mol % or more, 0.1 mol % or more, 0.5 mol % or more, 0.7 mol % or more, 0.9 mol % or more, 5 mol % or less, 4 mol % or less, 3 mol % or less, 2.5 mol % or less, 2 mol % or less, 1.5 mol % or less, 1 mol % or less, 0.75 mol % or less, 0.5 mol % or less, or 0.25 mol % or less. In aspects, the glass article may comprise a concentration of $NiO+Co_3O_4+Cr_2O_3+CuO+CeO_2+TiO_2$ can range from greater than 0 mol % to 5 mol %, from 0.001 mol % to 4 mol %, from 0.01 mol % to 3 mol %, from 0.02 mol % to 2.5 mol %, from 0.1 mol % to 2 mol %, from 0.5 mol % to 1.5 mol %, from 0.7 mol % to 1 mol %, or any range or subrange therebetween. In aspects, the glass composition and resultant glass article may comprise 0 mol % of one or more of NiO, $Co_3O_4$, $Cr_2O_3$, CuO, $CeO_2$, and/or $TiO_2$.

In aspects, the glass article may comprise a concentration of $NiO+Co_3O_4+Cr_2O_3+CuO$ from 0.001 mol to 3 mol %. In aspects, the glass article may comprise a concentration of $NiO+Co_3O_4+Cr_2O_3+CuO$ of greater than 0 mol %, 0.001 mol % or more, 0.01 mol % or more, 0.02 mol % or more, 0.1 mol % or more, 0.2 mol %, 0.5 mol %, 3 mol % or less, 2.5 mol % or less, 2 mol % or less, 1.5 mol % or less, 1 mol % or less, 0.5 mol % or less, or 0.4 mol % or less. In aspects, the glass article may comprise a concentration of $NiO+Co_3O_4+Cr_2O_3+CuO$ from greater than 0 mol % to 3 mol %, from 0.001 mol % to 2.5 mol %, from 0.01 mol % to 2 mol %, from 0.02 mol % to 1.5 mol %, from 0.1 mol % to 1 mol %, from 0.2 mol % to 0.5 mol %, from 0.2 mol % to 0.4 mol %, or any range or subrange therebetween. In aspects, the glass composition and resultant glass article may comprise 0 mol % of one or more of NiO, $Co_3O_4$, $Cr_2O_3$, and/or CuO.

In aspects, the glass article may comprise a concentration of $TiO_2$ of greater than 0 mol %, 0.01 mol % or more, 0.1 mol % or more, 0.2 mol % or more, 0.3 mol % or more, 2 mol % or less, 1.5 mol % or less, 1 mol % or less, 0.75 mol % or less, 0.5 mol % or less, or 0.4 mol % or less. In aspects, the glass article may comprise a concentration of $TiO_2$ from greater than 0 mol % to 2 mol %, from 0.01 mol % to 1.5 mol %, from 0.1 mol % to 1 mol %, from 0.2 mol % to 0.75 mol %, from 0.3 mol % to 0.5 mol %, from 0.3 mol % to 0.4 mol %, or any range or subrange therebetween.

In aspects, the glass article may comprise a concentration of $CeO_2$ of 0.1 mol % or more, 0.2 mol % or more, 0.3 mol % or more, 2 mol % or less, 1.5 mol % or less, 1 mol % or less, 0.75 mol % or less, 0.5 mol % or less, or 0.4 mol % or less. In aspects, the glass article may comprise a concentration of $CeO_2$ from 0.1 mol % to 2 mol %, from 0.2 mol % to 1.5 mol %, from 0.2 mol % to 1 mol %, from 0.3 mol % to 0.75 mol %, from 0.3 mol % to 0.5 mol, from 0.3 mol % to 0.4 mol %, or any range or subrange therebetween.

In aspects, the glass article may comprise a concentration of NiO of greater than 0 mol %, 0.01 mol % or more, 0.015 mol % or more, 0.02 mol % or more, 0.05 mol % or less, 0.04 mol % or less, 0.035 mol % or less, 0.03 mol % or less, 0.025 mol % or less, 0.02 mol % or less, or 0.015 mol % or less. In aspects, the glass article may comprise a concentration of NiO can be from greater than 0 mol % to 0.05 mol %, from 0.01 mol % to 0.04 mol %, from 0.01 mol % to 0.035 mol %, from 0.015 mol % to 0.03 mol %, from 0.02 mol % to 0.025 mol %, or any range or subrange therebetween.

In aspects, the glass article may comprise a concentration of CuO of greater than 0 mol %, 0.1 mol % or more, 0.15 mol % or more, 0.5 mol % or less, 0.4 mol % or less, 0.35 mol % or less, 0.3 mol % or less, 0.25 mol % or less, 0.2 mol % or less, or 0.15 mol % or less. In aspects, the glass article may comprise a concentration of CuO from greater than 0 mol % to 0.5 mol %, from 0.1 mol % to 0.4 mol % from 0.1 mol % to 0.35 mol %, from 0.15 mol % to 0.3 mol %, from 0.15 mol % to 0.25 mol %, from 0.15 mol % to 0.2 mol %, or any range or subrange therebetween.

In aspects, the glass article may comprise a concentration of $Co_3O_4$ of greater than 0 mol %, 0.0001 mol % or more, 0.0002 mol % or more, 0.0005 mol % or more, 0.001 mol % or more, 0.01 mol % or less, 0.0095 mol % or less, 0.009 mol % or less, 0.0085 mol % or less, 0.008 mol % or less, 0.0075 mol % or less, 0.007 mol % or less, 0.0065 mol % or less, 0.006 mol % or less, 0.0055 mol % or less, 0.005 mol % or less, 0.0045 mol % or less, 0.004 mol % or less, 0.0035 mol % or less, 0.003 mol % or less, 0.0025 mol % or less, or 0.002 mol % or less. In aspects, the glass article may comprise a concentration of $Co_3O_4$ from greater than 0 mol % to 0.01 mol % or less, from 0.0001 mol % to 0.009 mol % or less, from 0.0001 mol % to 0.008 mol %, from 0.0001 mol % to 0.007 mol %, from 0.0002 mol % to 0.006 mol %, from 0.0002 mol % to 0.005 mol %, from 0.0005 mol % to 0.004 mol %, from 0.0005 mol % to 0.003 mol %, from 0.01 mol % to 0.02 mol %, or any range or subrange therebetween.

In aspects, the glass article may comprise at least one of: 0.001 mol % or more of $NiO+Co_3O_4+Cr_2O_3+CuO$ (e.g., from 0.001 mol % to 3 mol or any of the ranges of $NiO+Co_3O_4+Cr_2O_3+CuO$ described herein); 0.1 mol % or more of $CeO_2$ (e.g., from 0.1 mol % to 1.5 mol % or any of the ranges of $CeO_2$ described herein); and/or 0.1 mol % or more of $TiO_2$ (e.g., from 0.1 mol % to 2 mol % or any of the ranges of $TiO_2$ described herein).

In aspects, the colorant package in the glass compositions and the resultant colored glass articles may comprise or consist of Au as a colorant to achieve a desired color. In aspects, Au may be included in the glass compositions as the sole colorant or in combination with other colorants. As described herein, in aspects, the glass compositions and the resultant colored glass articles may be formulated to improve the retention of Au, thereby expanding the color gamut achievable in the resultant colored glass articles. In aspects, the glass article may comprise a concentration of Au of 0.0005 mol % or more, 0.001 mol % or more, 0.002 mol % or more, 0.005 mol % or more, 0.01 mol % or more, 1 mol % or less, 0.75 mol % or less, 0.5 mol % or less, 0.25 mol % or less, 0.1 mol % or less, or 0.05 mol % or less. In aspects, the glass article may comprise a concentration of Au from 0.0005 mol % to 1 mol %, from 0.001 mol % to 0.75 mol %, from 0.002 mol % to 0.5 mol %, from 0.005 mol % to 0.25 mol %, from 0.01 mol % to 0.1 mol %, from 0.01 mol % to 0.05 mol %, or any range or subrange therebetween. In aspects, the glass article may comprise a concentration of Au of 1 ppm or more, 5 ppm or more, 10 ppm or more, 15 ppm or more, 100 ppm or more, 500 ppm or more, 1,000 ppm or more, 1 mol % or less, 0.75 mol % or less, 0.5 mol % or less, 10,000 ppm or less, 2,000 ppm or less, 1,000 ppm or less, 500 ppm or less, 100 ppm or less, 50 ppm or less, or 20 ppm or less. In aspects, the glass article may comprise a concentration of Au from 1 ppm to 10,000 ppm, from 1 ppm to 2,000 ppm, from 5 ppm to 1,000 ppm, from 5 ppm to 500 ppm, from 10 ppm to 100 ppm, from 15 ppm to 50 ppm, or any range or subrange therebetween. A different color gamut may be achieved by including secondary colorants in addition to Au. For example, in aspects, the glass composition and resultant colored glass article may comprise greater than or equal to 0 mol % and less than or equal to 1 mol % of a cation "M", wherein "M" is at least one of F, Cl, Br, Ti, V, Cr, Mn, Fe, Co, Ni, Cu, Se, Nb, Mo, Ru, Rh, Pd, Ag, Cd, In, Te, W, Ir, Pt, Ce, Pr, Nd, Sm, Eu, Gd, Tb, Dy, Ho, and Er.

In aspects, the colorant package used in the glass compositions and the resultant colored glass articles described herein may comprise or consist of $Cr_2O_3$ as a colorant to achieve a desired color. In aspects, $Cr_2O_3$ may be included in the glass compositions as the sole colorant or in combination with other colorants. For example, in aspects where $Cr_2O_3$ is utilized as a colorant, other transition metal oxides may be included in the glass composition to modify the color imparted to the glass, including, for example and without limitation, CuO, NiO, and/or $Co_3O_4$. As described herein, in aspects, the glass compositions and the resultant colored glass articles may be formulated to improve the solubility of $Cr_2O_3$, thereby expanding the color gamut achievable in the resultant colored glass articles.

In aspects, the glass article may comprise $Cr_2O_3$ of greater than 0 mol % or more, 0.001 mol % or more, 0.005 mol % or less, 0.01 mol % or more, 0.05 mol % or more, 2 mol % or less, 1.5 mol % or less, 1 mol % or less, 0.5 mol % or less, or 0.1 mol % or less. In aspects, the glass article may comprise $Cr_2O_3$ from greater than 0 mol % to 2 mol %, from 0.001 mol % to 1.5 mol %, from 0.005 mol % to 1 mol %, from 0.01 mol % to 0.05 mol %, from 0.05 mol % to 0.1 mol %, or any range or subrange therebetween. In aspects, the glass article may comprise $Cr_2O_3$ from 100 ppm to 10,000 ppm, from 100 ppm to 5,000 ppm, from 300 ppm to 2,000 ppm, from 500 ppm to 1,000 ppm, or any range or subrange therebetween.

In aspects where the colorant package includes $Cr_2O_3$ as a colorant, the glass compositions and the resultant colored glass articles are per-alkali (i.e., $R_2O$ (mol %)+R'O (mol %)—$Al_2O_3$ (mol %) is 0.5 mol % or more) to increase the solubility of $Cr_2O_3$ and avoid Cr-spinel crystal formation. However, when the glass composition has an excessive amount of alkali after charge balancing $Al_2O_3$, the alkali may form non-bridging oxygen around $SiO_2$, which degrades fracture toughness. Accordingly, in aspects, $R_2O$+R'O—$Al_2O_3$ in the glass article may be limited (e.g., less than or equal to 6 mol %) to prevent a reduction in fracture toughness.

In aspects, $R_2O$+R'O—$Al_2O_3$ in the glass article may be from 0.5 mol % to 6 mol % or from 1 mol % to 5.5 mol %. In aspects, $R_2O$+R'O—$Al_2O_3$ in the glass article may be 0.5 mol % or more, 1 mol % or more, 1.5 mol % or more, 2 mol % or more, 6 mol % or less, 5.5 mol % or less, 5 mol % or less, 4.5 mol % or less, 4 mol % or less, 3.5 mol % or less, 3 mol % or less, or 2.5 mol % or less. In aspects, $R_2O$+R'O—$Al_2O_3$ in the glass article may be from 0.5 mol % to 6 mol %, from 0.5 mol % to 5.5 mol %, from 1 mol % to 5 mol %, from 1 mol % to 4.5 mol %, from 1.5 mol % to 4 mol %, from 1.5 mol % to 3.5 mol %, from 2 mol % to 3 mol %, from 2 mol % to 2.5 mol %, or any range or subrange therebetween.

In aspects where the colorant package comprises $Cr_2O_3$ as a colorant, the glass compositions and the resultant colored glass articles may satisfy at least one of the following conditions and achieve the desired color: (1) less than or equal to 17.5 mol % $Al_2O_3$ and/or $R_2O$+R'O—$Al_2O_3$ greater than or equal to 0.5 mol %; (2) $Al_2O_3$+MgO+ZnO less than or equal to 22 mol %; and (3) MgO+ZnO less than or equal to 4.5 mol %. In aspects where the colorant comprises $Cr_2O_3$, different color gamuts may be achieved by including other colorants in addition to $Cr_2O_3$. For example, in aspects, the glass composition and resultant colored glass article may comprise NiO, $Co_3O_4$, CuO, or combinations thereof in addition to $Cr_2O_3$.

In aspects, the glass article may comprise from greater than 0 mol % to 4 mol % NiO as a colorant in addition to $Cr_2O_3$. In aspects, the concentration of NiO in the glass article may be greater than 0 mol %, 0.01 mol % or more, 0.05 mol % or more, 4 mol % or less, 3 mol % or less, 2 mol % or less 1 mol % or less, 0.5 mol % or less, 0.25 mol % or less, 0.1 mol % or less. In aspects, the concentration of NiO in the glass article may be from greater than 0 mol % to 4 mol %, from greater than 0 mol % to 3 mol %, from 0.01 mol % to 2 mol %, from 0.01 mol % to 1 mol %, from 0.01 mol %, from 0.5 mol %, from 0.05 mol % to 0.25 mol %, from 0.05 mol % to 0.1 mol %, or any range or subrange therebetween.

In aspects, the glass article may comprise from greater than 0 mol % to 2 mol % $Co_3O_4$ as a colorant in addition to $Cr_2O_3$. In aspects, the concentration of $Co_3O_4$ in the glass article may be greater than 0 mol %, 0.001 mol % or more, 0.005 mol % or more, 0.01 mol % or more, 2 mol % or less, 1.5 mol % or less, 1 mol % or less, 0.5 mol % or less, 0.1 mol % or less, or 0.05 mol % or less. In aspects, the concentration of $Co_3O_4$ in the glass article may be from greater than 0 mol % to 2 mol %, from 0.001 mol % to 1.5 mol %, from 0.001 mol % to 1 mol %, from 0.005 mol % to 0.5 mol %, from 0.005 mol % to 0.1 mol %, from 0.01 mol % to 0.05 mol %, or any range or subrange therebetween.

In aspects, the glass article may comprise from greater than 0 mol % to 5 mol % CuO as a colorant in addition to $Cr_2O_3$. In aspects, the concentration of CuO in the glass article may be greater than 0 mol %, 0.05 mol % or more, 0.1 mol % or more, 0.5 mol % or more, 1 mol % or more, 5 mol % or less, 4 mol % or less, 3 mol % or less, or 2 mol % or less. In aspects, the concentration of CuO in the glass article may be from greater than 0 mol % to 5 mol %, from 0.05 mol % to 4 mol %, from 0.1 mol % to 3 mol %, from 0.5 to 2 mol %, from 1 mol % to 2 mol %, or any range or subrange therebetween.

In aspects, the colorant package used in the glass compositions and the resultant colored glass articles may comprise or consist of Ag as a colorant to achieve a desired color. As described herein, in aspects, the glass compositions and the resultant colored glass articles may be formulated to improve the retention of Ag, thereby expanding the color gamut achievable in the resultant colored glass articles. In aspects, Ag may be included in the glass compositions as the sole colorant or in combination with other colorants. In aspects where Ag is utilized as a colorant in the glass composition, the color is created by the presence of anisotropic silver particles in the colored glass article that are formed from the reduction of silver ions in the glass composition. Accordingly, in aspects, the glass article may comprise a concentration of Ag from 0.01 mol % to 5 mol %. In aspects, the glass article may comprise a concentration of Ag of 0.01 mol % or more, 0.05 mol % or more, 0.1 mol % or more, 5 mol % or less, 2.5 mol % or less, 1 mol % or less, 0.75 mol % or less, 0.5 mol % or less, 0.25 mol % or less. In aspects, the concentration of Ag in the glass article may be from 0.01 mol % to 5 mol %, from 0.01 mol % to 2.5 mol %, from 0.05 mol % to 1 mol %, from 0.05 mol % to 0.75 mol %, from 0.1 mol % to 0.5 mol %, from 0.1 mol % to 0.25 mol %, or any range or subrange therebetween.

Conventionally, halide-free colored glass articles that comprise silver in as-formed condition (i.e., colored glass articles that have not been subjected to mechanical stretching) produce only yellow, orange, and red colors upon a suitable heat treatment applied to the glass article in as-formed condition. These colors are generated by the formation of isotropic (i.e., nominally spherical) silver particles in the conventional, halide-free colored glass article. These isotropic silver particles support a single localized surface plasmon resonance. Isotropic silver particles are the most energetically favorable to form because they have the lowest surface area to volume ratio and, as a result, they are the most common geometry observed in colored glass articles that comprise silver.

In contrast, colored glass articles that comprise anisotropic silver particles can produce a much broader range of colors, for example pink, purple, blue, green, brown, and black. As used herein, anisotropic silver particles refer to silver particles having an aspect ratio greater than 1, where the aspect ratio is the ratio of a longest dimension of the particle to a shortest dimension of the particle (e.g., a ratio of the length of the particle to the width of the particle is greater than 1). This is in contrast to an isotropic silver particle in which the aspect ratio is 1. The broader color gamut produced in glasses having anisotropic silver particles is because anisotropic silver particles support two distinct plasmonic modes: a higher energy transverse mode, and a lower energy longitudinal mode. These two distinct plasmonic modes can be observed via absorption spectra of the colored glass articles, which typically have at least two distinct peaks when anisotropic silver particles are present in the glass. By varying the aspect ratio of anisotropic particles, the resonant absorption of these two plasmonic modes can be tuned and, as a result, the color shifted.

Conventionally, the formation of anisotropic metallic silver particles in glass can be either induced by elongating spherical particles of silver through shear forces (e.g., by stretching the colored glass article via re-draw) using mechanical stretching processes. The mechanical stretching process results in a glass article having silver particles that are generally aligned in parallel with one another along the stretching direction (i.e., the glass is polarized).

A conventional alternative to mechanical stretching processes for creating anisotropic metallic particles in a glass article is the incorporation of halides (e.g., F, Cl, and Br) in the glass composition. In halide-containing colored glass articles, anisotropic silver particles are formed by templating the particles on elongated and/or pyramidal-shaped halide crystals. However, the inclusion of halides in the glass composition may be undesirable.

In contrast, the colored glass articles comprising Ag as a colorant described herein may generate a broad range of colors, for example yellow, orange, red, green, pink, purple, brown, and black without the inclusion of halides in the glass composition or the use of mechanical stretching processes. Without being bound by any particular theory, it is believed that anisotropic silver particles may form in the colored glass articles of the present disclosure due to a mechanism similar to the template growth caused by the inclusion of halides in the glass composition. However, instead of templating on a halide-containing crystal or mechanically stretching isotropic silver particles, it has been unexpectedly found that anisotropic silver crystals may form on nano-sized crystals of spodumene, lithium silicate, and/or beta quartz during heat treatment of the glass article in its as-formed condition. Additionally and/or alternatively, it is believed that anisotropic silver particles may precipitate at the interfaces between phase-separated regions of the colored glass article and/or regions that are only partially crystalized. Further, these crystals and/or phase-separated regions may form a nucleation site for the growth of anisotropic silver particles.

Accordingly, in aspects, the glass article including silver as a colorant may comprise less than 100 parts per million (ppm) of halides. For example, the glass compositions and the resultant colored glass articles comprising Ag as a colorant may comprise less than 100 ppm halides, for example less than 50 ppm halides, less than 25 ppm halides, less than 10 ppm halides, or even 0 ppm halides.

As noted previously, colored glass articles comprising Ag produced using mechanical stretching processes generally include anisotropic silver particles similar to those of the colored glass article of the present application. However, it should be noted that these mechanical stretching processes also result in the anisotropic silver particles being ordered and aligned (e.g., the longer dimensions of each anisotropic silver particles are facing in the same direction, for example in the direction of mechanical stretching). Put more simply, the colored glass articles produced using mechanical stretching processes are polarized due to the alignment of the anisotropic silver particles in the glass as a result of mechanical stretching.

In contrast, in the aspects described herein, the colored glass articles comprising Ag as a colorant, which are not subjected to mechanical stretching processes, are non-polarized. In aspects, the anisotropic silver particles of the colored glass article are not aligned (e.g., the longer dimensions of two or more anisotropic silver particles are facing in different directions) and, instead, the anisotropic silver particles are randomly aligned in the glass. As used herein, "length" refers to the longest dimension of the anisotropic silver particle. The "width" refers to the dimension of the anisotropic particle that is perpendicular to the length. To obtain the length and width of the anisotropic silver particles, a calibration is set by measuring the scale bar on the electron micrograph, converting each pixel to the appropriate unit length. The image is then converted into a grayscale image. A software measuring tool is then used to measure the number of pixels from one end to the other of each particle as well as the number of pixels across the greatest width of the particle. In aspects, an automated script is run to measure the length and aspect ratios of multiple particles automatically. In aspects, a length of the anisotropic silver particles can be 10 nm or more, 12 nm or more, 14 nm or more, 16 nm or more, 18 nm or more, 22 nm or more, 34 nm or more, 36 nm or more, 38 nm or more, 40 nm or less, 38 nm or less, 36 nm or less, 34 nm or less, 32 nm or less, 30 nm or less, 28 nm or less, 26 nm or less, 24 nm or less, 22 nm or less, or 20 nm or less. In aspects, the length of the anisotropic silver particles can range from 10 nm to 40 nm, from 12 nm to 36 nm, from 14 nm to 34 nm, from 14 nm to 32 nm, from 14 nm to 28 nm, from 14 nm to 26 nm, from 16 nm to 22 nm, from 16 nm to 20 nm, or any range or subrange therebetween. In aspects, a width of the anisotropic silver particles can be 6 nm or more, 8 nm or more, 10 nm or more, 12 nm or more, 14 nm or more, 20 nm or less, 18 nm or less, 16 nm or less, 14 nm or less, 12 nm or less, or 10 nm or less. In aspects, the width of the anisotropic silver particles can be from 6 nm to 20 nm, from 8 nm to 18 nm, from 8 nm to 16 nm, from 10 nm to 14 nm, or any range or subrange therebetween. As used herein, "aspect ratio" is defined as the ratio of the length to the width of an anisotropic silver particle. In aspects, an aspect ratio of the anisotropic silver particle can be greater than 1, 1.5 or more, 2 or more, 2.5 or more, 3 or less, 2.5 or less, 2 or less, or 1.5 or less. In aspects, the aspect ratio of the anisotropic silver particle can range from greater than 1 to 3, from 1.5 to 2.5, from 2 to 2.5, or any range or subrange therebetween.

The glass articles that include Ag as a colorant may further comprise one or more rare-earth oxides, for example $CeO_2$, $Nd_2O_3$, and/or $Er_2O_3$. Rare-earth oxides may be added to provide additional visible light absorbance to the glass (in addition to that imparted by the silver) to further alter the color of the glass. Rare-earth oxides may also be added to increase the Young's modulus and/or the annealing point of the glass.

In aspects, the glass articles that include Ag as a colorant may further comprise a concentration of $CeO_2$ of greater than 0 mol %, 0.05 mol % or more, 4 mol % or less, 3 mol % or less, 2 mol % or less, 1 mol % or less, or 0.5 mol % or less. In aspects, the glass articles that include Ag as a colorant may further comprise a concentration of $CeO_2$ from greater than 0 mol % to 4 mol %, from greater than 0 mol % to 3 mol %, from 0.05 mol % to 1 mol %, from 0.05 mol % to 0.5 mol %, or any range or subrange therebetween. In aspects, the glass article may be substantially free and/or free of $CeO_2$.

In aspects, the glass articles that include Ag as a colorant may comprise a concentration of $Nd_2O_3$ that is greater than 0 mol %, 0.1 mol % or more, 4 mol % or less, 3 mol % or less, 2 mol % or less, 1 mol % or less, or 0.5 mol % or less. In aspects, the glass articles that include Ag as a colorant may comprise a concentration of $Nd_2O_3$ from greater than 0 mol % to 4 mol %, from greater than 0 mol % to 3 mol %, from 0.1 mol % to 1 mol %, from 0.1 mol % to 0.5 mol %, or any range or subrange therebetween.

In aspects, the glass articles that include Ag as a colorant may comprise a concentration of $Er_2O_3$ that is greater than 0 mol %, 0.1 mol % or more, 4 mol % or less, 3 mol % or less, 2 mol % or less, 1 mol % or less, or 0.5 mol % or less. In aspects, the glass articles that include Ag as a colorant may comprise a concentration of $Er_2O_3$ from greater than 0 mol % to 4 mol %, from greater than 0 mol % to 3 mol %, from 0.1 mol % to 1 mol %, from 0.1 mol % to 0.5 mol %, or any range or subrange therebetween.

In aspects, the glass articles described herein may further include tramp materials, for example, $TiO_2$, MnO, $MoO_3$, $WO_3$, $Y_2O_3$, CdO, $As_2O_3$, sulfur-based compounds (e.g., sulfates), halogens, or combinations thereof. In aspects, the glass article may be substantially free or free of tramp materials, for example $TiO_2$, MnO, $MoO_3$, $WO_3$, $Y_2O_3$, CdO, $As_2O_3$, sulfur-based compounds (e.g., sulfates), halogens, or combinations thereof.

In aspects, decreasing the melting point of the glass article may help improve colorant retention because the glass compositions may be melted at relatively lower temperatures and colorant evaporation may be reduced. Accordingly, the glass articles described herein may optionally include MgO and/or ZnO, which help lower the melting point of the glass articles. $B_2O_3$, $Li_2O$, and $Na_2O$ also decrease the melting point of the glass articles. As described herein, other components may be added to the glass article to lower the melting point thereof, for example $SnO_2$, $Sb_2O_3$, and $Bi_2O_3$. In aspects, the glass article may have a melting point of 1300° C. or more, 1325° C. or more, 1350° C. or more, 1375° C. or more, 1400° C. or more, 1550° C. or less, 1525° C. or less, 1500° C. or less, 1475° C. or less, or 1450° C. or less. In aspects, the melting point of the glass article can be from 1300° C. to 1550° C., from 1325° C. to 1525° C., from 1350° C. to 1500° C., from 1375° C. to 1475° C., from 1400° C. to 1450° C., or any range or subrange therebetween. In aspects, a liquidus temperature of the glass article may be 1000° C. or more, 1050° C. or more, 1100° C. or more, 1400° C. or less, 1350° C. or less, or 1300° C. or less. In aspects, a liquidus temperature of the glass article may be from 1000° C. to 1400° C., from 1050° C. to 1350° C., from 1100° C. to 1300, or any range or subrange therebetween.

In aspects, the viscosity of the glass article may be adjusted to prevent devitrification of the glass composition and formation of colorant particles, for example Au particles, during melting and forming. Formation of colorant particles during melting and forming may limit the color gamut that may be achieved by heat treatment. In aspects, to achieve the desired viscosity and thereby prevent formation of colorant particles before melting, the glass articles described herein may satisfy the relationship 5.72*$Al_2O_3$ (mol %)−21.4*ZnO (mol %)−2.5*$P_2O_5$ (mol %)−35*$Li_2O$ (mol %)−16.6*$B_2O_3$ (mol %)−20.5*MgO (mol %)−23.3*$Na_2O$ (mol %)−27.9*SrO (mol %)−18.5*$K_2O$ (mol %)−26.3*CaO (mol %) is greater than −609 mol %. In aspects, the glass articles described herein may satisfy the relationship 5.72*$Al_2O_3$ (mol %)−21.4*ZnO (mol %)−2.5*$P_2O_5$ (mol %)−35*$Li_2O$ (mol %)−16.6*$B_2O_3$ (mol %)−20.5*MgO (mol %)−23.3*$Na_2O$ (mol %)−27.9*SrO (mol %)−18.5*$K_2O$ (mol %)−26.3*CaO (mol %) is greater than −609 mol %, greater than or equal to −575 mol %, greater than or equal to −550 mol %, or even greater than or equal to −525 mol %. In aspects, the glass compositions and the resultant glass articles described herein may satisfy the relationship 5.72*$Al_2O_3$ (mol %)−21.4*ZnO (mol %)−2.5*$P_2O_5$ (mol %)−35*$Li_2O$ (mol %)−16.6*$B_2O_3$ (mol %)−20.5*MgO (mol %)−23.3*$Na_2O$ (mol %)−27.9*SrO (mol %)−18.5*$K_2O$ (mol %)−26.3*CaO (mol %) is less than or equal to −400 mol %, less than or equal to −425 mol %, or even less than or equal to −450 mol %. In aspects, the glass articles described herein may satisfy the relationship 5.72*$Al_2O_3$ (mol %)−21.4*ZnO (mol %)−2.5*$P_2O_5$ (mol %)−35*$Li_2O$ (mol %)−16.6*$B_2O_3$ (mol %)−20.5*MgO (mol %)−23.3*$Na_2O$ (mol %)−27.9*SrO (mol %)−18.5*$K_2O$ (mol %)−26.3*CaO (mol %) is from −609 mol % to −400 mol %, from −575 mol % to −425 mol %, from −550 mol % to −450 mol %, from −525 mol % to −450 mol %, or any range or subrange therebetween.

In aspects where the colorant package comprises Au, relatively smaller concentrations of $R_2O$—$Al_2O_3$ (e.g., less than or equal to 1.5 mol %) may result in a blue or purple glass article. Relatively higher concentrations of $R_2O$—$Al_2O_3$ (e.g., greater than 1.5 mol %) may result in an orange or red glass article. For example, in aspects in which the colorant package includes Au, $R_2O$—$Al_2O_3$ may be from −5 mol % to 1.5 mol % and b* may be from −25 to 10 (exclusive of b* greater than −0.5 and less than 0.5). In aspects, $R_2O$—$Al_2O_3$ may be from −3 mol % to 1.5 mol % and b* may be from −15 to 7 (exclusive of b* greater than −0.5 and less than 0.5). In aspects, $R_2O$—$Al_2O_3$ may be from −5 mol % to 1.5 mol %, from −1 mol % to 1.5 mol %, from 0 mol % to 1.5 mol %, or any range or subrange therebetween; and b* may be from −25 to 10 (exclusive of b* greater than −0.5 and less than 0.5), from −15 to 7, from −10 to 5 (exclusive of b* greater than −0.5 and less than 0.5), from −10 to 5 (exclusive of b* greater than −0.5 and less than 0.5), or any range or subrange therebetween. In aspects in which the colorant package includes Au, $R_2O$—$Al_2O_3$ may be from 1.5 mol % to 7 mol % and b* may be from 0.5 to 25. In aspects, $R_2O$—$Al_2O_3$ may be from 1.5 mol % to 5 mol % and b* may be from 0.5 to 15. In aspects, $R_2O$—$Al_2O_3$ may be from 1.5 mol % to 7 mol %, from 1.5 mol % to 5 mol %, from 1.5 mol % to 3 mol %, or any range or subrange therebetween; and b* may be from 0.5 to 25, from 2.5 to 15, from 5 to 10, or any range or subrange therebetween.

In aspects, the colorant package can include more than one multi-valent colorant, for example, (1) both $TiO_2$ and NiO, (2) both $TiO_2$ and $CeO_2$, (3) both NiO and $CeO_2$; (4) all of $TiO_2$, $CeO_2$, and NiO; or (5) all of $TiO_2$, $CeO_2$, NiO, and $Co_3O_4$. Providing more than one multi-valent colorant can increase the color gamut achievable with a composition, for example, by adjusting the redox ratio as discussed herein. In further aspects, the colorant package can comprise one or more of $Fe_2O_3$, $MnO_2$, $ZrO_2$, $SnO_2$, or combinations thereof, which can act as a redox couple to alter the redox ratio of the multi-valent colorants while not being defined as a multi-valent colorant itself within the scope of the present disclosure.

In aspects, the colorant package can include more than one multi-valent colorant, for example, both $TiO_2$ and NiO. In further aspects, the colorant package can comprise an amount of $TiO_2$ in a range from about 0.001 mol % to about 2.0 mol %, from about 0.005 mol % to about 1.8 mol %, from about 0.01 mol % to about 1.8 mol %, from about 0.05 mol % to about 1.4 mol %, from about 0.1 mol % to about 1.0 mol %, from about 0.5 mol % to about 1.0 mol %, or any range or subrange therebetween. In further aspects, the colorant package can comprise an amount of $TiO_2$ of about 0.5 mol % or less, for example in a range from about 0.001 mol % to about 0.4 mol %, from about 0.005 mol % to about 0.1 mol %, from about 0.01 mol % to about 0.04 mol %, or any range or subrange therebetween. In further aspects, the colorant package can comprise an amount of $TiO_2$ of about 0.2 mol % or more, for example in a range from about 0.2 mol % to about 2.0 mol %, from about 0.5 mol % to about 1.8 mol %, about 1.0 mol % to about 1.8 mol %, from about 1.2 mol % to about 1.4 mol %, or any range or subrange therebetween. In further aspects, the colorant package can comprise an amount of NiO in a range from about 0.001 mol % to about 1.0 mol %, from about 0.005 mol % to about 1.0 mol %, from about 0.01 mol % to about 1.0 mol %, from about 0.05 mol % to about 0.8 mol %, from about 0.07 mol % to about 0.7 mol, from about 0.09 mol % to about 0.5 mol %, from about 0.11 mol % to about 0.4 mol %, from about 0.13 mol % to about 0.25 mol %, from about 0.15 mol % to about 0.20 mol %, or any range or subrange therebetween. In further aspects, the colorant package can comprise an amount of NiO of about 0.5 mol % or less, for example, in a range from about 0.001 mol % to about 0.5 mol %, from about 0.005 mol % to about 0.5 mol %, from about 0.01 mol % to about 0.5 mol %, from about 0.05 mol % to about 0.5 mol %, from about 0.07 mol % to about 0.40 mol %, from about 0.09 mol % to about 0.25 mol %, from about 0.11 mol % to about 0.17 mol %, from about 0.13 mol % to about 0.15 mol %, or any range or subrange therebetween. In further aspects, the colorant package can comprise an amount of NiO of about 0.1 mol % or more, for example, in a range from about 0.1 mol % to about 1.0 mol %, from about 0.2 mol % to about 1.0 mol %, from about 0.4 mol % to about 1.0 mol %, from about 0.5 mol % to about 0.8 mol %, from about 0.6 mol % to about 0.7 mol %, or any range or subrange therebetween. In further aspects, the colorant package can comprise one or more of $Fe_2O_3$, $MnO_2$, or combinations thereof, which can act a redox couple to alter the redox ratio of the multi-valent colorants while not being defined as a multi-valent colorant itself within the scope of the present disclosure. In further aspects, the colorant package (in addition to $TiO_2$ and NiO within one or more of the corresponding ranges mentioned in this paragraph) can optionally include $Fe_2O_3$ in a range from about 0.001 mol % to about 1.0 mol %, from about 0.001 mol % to about 0.4 mol %, from about 0.005 mol % to about 0.20 mol %, from about 0.01 mol % to about 0.15 mol %, from about 0.02 mol % to about 0.13 mol %, from about 0.05 mol % to about 0.10 mol %, from about 0.07 mol % to about 0.08 mol % or any range or subrange therebetween. In further aspects, the colorant package (in addition to $TiO_2$ and NiO within one or more of the corresponding ranges mentioned in this paragraph as well as optionally $Fe_2O_3$) can optionally include $MnO_2$ in a range from about 0.0001 mol % to about 0.20 mol %, from about 0.0002 mol % to about 0.17 mol %, from about 0.0004 mol % to about 0.15 mol %, from about 0.002 mol % to about 0.12 mol %, from about 0.01 mol % to about 0.10 mol %, from about 0.02 mol % to about 0.07 mol %, from about 0.03 mol % to about 0.05 mol %, or any range or subrange therebetween.

In aspects, the colorant package can include more than one multi-valent colorant, for example, both $TiO_2$ and $CeO_2$. In further aspects, the colorant package can comprise an amount of $TiO_2$ in a range from about 0.001 mol % to about 2.0 mol %, from about 0.005 mol % to about 2.0 mol %, from about 0.01 mol % to about 1.5 mol %, from about 0.02 mol % to about 1.2 mol %, from about 0.05 mol % to about 1.0 mol %, from about 0.1 mol % to about 1.0 mol %, from about 0.5 mol % to about 1.0 mol %, or any range or subrange therebetween. In further aspects, the colorant package can comprise an amount of $TiO_2$ of about 0.5 mol % or less, for example in a range from about 0.001 mol % to about 0.5 mol %, from about 0.005 mol % to about 0.5 mol %, from about 0.01 mol % to about 0.4 mol %, from about 0.02 mol % to about 0.2 mol %, from about 0.05 mol % to about 0.2 mol %, or any range or subrange therebetween. In further aspects, the colorant package can comprise an amount of $TiO_2$ of about 0.1 mol % or more, for example in a range from about 0.1 mol % to about 2.0 mol, from about 0.5 mol % to about 1.8 mol %, from about 1.0 mol % to about 1.6 mol %, from about 1.1 mol % to about 1.4 mol %, or any range or subrange therebetween. In further aspects, the colorant package can comprise an amount of $CeO_2$ in a range from about 0.001 mol % to about 1.0 mol %, from about 0.05 mol % to about 1.0 mol %, from about 0.1 mol % to about 1.0 mol, from about 0.2 mol % to about 0.8 mol %, from about 0.4 mol % to about 0.6 mol %, or any range or subrange therebetween. In further aspects, the colorant package can comprise an amount of $CeO_2$ of about 0.1 mol % or more, for example, in a range from about 0.1 mol % to about 1.0 mol %, from about 0.2 mol % to about 1.0 mol %, from about 0.5 mol % to about 0.8 mol %, from about 0.5 mol % to about 0.7 mol %, or any range or subrange therebetween. In further aspects, the colorant package can comprise one or more of $Fe_2O_3$, $MnO_2$, or combinations thereof, which can act a redox couple to alter the redox ratio of the multi-valent colorants while not being defined as a multi-valent colorant itself within the scope of the present disclosure. In further aspects, the colorant package (in addition to $TiO_2$ and $CeO_2$ within one or more of the corresponding ranges mentioned in this paragraph) can optionally include $Fe_2O_3$ in a range from about 0.001 mol % to about 0.20 mol %, from about 0.005 mol % to about 0.20 mol %, from about 0.01 mol % to about 0.15 mol %, from about 0.02 mol % to about 0.13 mol %, from about 0.05 mol % to about 0.10 mol %, from about 0.07 mol % to about 0.08 mol % or any range or subrange therebetween. In further aspects, the colorant package (in addition to $TiO_2$ and $CeO_2$ within one or more of the corresponding ranges mentioned in this paragraph as well as optionally $Fe_2O_3$) can optionally include $MnO_2$ in a range from about 0.01 mol % to about 1.0 mol %, from about 0.02 mol % to about 0.8 mol %, from about 0.05 mol % to about 0.6 mol %, from about 0.10 mol % to about 0.4 mol %, from about 0.2 mol % to about 0.3 mol %, or any range or subrange therebetween. In further aspects, the colorant package (in addition to $TiO_2$ and $CeO_2$ within one or more of the corresponding ranges mentioned in this paragraph as well as optionally $Fe_2O_3$) can optionally comprise $MnO_2$ in an amount of 0.10 mol % or more, for example in a range from 0.10 mol % to about 1.0 mol %, from about 0.2 mol % to about 0.8 mol %, from about 0.5 mol % to about 0.7 mol %, from about 0.5 mol % to about 0.6 mol %, or any range or subrange therebetween.

In aspects, the colorant package can include more than one multi-valent colorant, for example, both NiO and $CeO_2$; all of $TiO_2$, $CeO_2$, and NiO; or all of $TiO_2$, $CeO_2$, NiO, and $Co_3O_4$. In further aspects, the colorant package can comprise an amount of NiO in a range from about $5\times10^{-5}$ mol % to about 0.3 mol %, from about 0.001 mol % to about 0.20 mol %, from about 0.01 mol % to about 0.15 mol %, from about 0.05 mol % to about 0.10 mol. In further aspects, the colorant package can comprise an amount of NiO of about 0.1 mol % or less, for example, in a range from about $5\times10^{-5}$ mol % to about 0.1 mol %, from about $5\times10^5$ mol % to about 0.05 mol %, from about 0.001 mol % to about 0.05 mol %, from about 0.07 mol % to about 0.1 mol %, or any range or subrange therebetween. In further aspects, the colorant package can comprise an amount of $CeO_2$ of about 0.001 mol % or more, about 0.02 mol % or more, about 0.1 mol % or more, about 0.2 mol % or more, about 0.5 mol % or more, about 1.0 mol % or more, about 1.2 mol % or more, about 1.4 mol % or more, about 1.6 mol % or more, about 2.0 mol % or less, about 1.5 mol % or less, about 1.3 mol % or less, about 1.0 mol % or less, about 0.7 mol % or less, about 0.5 mol % or less, about 0.3 mol % or less, about 0.1 mol % or less, or about 0.05 mol % or less. In further aspects, the colorant package can comprise an amount of $CeO_2$ of about 0.2 mol % or more, for example, in a range from about 0.2 mol % to about 2.0 mol %, from about 0.5 mol % to about 1.5 mol %, from about 1.0 mol % to about 1.5 mol %, or any range or subrange therebetween. In further aspects, the colorant package can comprise (e.g., in addition to NiO and $CeO_2$) an amount of $Co_3O_4$ in a range from about 0.0001 mol % to about 0.1 mol %, from about 0.0003 mol % to about 0.08 mol %, from about 0.0005 mol % to about 0.05 mol %, from about 0.0010 mol % to about 0.02 mol %, from about 0.003 mol % to about 0.01 mol %, from about 0.005 mol % to about 0.008 mol %, or any range or subrange therebetween. In further aspects, the colorant package can comprise (e.g., in addition to NiO and $CeO_2$) an amount of $Co_3O_4$ of 0.01 mol % or less, for example in a range from about 0.0001 mol % to about 0.01 mol %, from about 0.0003 mol % to about 0.008 mol %, from about 0.0005 mol % to about 0.005 mol %, from about 0.001 mol % to about 0.002 mol %, or any range or subrange therebetween. In further aspects, the colorant package can comprise (e.g., in addition to NiO and $CeO_2$) an amount of $Co_3O_4$ of 0.01 mol % or more, for example in a range from about 0.01 mol % to about 0.10 mol %, from about 0.012 mol % to about 0.08 mol %, from about 0.015 mol % to about 0.05 mol %, from about 0.03 mol % to about 0.05 mol %, or any range or subrange therebetween. In further aspects, the colorant package can comprise (e.g., in addition to NiO, $CeO_2$, and/or $Co_3O_4$ in) an amount of $TiO_2$ in a range from about $5\times10^{-5}$ mol % to about 1.0 mol %, from about 0.001 mol % to about 0.5 mol %, from about 0.005 mol % to about 0.3 mol %, from about 0.008 mol % to about 0.1 mol %, from about 0.01 mol % to about 0.05 mol %, or any range or subrange therebetween. In further aspects, the colorant package can comprise an amount of $TiO_2$ of about 0.5 mol % or less, for example in a range from about $5\times10^{-5}$ mol % to about 0.5 mol %, from about 0.001 mol % to about 0.5 mol %, from about 0.005 mol % to about 0.5 mol %, from about 0.008 mol % to about 0.3 mol %, from about 0.01 mol % to about 0.1 mol %, or any range or subrange therebetween. In further aspects, the colorant package can comprise an amount of $TiO_2$ of about 0.01 mol % or more, for example in a range from about 0.01 mol % to about 1 mol %, from about 0.05 mol % to about 0.5 mol %, from about 0.05 mol % to about 0.3 mol %, from about 0.05 mol % to about 0.1 mol %, or any range or subrange therebetween. In further aspects, the colorant package can comprise $Fe_2O_3$ and/or $MnO_2$, which can act a redox couple to alter the redox ratio of the multi-valent colorants while not being defined as a multi-valent colorant itself within the scope of the present disclosure. In further aspects, the colorant package (in addition to Nio and $CeO_2$; NiO, $CeO_2$, and $TiO_2$; or NiO, $CeO_2$, and/or $Co_3O_4$ within one or more of the corresponding ranges mentioned in this paragraph) can optionally include $Fe_2O_3$ in a range from about 0.001 mol % to about 0.20 mol %, from about 0.005 mol % to about 0.20 mol %, from about 0.01 mol % to about 0.15 mol %, from about 0.02 mol % to about 0.13 mol %, from about 0.05 mol % to about 0.10 mol %, from about 0.07 mol % to about 0.08 mol % or any range or subrange therebetween. In further aspects, the colorant package (in addition to Nio and $CeO_2$; NiO, $CeO_2$, and $TiO_2$; or NiO, $CeO_2$, and/or $Co_3O_4$ within one or more of the corresponding ranges mentioned in this paragraph) can optionally include $MnO_2$ in a range from about 0.01 mol % to about 1.0 mol %, from about 0.02 mol % to about 0.8 mol %, from about 0.05 mol % to about 0.6 mol %, from about 0.10 mol % to about 0.4 mol %, from about 0.2 mol % to about 0.3 mol %, or any range or subrange therebetween. In further aspects, the colorant package (in addition to Nio and $CeO_2$; NiO, $CeO_2$, and $TiO_2$; or NiO, $CeO_2$, and/or $Co_3O_4$ within one or more of the corresponding ranges mentioned in this paragraph) can optionally comprise $MnO_2$ in an amount of 0.10 mol % or more, for example in a range from 0.10 mol % to about 1.0 mol %, from about 0.2 mol % to about 0.8 mol %, from about 0.5 mol % to about 0.7 mol %, from about 0.5 mol % to about 0.6 mol %, or any range or subrange therebetween.

In aspects, the glass article may comprise from 60 mol % to 70 mol % $SiO_2$; from 11 mol % to 17 mol % $Al_2O_3$; from 2 mol % to 8 mol % $B_2O_3$; from 9 mol % to 14 mol % $Li_2O$; from 2 mol % to 6 mol % $Na_2O$; and from $1\times10^{-6}$ mol % to 0.01 mol % Au. In further aspects, the glass article can further comprise from 0.1 mol % to 2 mol % MgO; from 0.1 mol % to 2 mol % ZnO; and. In even further aspects, MgO+ZnO is from 0.1 mol % to 4.5 mol %. In further aspects, the glass article can further comprise from 0.1 mol % to 0.5 mol % $K_2O$; and from $1\times10^{-6}$ mol % to 0.05 mol % Au. In even further aspects, $R_2O$—$Al_2O_3$ is from 0 mol % to 3 mol %.

In aspects, the glass article may comprise from 40 mol % to 70 mol % $SiO_2$; from 8 mol % to 20 mol % $Al_2O_3$; from 1 mol % to 10 mol % $B_2O_3$; from 1 mol % to 20 mol % $Li_2O$; from 1 mol % to 15 mol % $Na_2O$; from 0 mol % to 6 mol % MgO; from 0 mol % to 5 mol % ZnO; and from $1\times10^{-6}$ mol % to 1 mol % Au, wherein: MgO+ZnO is from 0.1 mol % and to 6 mol %. In further aspects, the glass article may further comprise from 0 mol % to 8 mol % MgO and from 0.0005 mol % to 1 mol % Au.

In aspects, the glass article may comprise from 50 mol % to 80 mol % $SiO_2$; from 7 mol % to 25 mol % $Al_2O_3$; from 1 mol % to 15 mol % $B_2O_3$; from 5 mol % to 20 mol % $Li_2O$; from 0.5 mol % to 15 mol % $Na_2O$; from greater than 0 mol % to 1 mol % $K_2O$; and from $1\times10^{-6}$ mol % to 1 mol % Au, wherein: $R_2O$—$Al_2O_3$ is from −5 mol % to 7 mol %. In aspects, the glass article can comprise from 50 mol % to 70 mol % $SiO_2$; from 10 mol % to 17.5 mol % $Al_2O_3$; from 3 mol % to 10 mol % $B_2O_3$; from 8.8 mol % to 14 mol % $Li_2O$; from 1.5 mol % to 8 mol % $Na_2O$; and from 0 mol % to 2 mol % $Cr_2O_3$, wherein: $R_2O$+R'O—$Al_2O_3$ is from 0.5 mol % to 6 mol %, and $Al_2O_3$+MgO+ZnO is from 12 mol % to 22 mol %.

In aspects, the glass article may comprise from 50 mol % to 70 mol % $SiO_2$; from 10 mol % to 20 mol % $Al_2O_3$; from 4 mol % to 10 mol % $B_2O_3$; from 7 mol % to 17 mol % $Li_2O$; from 1 mol % to 9 mol % $Na_2O$; from 0.01 mol % to 1 mol % $SnO_2$; and from 0.01 mol % to 5 mol % Ag, wherein $R_2O$—$Al_2O_3$ is from 0.2 mol % to 5.00 mol %. In aspects, the glass article may comprise from 50 mol % to 70 mol % $SiO_2$; from 10 mol % to 20 mol % $Al_2O_3$; from 1 mol % to 10 mol % $B_2O_3$; from 7 mol % to 14 mol % $Li_2O$; from 0.01 mol % to 8 mol % $Na_2O$; from 0.01 mol % to 1 mol % $K_2O$; from 0 mol % to 7 mol % CaO; and from 0 mol % to 8 mol % MgO, wherein $Li_2O+K_2O+Na_2O+CaO+MgO+ZnO$ is 25 mol % or more and at least one of: $CuO+NiO+Co_3O_4+Cr_2O_3$ is 0.001 mol % or more, $CeO_2$ is 0.1 mol % or more, and/or $TiO_2$ is 0.1 mol % or more.

In aspects, the glass article may comprise from about 55 mol % to about 70 mol % $SiO_2$, from about 12 mol % to about 18 mol % $Al_2O_3$, from about 10 mol % to about 18 mol % of at least one alkali metal oxide, from 0.001 mol % to about 2 mol % of a multi-valent colorant, at least one of $B_2O_3$ or $P_2O_5$, and from 0.0001 mol % to 2 mol % of a colorant package selected from (1) both $TiO_2$ and NiO, (2) both $TiO_2$ and $CeO_2$, (3) both NiO and $CeO_2$; (4) all of $TiO_2$, $CeO_2$, and NiO; (5) all of $TiO_2$, $CeO_2$, NiO, and $Co_3O_4$, (6) Au, (7) both Au and Ag, (8) both Au and NiO, (9) both $Cr_2O_3$ and $Co_3O_4$, (10) all of NiO, $Co_3O_4$, $Cr_2O_3$, and $TiO_2$, which can be used in combination with one or more redox couples (e.g., $Fe_2O_3$, $MnO_2$).

Throughout the disclosure, fracture toughness ($K_{IC}$) represents the ability of a glass composition to resist fracture. Fracture toughness is measured on a non-strengthened glass article, such as measuring the $K_{IC}$ value prior to ion exchange (IOX) treatment of the glass article, thereby representing a feature of a glass substrate prior to IOX. The fracture toughness test methods described herein are not suitable for glasses that have been exposed to IOX treatment. Accordingly, where the fracture toughness of an ion exchanged article is referred to, it means the fracture toughness of a non-ion exchanged article with the same composition and microstructure (when present) as the center (i.e., a point located at least 0.5t from every surface of the article or substrate where t is the thickness of the article or substrate) of the ion exchanged article (which corresponds to the portion of the ion exchanged article least affected by the ion exchange process and, hence, a composition and microstructure comparable to a non-ion exchanged glass). Fracture toughness is measured by the chevron notched short bar method. The chevron notched short bar (CNSB) method is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that Y*m is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992). Unless otherwise specified, all fracture toughness values were measured by chevron notched short bar (CNSB) method.

In aspects, the glass article may have an increased fracture toughness such that the colored glass articles are more resistant to damage. In aspects, the glass article may have a $K_{IC}$ fracture toughness as measured by a CNSB method, prior to ion exchange, of 0.7 MPa·m$^{1/2}$ or more, 0.8 MPa·m$^{1/2}$ or more, 0.9 MPa·m$^{1/2}$ or more, or 1.0 MPa·m$^{1/2}$ or more. In aspects, the glass article 350 and/or 511 formed from the glass compositions described herein may have an increased fracture toughness such that the colored glass articles are more resistant to damage. In aspects, the glass article 350 and/or 511 may have a $K_{IC}$ fracture toughness as measured by the DCB method, prior to ion exchange, of 0.6 MPa·m$^{1/2}$ or more, 0.7 MPa·m$^{1/2}$ or more, 0.8 MPa·m$^{1/2}$ or more, 0.9 MPa·m$^{1/2}$ or more, 1.0 MPa·m$^{1/2}$ or more.

Throughout the disclosure, the dielectric constant of the glass article is measured using a split post dielectric resonator (SPDR) at a frequency of 10 GHz. The dielectric constant was measured on samples of the glass article having a length of 3 inches (76.2 mm), a width of 3 inches (76.2 mm), and a thickness of less than 0.9 mm. In aspects, the glass article 350 and/or 511 comprises a dielectric constant Dk at 10 GHz of 6.4 or less, 6.3 or less, 6.2 or less, 6.1 or less, 6 or less, 5.6 or more, 5.7 or more, 5.8 or more, 5.9 or more, or 6.0 or more. In aspects, the glass article 350 and/or 511 comprises a dielectric constant Dk at 10 GHz in a range from 5.6 to 6.4, from 5.7 to 6.3, from 5.8 to 6.2, from 5.9 to 6.1, from 5.9 to 6, or any range or subrange therebetween. In aspects, the dielectric constant at frequencies from 10 GHz to 60 GHz (e.g., from 26 GHz to 40 GHz) can be within one or more of the above-mentioned ranges. Without wishing to be bound by theory, it is believed that the dielectric constant of the glass article measured at 10 GHz approximates the dielectric constant at frequencies from 10 GHz to 60 GHz. Accordingly, a dielectric constant reported for a colored glass article at a frequency of 10 GHz approximates the dielectric constant of the colored glass article at frequencies in a range from 10 GHz to 60 GHz, inclusive of endpoints.

In aspects, although not shown, the natively colored glass housing can further comprise a coating disposed on the first major surface of the glass article, for example. For example, the coating can be an anti-reflective coating, an anti-glare coating, an easy-to-clean coating, a low-friction coating, an oleophobic coating, a diamond-like coating, a scratch-resistant, coating, an abrasion-resistant coating, a polymeric hard coating, or a combination thereof. A scratch-resistant coating may comprise an oxynitride, for example, aluminum oxynitride or silicon oxynitride with a thickness of about 500 micrometers or more. In such aspects, the abrasion-resistant layer may comprise the same material as the scratch-resistant layer. In aspects, a low friction coating may comprise a highly fluorinated silane coupling agent, for example, an alkyl fluorosilane with oxymethyl groups pendant on the silicon atom. In such aspects, an easy-to-clean coating may comprise the same material as the low friction coating. In other aspects, the easy-to-clean coating may comprise a protonatable group, for example an amine, for example, an alkyl aminosilane with oxymethyl groups pendant on the silicon atom. In such aspects, the oleophobic coating may comprise the same material as the easy-to-clean coating. In aspects, a diamond-like coating comprises carbon and may be created by applying a high voltage potential in the presence of a hydrocarbon plasma.

In further aspects, a polymeric hard coating can comprise one or more of an ethylene-acid copolymer, a polyurethane-based polymer, an acrylate resin, and a mercapto-ester resin. Example aspects of ethylene-acid copolymers include ethylene-acrylic acid copolymers, ethylene-methacrylic acid copolymers, and ethylene-acrylic-methacrylic acid terpolymers (e.g., Nucrel, manufactured by DuPont), ionomers of ethylene acid copolymers (e.g., Surlyn, manufactured by DuPont), and ethylene-acrylic acid copolymer amine dispersions (e.g., Aquacer, manufactured by BYK). Example aspects of polyurethane-based polymers include aqueous-modified polyurethane dispersions (e.g., Eleglas®, manufactured by Axalta). Example aspects of acrylate resins that can be UV curable include acrylate resins (e.g., Uvekol® resin, manufactured by Allinex), cyanoacrylate adhesives (e.g., Permabond® UV620, manufactured by Krayden), and UV radical acrylic resins (e.g., Ultrabond windshield repair resin, for example, Ultrabond (45CPS)). Example aspects of mercapto-ester resins include mercapto-ester triallyl isocyanurates (e.g., Norland optical adhesive NOA 61). In further aspects, the polymeric hard coating can comprise ethylene-acrylic acid copolymers and ethylene-methacrylic acid copolymers, which may be ionomerized to form ionomer resins through neutralization of the carboxylic acid residue with typically alkali-metal ions, for example, sodium and potassium, and also zinc. Such ethylene-acrylic acid and ethylene-methacrylic acid ionomers may be dispersed in water and coated onto the substrate to form an ionomer coating. Alternatively, such acid copolymers may be neutralized with ammonia which, after coating and drying liberates the ammonia to reform the acid copolymer as the coating. By providing a coating comprising a polymeric coating, the foldable apparatus can comprise low-energy fracture. In further aspects, the polymeric hard coating can comprise an optically transparent hard-coat layer. Suitable materials for an optically transparent polymeric hard-coat layer include but are not limited to a cured acrylate resin material, an inorganic-organic hybrid polymeric material, an aliphatic or aromatic hexafunctional urethane acrylate, a siloxane-based hybrid material, and a nanocomposite material, for example, an epoxy and urethane material with nanosilicate. As used herein, "inorganic-organic hybrid polymeric material" means a polymeric material comprising monomers with inorganic and organic components. An inorganic-organic hybrid polymer is obtained by a polymerization reaction between monomers having an inorganic group and an organic group. An inorganic-organic hybrid polymer is not a nanocomposite material comprising separate inorganic and organic constituents or phases, for example, inorganic particulates dispersed within an organic matrix. More specifically, suitable materials for an optically transparent polymeric (OTP) hard-coat layer include, but are not limited to, a polyimide, a polyethylene terephthalate (PET), a polycarbonate (PC), a poly methyl methacrylate (PMMA), organic polymer materials, inorganic-organic hybrid polymeric materials, and aliphatic or aromatic hexafunctional urethane acrylates. In aspects, an OTP hard-coat layer may consist essentially of an organic polymer material, an inorganic-organic hybrid polymeric material, or aliphatic or aromatic hexafunctional urethane acrylate. In aspects, an OTP hard-coat layer may consist of a polyimide, an organic polymer material, an inorganic-organic hybrid polymeric material, or aliphatic or aromatic hexafunctional urethane acrylate. In aspects, an OTP hard-coat layer may include a nanocomposite material. In aspects, an OTP hard-coat layer may include a nano-silicate and at least one of epoxy or urethane materials. Suitable compositions for such an OTP hard-coat layer are described in U.S. Pat. Pub. No. 2015/0110990, which is hereby incorporated by reference in its entirety by reference thereto. As used herein, "organic polymer material" means a polymeric material comprising monomers with only organic components. In aspects, an OTP hard-coat layer may comprise an organic polymer material manufactured by Gunze Limited and having a hardness of 9H, for example Gunze's "Highly Durable Transparent Film." As used herein, "inorganic-organic hybrid polymeric material" means a polymeric material comprising monomers with inorganic and organic components. An inorganic-organic hybrid polymer is obtained by a polymerization reaction between monomers having an inorganic group and an organic group. An inorganic-organic hybrid polymer is not a nanocomposite material comprising separate inorganic and organic constituents or phases, for example, inorganic particulates dispersed within an organic matrix. In aspects, the inorganic-organic hybrid polymeric material may include polymerized monomers comprising an inorganic silicon-based group, for example, a silsesquioxane polymer. A silsesquioxane polymer may be, for example, an alkyl-silsesquioxane, an aryl-silsesquioxane, or an aryl alkyl-silsesquioxane having the following chemical structure: $(RSiO_{1.5})_n$, where R is an organic group for example, but not limited to, methyl or phenyl. In aspects, an OTP hard-coat layer may comprise a silsesquioxane polymer combined with an organic matrix, for example, SILPLUS manufactured by Nippon Steel Chemical Co., Ltd. In aspects, an OTP hard-coat layer may comprise 90 wt % to 95 wt % aromatic hexafunctional urethane acrylate, e.g., PU662NT (Aromatic hexafunctional urethane acrylate) manufactured by Miwon Specialty Chemical Co.) and 10 wt % to 5 wt % photo-initiator (e.g., Darocur 1173 manufactured by Ciba Specialty Chemicals Corporation) with a hardness of 8H or more. In aspects, an OTP hard-coat layer composed of an aliphatic or aromatic hexafunctional urethane acrylate may be formed as a stand-alone layer by spin-coating the layer on a polyethylene terephthalate (PET) substrate, curing the urethane acrylate, and removing the urethane acrylate layer from the PET substrate.

In aspects, the glass article 350 and/or 511 can comprise one or more compressive stress regions. In aspects, a compressive stress region may be created by chemical strengthening. Chemical strengthening may comprise an ion exchange process, where ions in a surface layer are replaced by—or exchanged with—larger ions having the same valence or oxidation state. Without wishing to be bound by theory, chemically strengthening the glass article can enable good impact resistance, good puncture resistance, and/or higher flexural strength. A compressive stress region may extend into a portion of glass article for a depth called the depth of compression (DOC). As used herein, depth of compression means the depth at which the stress in the chemically strengthened glass articles described herein changes from compressive stress to tensile stress. Depth of compression can be measured by a surface stress meter or a scattered light polariscope (SCALP, wherein values reported herein were made using SCALP-5 made by Glasstress Co., Estonia) depending on the ion exchange treatment and the thickness of the glass article being measured. Where the stress in the glass article is generated by exchanging potassium ions into the substrate, a surface stress meter, for example, the FSM-6000 (Orihara Industrial Co., Ltd. (Japan)), is used to measure depth of compression. Unless specified otherwise, compressive stress (including surface CS) is measured by surface stress meter (FSM) using commercially available instruments, for example the FSM-6000, manufactured by Orihara. Surface stress measurements rely upon the accurate measurement of the stress optical coefficient (SOC), which is related to the birefringence of the glass. Unless specified otherwise, SOC is measured according to Procedure C (Glass Disc Method) described in ASTM standard C770-16, entitled "Standard Test Method for Measurement of Glass Stress-Optical Coefficient," the contents of which are incorporated herein by reference in their entirety. Where the stress is generated by exchanging sodium ions into the glass article, and the glass article is thicker than about 400 µm, SCALP is used to measure the depth of compression and central tension (CT). Where the stress in the glass article is generated by exchanging both potassium and sodium ions into the glass article, and the article being measured is thicker than about 400 µm, the depth of compression and CT are measured by SCALP. Without wishing to be bound by theory, the exchange depth of sodium may indicate the depth of compression while the exchange depth of potassium ions may indicate a change in the magnitude of the compressive stress (but not the change in stress from compressive to tensile). The refracted near-field (RNF; the RNF method is described in U.S. Pat. No. 8,854,623, entitled "Systems and methods for measuring a profile characteristic of a glass sample", which is incorporated herein by reference in its entirety) method also may be used to derive a graphical representation of the stress profile. When the RNF method is utilized to derive a graphical representation of the stress profile, the maximum central tension value provided by SCALP is utilized in the RNF method. The graphical representation of the stress profile derived by RNF is force balanced and calibrated to the maximum central tension value provided by a SCALP measurement. As used herein, "depth of layer" (DOL) means the depth that the ions have exchanged into the glass article (e.g., sodium, potassium). Throughout the disclosure, DOL is measured in accordance with ASTM C-1422. Without wishing to be bound by theory, a DOL is usually greater than or equal to the corresponding DOC. Through the disclosure, when the maximum central tension cannot be measured directly by SCALP (as when the article being measured is thinner than about 400 µm) the maximum CT can be approximated by a product of a maximum compressive stress and a depth of compression divided by the difference between the thickness of the glass article and twice the depth of compression, wherein the compressive stress and depth of compression are measured by FSM.

In aspects, the glass article 350 and/or 511 can comprise a first compressive stress region extending to a first depth of compression from the first major surface 332 and/or 513. In aspects, the glass article 350 and/or 511 can comprise a second compressive stress region extending to a second depth of compression from the second major surface 330 and/or 515. In aspects, the first depth of compression and/or the second depth of compression as a percentage of the second thickness 337 and/or 517 or the first thickness 327 and/or 527 can be about 5% or more, about 10% or more, about 12% or more, about 15% or more, about 30% or less, about 25% or less, about 22% or less, about 20% or less, about 17% or less, or about 15% or less. In aspects, the first depth of compression and/or the second depth of compression as a percentage of the second thickness 337 and/or 517 or the first thickness 327 and/or 527 can be in a range from about 5% to about 30%, from about 10% to about 25%, from about 10% to about 22%, from about 12% to about 20%, from about 12% to about 17%, from about 15% to about 17%, or any range or subrange therebetween. In aspects, the first depth of compression and/or the second depth of compression can be about 10 µm or more, about 20 µm or more, about 30 µm or more, about 40 µm or more, about 50 µm or more, about 60 µm or more, about 500 µm or less, about 200 µm or less, about 150 µm or less, about 100 µm or less, about 90 µm or less, or about 80 µm or less. In aspects, the first depth of compression and/or the second depth of compression can be in a range from about 10 µm to about 500 µm, from about 20 µm to about 200 µm, from about 30 µm to about 150 µm, from about 40 µm to about 100 µm, from about 50 µm to about 90 µm, from about 60 µm to about 80 µm, or any range or subrange therebetween.

In aspects, the glass article 350 and/or 511 can comprise a first depth of layer of one or more alkali-metal ions associated with the first compressive stress region, and/or the glass article 350 and/or 511 can comprise a second depth of layer of one or more alkali-metal ions associated with the second compressive stress region and the second depth of compression. As used herein, the one or more alkali-metal ions of a depth of layer of one or more alkali-metal ions can include sodium, potassium, rubidium, cesium, and/or francium. In aspects, the one or more alkali ions of the first depth of layer of the one or more alkali ions and/or the second depth of layer of the one or more alkali ions comprises potassium. In aspects, the first depth of layer and/or the second depth of layer, as a percentage of the second thickness 337 and/or 517 or the first thickness 327 and/or 527, can be about 1% or more, about 5% or more, about 10% or more, about 12% or more, about 15% or more, about 25% or less, about 20% or less, about 17% or less, about 15% or less, or about 10% or less. In aspects, the first depth of layer and/or the second depth of layer, as a percentage of the second thickness 337 and/or 517 or the first thickness 327 and/or 527, can be in a range from about 1% to about 25%, from about 5% to about 20%, from about 10% to about 17%, from about 12% to about 15%, or any range or subrange therebetween. In aspects, the first depth of layer of the one or more alkali-metal ions and/or the second depth of layer of the one or more alkali-metal ions can be about 1 µm or more, about 10 µm or more, about 15 µm or more, about 20 µm or more, about 25 µm or more, about 30 µm or more, about 200 µm or less, about 150 µm or less, about 100 µm or less, about 60 µm or less, about 45 µm or less, about 30 µm or less, or about 20 µm or less. In aspects, the first depth of layer of the one or more alkali-metal ions and/or the second depth of layer of the one or more alkali-metal ions can be in a range from about 1 µm to about 200 µm, from about 1 µm to about 150 µm, from about 10 µm to about 100 µm, from about 15 µm to about 600 µm, from about 20 µm to about 45 µm, from about 20 µm to about 30 µm, or any range or subrange therebetween.

In aspects, the first compressive stress region can comprise a maximum first compressive stress, and/or the second compressive stress region can comprise a maximum second compressive stress. In further aspects, the maximum first compressive stress and/or the maximum second compressive stress can be about 100 MegaPascals (MPa) or more, about 300 MPa or more, 400 MPa or more, about 500 MPa or more, about 600 MPa or more, about 700 MPa or more, about 1,500 MPa or less, about 1,200 MPa or less, about 1,000 MPa or less, or about 800 MPa or less. In further aspects, the maximum first compressive stress and/or the maximum second compressive stress can be in a range from about 100 MPa to about 1,500 MPa, from about 300 MPa to about 1,200 MPa, from about 400 MPa to about 1,000 MPa, from about 500 MPa to about 1,000 MPa, from about 600 MPa to about 900 MPa, from about 700 MPa to about 800 MPa, or any range or subrange therebetween.

In aspects, the glass article 350 and/or 511 can comprise a tensile stress region. In further aspects, the tensile stress region can be positioned between the first compressive stress region and the second compressive stress region. In further aspects, the tensile stress region can comprise a maximum tensile stress. The maximum tensile stress can be about 10 MPa or more, about 30 MPa or more, about 50 MPa or more, about 60 MPa or more, about 80 MPa or more, about 250 MPa or less, about 200 MPa or less, about 100 MPa or less, about 80 MPa or less, or about 60 MPa or less. The maximum tensile stress can be in a range from about 10 MPa to about 250 MPa, from about 30 MPa to about 200 MPa, from about 50 MPa to about 100 MPa, from about 60 MPa to about 80 MPa, or any range or subrange therebetween.

EXAMPLES

Various aspects will be further clarified by the following examples. Examples 1-8 were formed as glass articles with the corresponding colorant packages stated in Table 1. In addition to the stated colorant packages, compositions included from 60 mol % to 65 mol % $SiO_2$, from 14 mol % to 16 mol % $Al_2O_3$, from 3.5 mol % to 8 mol % $B_2O_3$, from 9.0 mol % to 13.5 mol % $Li_2O$, from 1.5 mol % to 6.0 mol % $Na_2O$, from 0.1 mol % to 0.7 mol % $K_2O$, from 1 mol % to 6 mol % R'O. Experimental measurements for Examples 1-8 with colorant packages comprising from 0.005 mol % to 1.5 mol % were performed using samples with a thickness of 0.6 mm and at a thickness of 2.4 mm. Based on these measurements, a model was constructed to determine the impact of changing an amount of the corresponding colorant package on the absorption of the glass and, in turn, the resulting CIELAB color coordinates, which was used to generate the results presented in FIGS. 6, 7A-7B, 8A-8B, 9-14, 15A-15C, 16A-16C, 17-18, 19A-19D, 20-24, 26A-26C, and 27A-27C.

TABLE 1

Colorant Packages A-H for Examples 1-8

| | Example | | | | | | | |
|---|---|---|---|---|---|---|---|---|
| | 1 | 2 | 3 | 4 | 5 | 6 | 7 | 8 |
| | Colorant Package | | | | | | | |
| | A | B | C | D | E | F | G | H |
| $Cr_2O_3$ | X | X | X | X | | | | |
| $Co_3O_4$ | X | X | X | X | | | | |
| $CeO_2$ | | | | | X | | | |
| $TiO_2$ | | X | X | | X | | | |
| NiO | | | X | X | | | X | |
| Au | | | | | | X | X | X |
| Ag | | | | | X | | | |
| $Fe_2O_3$ | X | X | | | | | | |
| CuO | | X | X | X | | | | |

Figure 25:
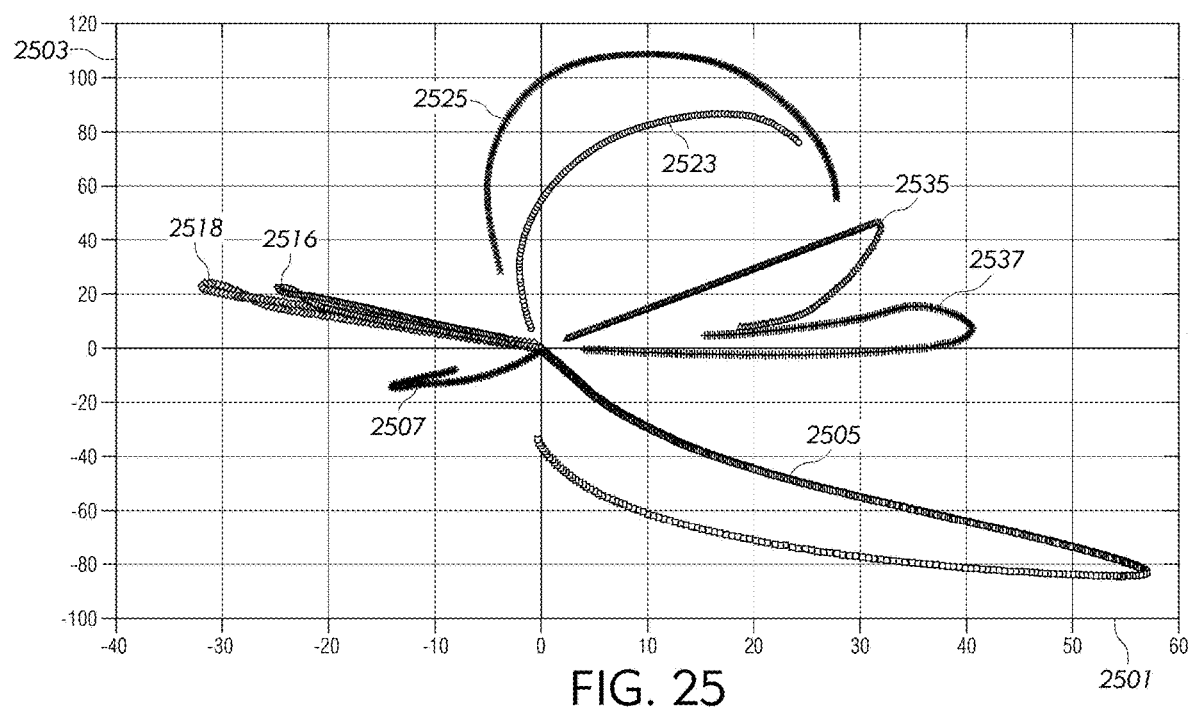
FIG. 25 illustrates a range of colors demonstrated by the examples of the present disclosure.

FIG. 25 shows the CIE a* values (horizontal axis 2501) and CIE b* values (vertical axis 2503) achieved by Examples 1-8. Curve 2505 corresponds to Example 1 and Colorant Package A with predominantly positive CIE a* values and negative CIE b* values, which is associated with blue colors. Curve 2507 corresponds to Example 2 and Colorant Package B with predominantly negative CIE a* values and negative CIE b* values, which is also associated with blue colors. Curve 2516 corresponds to Example 3 and Colorant Package C, which has predominantly negative CIE a* values and positive CIE b* values, which is associated with green colors. Curve 2518 corresponds to Example 4 and Colorant Package D, which also has predominantly negative CIE a* values and positive CIE b* values, which is associated with green colors. Curve 2523 corresponds to Example 5 and Colorant Package E, which swings from negative CIE a* values to positive CIE a* values and has positive CIE b* values, which is associated with yellow or amber colors. Curve 2525 corresponds to Example 6 and Colorant Package F, which swings from negative CIE a* values to positive CIE a* values and has positive CIE b* values, which is associated with yellow or amber colors. Curves 2535 corresponds to Example 7 and Colorant Package G, which has positive CIE a* and positive CIE b* values, which is associated with red or orange colors. Curve 2537 corresponds to Example 8 and Colorant Package H, which has positive CIE a* values and swings from negative CIE b* values to positive CIE b* values, which is associated with red or orange colors.

FIGS. 6, 7A-7B, 8A-B, and 9-12 were discussed above with references to Colorant Packages A-B. FIGS. 13-14, 15A-15C, 16A-16C, and 17 were discussed above with reference to Colorant Packages C-D. FIGS. 18, 19A-19D, and 20-23 are discussed above with reference to Colorant Packages E-F. FIGS. 24, 26A-26C, and 27A-27C are discussed above references to Colorant Packages G-H.

Figure 9:
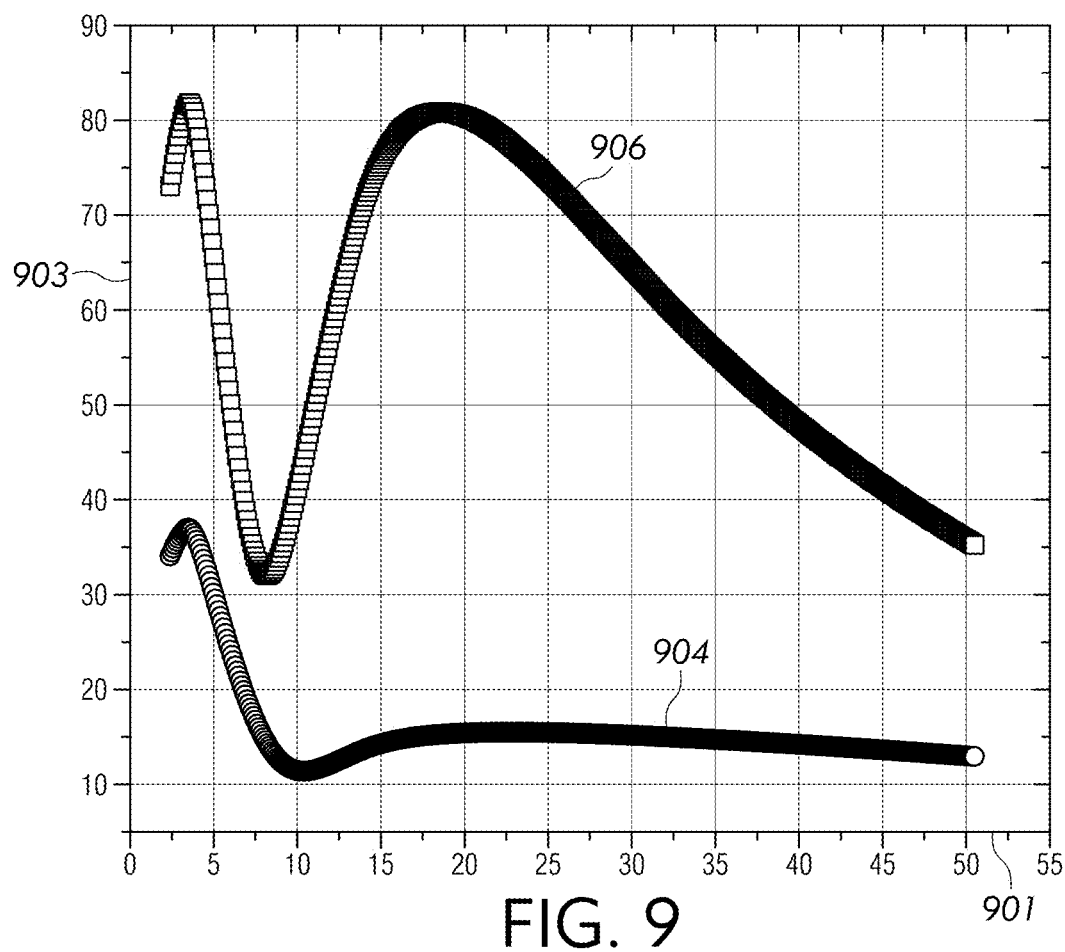
FIG. 9 illustrates differences between the naïve color difference dE and the color difference dE94 for different concentrations of a colorant package.

FIG. 9 illustrates a comparison between the naïve color difference dE (curve 906) and the color difference dE94 (curve 904) used in the present specification. In FIG. 9, the horizontal axis 901 corresponds to relative concentration, and the vertical axis 903 corresponds to the value of dE or dE94. Curves 904 and 906 were calculated for the same articles (Example 1 with Colorant Package A). Curves 904 and 906 both reflect that there is a maxima around a relative concentration of about 3 and that the value decreases from a relative concentration of 20 to 50. However, the relative magnitude of different parts of the same curve for curves 904 and 906 are different. For example, the naïve color difference dE (curve 906) indicates that the color difference at a relative concentration of about 18 to 20 is about as high as the maxima at the relative concentration of about 3. In contrast, the color difference dE94 (curve 904) indicates that the color difference at a relative concentration of about 18 to 20 (e.g., a color difference of about 15) is much less than the color difference dE94 at a relative concentration of about 3 (e.g., a color difference of about 38). With reference to FIG. 7A, the maxima at a relative concentration of about 3 is a handful of positions down from the top—between a sky blue and a midnight blue. With reference to FIG. 7B, the other local maxima detected by the color difference curves at a relative concentration of about 18 to 20 is reflected by the bottom pair of colors (with the understanding that the colors continue to darken as the relative concentration increases until the color saturates and/or the absorption decreases such that the color is perceived as black). At the bottom of FIG. 7B, both colors are quite dark with the second portion (right) being black and the first portion (left) quickly approaching black as well. At the bottom of FIG. 7B, the pair of colors are not as visually striking as those towards the top of FIG. 7A. Consequently, the naïve color difference dE does not correspond to how visually striking (to the human eye) a pair of colors are since the two maxima in curve 906 have similar dE values but are very different in actual appearance. As such, dE and dE94 do not directly correspond to one another. Instead, dE94 is weighed to better represent the color difference perceived by the human eye than the naïve color difference dE.

The above observations can be combined to provide glass articles and natively colored glass articles including the same that can provide different colors in the same glass article through regions of different thicknesses. These different colors can be used to produce aesthetically pleasing devices. demonstrated by the Examples herein, noticeable and/or aesthetically pleasing color differences between the regions of the glass article for dE94 of 10 or more (e.g., from 12 to 35 or from 11 to 22) when the CIE L* value of the first region is 30 or more. Without wishing to be bound by theory, it is believed that glasses having CIELAB color coordinates within the range of CIE L* values from 30 to 96 are transparent to wavelengths of visible light (i.e., wavelengths of light from 380 nm to 750 nm, inclusive of endpoints)

rather than opaque while still provided a noticeable color. Glass articles with a CIE L* value greater than 96.5 may appear as colorless, and/or glass articles with a CIE L* value less than 30 may appear as black. Providing a CIE L* value of the first region of 30 or more can enable a noticeable color difference, for example, by ensuring that at least one of the regions produces a color that is not perceived as black. For example, glass articles associated with a blue color or a green color can produce a noticeable color difference for a CIE L* value of the first region of 30 or more (e.g., from 30 to 96 or from 35 to 65). Glass articles associated with a red or range color can produce a noticeable color difference for a CIE L* value of the first region of 50 or more and/or produce colors of both regions that are perceived as non-black for a CIE L* value of the first region of 80 or more (e.g., from 80 to 96, from 80 to 86, or from 85 to 93). Glass articles associated with a yellow or amber color can produce a noticeable color difference for a CIE L* value of the first region of 80 or more (e.g., from 80 to 96, from 80 to 86, or from 85 to 93). As discussed herein, providing a thickness ratio from 3 to 8 (e.g., from 3 to 5) can produce a noticeable and aesthetically pleasing between the first region and the second region of the glass article.

The glass articles can provide two or more regions with different thicknesses that are associated with different colors despite the glass article comprising substantially the same composition. These different colors can highlight one or more particular features to a user of the corresponding device (e.g., smart phone, tablet, watch), such as a location of an antenna, a camera, a sensor, a logo, and/or other electronics of features. For example, such highlighted identification may help a user of the corresponding device quickly orient the device and/or achieve a handhold thereof for a particular purpose (e.g., receiving a line-of-sight transmission, sensing a particular item, instantly snapping a photo of a moving target). Without sufficient contrast, such feature(s) may otherwise blend in or be hidden within the surrounding structure of the device, which could delay and/or interfere with the intended use of the electronics and/or feature(s).

Directional terms as used herein—for example, up, down, right, left, front, back, top, bottom—are made only with reference to the figures as drawn and are not intended to imply absolute orientation.

It will be appreciated that the various disclosed aspects may involve features, elements, or steps that are described in connection with that aspect. It will also be appreciated that a feature, element, or step, although described in relation to one aspect, may be interchanged or combined with alternate aspects in various non-illustrated combinations or permutations.

It is also to be understood that, as used herein the terms "the," "a," or "an," mean "at least one," and should not be limited to "only one" unless explicitly indicated to the contrary. For example, reference to "a component" comprises aspects having two or more such components unless the context clearly indicates otherwise. Likewise, a "plurality" is intended to denote "more than one."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Ranges can be expressed herein as from "about" one particular value, and/or to "about" another particular value. When such a range is expressed, aspects include from the one particular value and/or to the other particular value. Similarly, when values are expressed as approximations, by use of the antecedent "about," it will be understood that the particular value forms another aspect. Whether or not a numerical value or endpoint of a range in the specification recites "about," the numerical value or endpoint of a range is intended to include two aspects: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In aspects, "substantially similar" may denote values within about 10% of each other, for example, within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

While various features, elements, or steps of particular aspects may be disclosed using the transitional phrase "comprising," it is to be understood that alternative aspects, including those that may be described using the transitional phrases "consisting of" or "consisting essentially of," are implied. Thus, for example, implied alternative aspects to an apparatus that comprises A+B+C include aspects where an apparatus consists of A+B+C and aspects where an apparatus consists essentially of A+B+C. As used herein, the terms "comprising" and "including", and variations thereof shall be construed as synonymous and open-ended unless otherwise indicated.

The above aspects, and the features of those aspects, are exemplary and can be provided alone or in any combination with any one or more features of other aspects provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of the aspects herein provided they come within the scope of the appended claims and their equivalents.

U.S. patent application Ser. No. 17/677,345 filed Feb. 22, 2022, is hereby incorporated by reference herein in its entirety. U.S. patent application Ser. No. 17/841,776 filed Jun. 16, 2022, is hereby incorporated by reference herein in its entirety. U.S. patent application Ser. No. 17/677,375 filed Feb. 22, 2022, is hereby incorporated by reference herein in its entirety. U.S. patent application Ser. No. 17/691,813 filed Mar. 10, 2022, is hereby incorporated by reference herein in its entirety. U.S. patent application Ser. No. 17/843,096 filed Jun. 17, 2022, is hereby incorporated by reference herein in its entirety. U.S. patent application Ser. No. 17/713,313 filed Apr. 5, 2022, is hereby incorporated by reference herein in its entirety. U.S. patent application Ser. No. 17/843,001 filed Jun. 17, 2022, is hereby incorporated by reference herein in its entirety.

What is claimed is:

1. A natively colored glass housing for a consumer electronic device, the natively colored glass housing comprising a glass article comprising:
   a first region comprising a first thickness defined between a first surface area and a second surface area opposite the first surface area, the first thickness is from 20 μm to 1 mm; and
   a second region comprising a second thickness defined between a third surface area and a fourth surface area opposite the third surface area, the second thickness is greater than the first thickness,
   wherein the glass article comprises a silicate glass with a colorant, the first region exhibits a first CIE L* value from 30 to 96, the second region exhibits a second CIE L* value, and a color difference dE94 defined between the first region and the second region is 10 or more.

2. The natively colored glass housing of claim 1, wherein the second region exhibits the second CIE L* value from 30 to 92.

3. The natively colored glass housing of claim 1, wherein the color difference dE94 is from 12 to 35.

4. The natively colored glass housing of claim 1, wherein a ratio of the second thickness to the first thickness is from 3 to 8.

5. The natively colored glass housing of claim 1, wherein:
   the first region exhibits:
      the first CIE L* value from 80 to 96;
      a first CIE a* value of −0.3 or less; and
      a first CIE b* value of 0.0 or more;
   the second region exhibits:
      the second CIE L* value from 30 to 92;
      a second CIE a* value of −0.4 or less; and
      a second CIE b* value of 0.0 or more; and
   an a* ratio is the second CIE a* value divided by the first CIE a* value, and the natively colored glass housing satisfies the relationship:

$$|(a*\text{ratio}) - 0.09 \times (\text{first } L * \text{value}) + 4.8| < 0.1.$$

6. The natively colored glass housing of claim 5, wherein the a* ratio is in a range from 2.0 to 3.5.

7. The natively colored glass housing of claim 5, wherein:
   the first CIE b* value is 0.2 or more;
   the second CIE b* is 0.2 or more; and
   a b* ratio of the second CIE b* value to the first CIE b* value is in a range from 1.5 to 3.2.

8. The natively colored glass housing of claim 7, wherein the natively colored glass housing satisfies the relationship:

$$|(b*\text{ratio}) - 0.077 \times (\text{first } CIEL * \text{value}) + 3.8| < 0.05.$$

9. The natively colored glass housing of claim 7, wherein a b* ratio is the second CIE b* value divided by the first CIE b* value, and the natively colored glass housing satisfies the relationship:

$$|(a*\text{ratio}) - 1.17 \times (b*\text{ratio}) - 3.6| < 0.1.$$

10. The natively colored glass housing of claim 1, wherein:
   the first region exhibits:
      the first CIE L* value from 35 to 96;
      a first CIE a* value from −10 to 20; and
      a first CIE b* value from −70 to −5;
   the second region exhibits:
      the second CIE L* value from 25 to 92;
      a second CIE a* from 0 to 60; and
      a second CIE b* value from −90 to −20; and
   the natively colored glass housing satisfies the following relationship:

$$|(\text{first } CIEL * \text{value}) - 1.1 \times (\text{first } CIEb * \text{value}) + 106| < 5.$$

11. The natively colored glass housing of claim 10, wherein the natively colored glass housing satisfies the following relationships:
   second CIE a* value>first CIE a* value; and
   first CIE b* value>second CIE b* value.

12. The natively colored glass housing of claim 10, wherein:
   the first CIE L* value is from 35 to 65;
   the first CIE a* value is from 0 to 20;
   the first CIE b* value is from −70 to −30;
   the second CIE a* value is from 30 to 60; and
   the second CIE b* value is from −90 to −60.

13. The natively colored glass housing of claim 10, wherein a difference in CIE a* values defined as the second CIE a* value minus the first CIE a* value is from about 15 to about 70.

14. The natively colored glass housing of claim 1, wherein:
   the first region exhibits:
      the first CIE L* value from 80 to 96;
      a first CIE a* value of 0 or more; and
      a first CIE b* value of 5.0 or more;
   the second region exhibits:
      the second CIE L* value from 50 to 92;
      a second CIE a* value of 0 or more; and
      a second CIE b* value of 20 or more; and
   the second CIE b* value is greater than the first CIE b* value, and the first CIE a* value is greater than the second CIE a* value.

15. The natively colored glass housing of claim 14, wherein a b* ratio defined as the first CIE b* value divided by the second CIE b* value is from about 0.75 to about 0.90.

16. The natively colored glass housing of claim 14, wherein the natively colored glass housing satisfies the relationship:

$$|(\text{first } CIEL * \text{value}) - 3.5 \times (\text{first } CIEb * \text{value}) + 198.5| < 1.$$

17. The natively colored glass housing of claim 14, wherein a magnitude of a difference between the first CIE a* value and the second CIE a* value is from 15 to 25.

18. The natively colored glass housing of claim 1, wherein:
   the first region exhibits:
      the first CIE L* value from 80 to 96;
      a first CIE a* value of −10 or more; and
      a first CIE b* value of 5.0 or more;
   the second region exhibits:
      the second CIE L* value from 50 to 92;
      a second CIE a* value of −10 or more; and a second CIE b* value of 20 or more; and
a b* ratio is the second CIE b* value divided by the first CIE b* value, and the natively colored glass housing satisfies the relationship:

$$|(b*\text{ratio}) - 0.10 \times (\text{first } L*\text{value}) + 6.97| < 0.1.$$

19. The natively colored glass housing of claim 18, wherein the natively colored glass housing satisfies the following relationships:
    second CIE a* value>first CIE a* value; and
    second CIE b* value>first CIE b* value.
20. The natively colored glass housing of claim 18, wherein a difference in CIE a* values defined as the second CIE a* value minus the first CIE a* value is from about 2 to about 20.
21. The natively colored glass housing of claim 1, wherein:
    the first region exhibits:
        the first CIE L* value from 80 to 96;
        a first CIE a* value of 1.0 or more; and
        a first CIE b* value of −5.0 or more;
    the second region exhibits:
        the second CIE L* value from 50 to 92;
        a second CIE a* value of 1.0 or more; and
        a second CIE b* value of −5.0 or more; and
    the natively colored glass housing satisfies the relationship:

$$|(dE94) + 1.05 \times (\text{first } L*\text{value}) - 110.2| < 2.5.$$

22. The natively colored glass housing of claim 1, wherein the glass article comprises, as a mol % of the glass article:
    from about 50 mol % to about 75 mol % $SiO_2$;
    from about 7 mol % to about 20 mol % $Al_2O_3$;
    from about 8 mol % to about 20 mol % of at least one alkali metal oxide, alkali metal oxides including $Li_2O$, $Na_2O$, and $K_2O$;
    from 0.001 mol % to about 2 mol % of at least one of a multi-valent colorant or gold; and
    at least one of $B_2O_3$ or $P_2O_5$.
23. The natively colored glass housing of claim 1, further comprising a first compressive stress region extending to a first depth of compression from the first compressive stress region.
24. The natively colored glass housing of claim 1, wherein the glass article exhibits one or more of:
    a dielectric constant at frequencies from 10 GigaHertz to 60 GigaHertz of from about 5.6 to about 6.4; or
    a fracture toughness of 0.60 $MPam^{1/2}$ or more, and a Young's modulus from about 50 GigaPascals to about 100 GigaPascals.
25. The natively colored glass housing of claim 1, further comprising:
    circuitry comprising an antenna that transmits signals within a range of 26 GHz to 40 GHz;
    the natively colored glass housing at least partially surrounding the circuitry; and
    a structure formed as an integral portion of the glass article, wherein the structure comprises a perimeter demarcating the second thickness of the structure that differs from the first thickness of the glass article by at least 150 µm,
    wherein the antenna is positioned and oriented such that the signals are transmitted through the structure of the glass article of the natively colored glass housing.

* * * * *

UNITED STATES PATENT AND TRADEMARK OFFICE
CERTIFICATE OF CORRECTION

PATENT NO. : 12,455,594 B2  
APPLICATION NO. : 18/818764  
DATED : October 28, 2025  
INVENTOR(S) : Guo et al.

Page 1 of 2

It is certified that error appears in the above-identified patent and that said Letters Patent is hereby corrected as shown below:

In the Claims

In Claim 5, Column 71, Line 40, delete "a * ratio" and insert -- a* ratio --.

In Claim 5, Column 71, Line 40, delete "L * value" and insert -- L* value --.

In Claim 8, Column 71, Line 54, delete "b * ratio" and insert -- b* ratio --.

In Claim 8, Column 71, Line 54, delete "CIEL * value" and insert -- CIE L* value --.

In Claim 9, Column 71, Line 63, delete "a * ratio" and insert -- a* ratio --.

In Claim 9, Column 71, Line 63, delete "b * ratio" and insert -- b* ratio --.

In Claim 9, Column 71, Line 63, delete "3.6" and insert -- 0.36 --.

In Claim 10, Column 72, Line 13, delete "CIEL * value" and insert -- CIE L* value --.

In Claim 10, Column 72, Line 13, delete "CIEb * value" and insert -- CIE b* value --.

In Claim 16, Column 72, Line 53, delete "CIEL * value" and insert -- CIE L* value --.

In Claim 16, Column 72, Line 53, delete "CIEb * value" and insert -- CIE b* value --.

In Claim 18, Column 73, Line 8, delete "b * ratio" and insert -- b* ratio --.

Signed and Sealed this  
Sixteenth Day of December, 2025

John A. Squires  
*Director of the United States Patent and Trademark Office*

CERTIFICATE OF CORRECTION (continued)
U.S. Pat. No. 12,455,594 B2

In Claim 18, Column 73, Line 8, delete "L $*$ value" and insert -- L* value --.

In Claim 21, Column 73, Line 33, delete "L $*$ value" and insert -- L* value --.